(12) United States Patent
Sankrithi

(10) Patent No.: US 7,714,457 B2
(45) Date of Patent: May 11, 2010

(54) WIND ENERGY HARVESTING SYSTEM ON A FROZEN SURFACE

(75) Inventor: Mithra M. K. V. Sankrithi, Lake Forest Park, WA (US)

(73) Assignee: RIC Enterprises, Lake Forest Park, WA (US)

( * ) Notice: Subject to any disclaimer, the term of this patent is extended or adjusted under 35 U.S.C. 154(b) by 355 days.

(21) Appl. No.: 11/986,241

(22) Filed: Nov. 21, 2007

(65) Prior Publication Data

US 2009/0127862 A1   May 21, 2009

(51) Int. Cl.
*F03D 9/00* (2006.01)
*H02P 9/04* (2006.01)
*F03B 13/00* (2006.01)
*F03B 13/10* (2006.01)

(52) U.S. Cl. .............................. 290/44; 290/43; 290/54; 290/55

(58) Field of Classification Search ................... 290/43, 290/44, 54, 55
See application file for complete search history.

(56) References Cited

U.S. PATENT DOCUMENTS

| 1,923,971 | A | * | 8/1933 | Evans ........................ 290/4 R |
| 3,504,988 | A | * | 4/1970 | Stenner ........................ 416/9 |
| 3,730,643 | A | * | 5/1973 | Davison ........................ 416/8 |
| 4,032,257 | A | * | 6/1977 | de Haas ...................... 416/117 |
| 4,168,439 | A | * | 9/1979 | Palma ......................... 290/44 |
| 4,302,684 | A | * | 11/1981 | Gogins ....................... 290/55 |
| 4,527,950 | A | * | 7/1985 | Biscomb .................... 416/117 |
| 4,589,344 | A | * | 5/1986 | Davison ....................... 104/24 |
| 4,677,928 | A | * | 7/1987 | Hoyt ...................... 114/102.29 |
| 4,756,666 | A | * | 7/1988 | Labrador ...................... 416/8 |
| 4,832,569 | A | * | 5/1989 | Samuelsen et al. ............ 416/17 |
| 4,859,146 | A | * | 8/1989 | Labrador ...................... 416/8 |
| 4,993,348 | A | * | 2/1991 | Wald .......................... 114/265 |
| 5,119,748 | A | * | 6/1992 | Nishimura ............. 114/102.16 |
| 5,134,305 | A | * | 7/1992 | Senehi ......................... 290/55 |
| 5,193,978 | A | * | 3/1993 | Gutierrez ..................... 416/24 |
| 5,684,335 | A | * | 11/1997 | Ou .............................. 290/54 |
| 5,758,911 | A | * | 6/1998 | Gerhardt ..................... 290/55 |
| 5,992,341 | A | * | 11/1999 | Gerhardt .............. 114/102.16 |
| 6,672,522 | B2 | * | 1/2004 | Lee et al. ..................... 290/55 |
| 6,740,988 | B2 | * | 5/2004 | Tseng ......................... 290/44 |
| 6,779,473 | B1 | * | 8/2004 | Maconochie ............. 114/39.13 |
| 6,956,300 | B2 | * | 10/2005 | Gizara ........................ 290/43 |

(Continued)

*Primary Examiner*—Joseph Waks
*Assistant Examiner*—Pedro J Cuevas

(57) ABSTRACT

The invention provides an environmentally friendly renewable energy harvesting system for harvesting wind energy on a frozen surface, as in cold weather climatic regions associated with higher latitudes or higher altitudes, with snow or ice surfaces. A plurality of ski, skate or runner supported wings or sails are connected together to form a wind energy harvesting system, and capture wind energy by appropriate setting of wing or sail angles of attack so as to drive a cyclic motion that in turn can drive energy capture means such as electric generator means. The invention thus provides a wind energy harvesting system which is supported by a frozen surface, which includes fluid-foil means for interfacing with an air current such as a wind and which includes energy harvesting means utilizing periodic motion of the fluid-foil means for capturing wind energy and converting it into usable energy in a desired form such as electricity. The present invention is intended to provide devices, methods and systems for harvesting renewable energy which can be efficient and cost-effective for small-scale, medium-scale and large-scale applications, to provide real and substantial benefits to meet local energy needs while also more broadly serving humanity and our global environment.

25 Claims, 40 Drawing Sheets

U.S. PATENT DOCUMENTS

| | | | |
|---|---|---|---|
| 6,992,402 B2 * | 1/2006 | Latyshev | 290/55 |
| 7,075,191 B2 * | 7/2006 | Davison | 290/54 |
| 7,298,056 B2 * | 11/2007 | Gizara | 290/54 |
| 7,604,454 B2 * | 10/2009 | Power et al. | 415/3.1 |
| 2004/0080166 A1 * | 4/2004 | Davidson | 290/55 |
| 2004/0164562 A1 * | 8/2004 | Latyshev | 290/55 |
| 2008/0157526 A1 * | 7/2008 | Davison et al. | 290/3 |
| 2008/0240864 A1 * | 10/2008 | Belinsky | 405/223.1 |
| 2009/0127861 A1 * | 5/2009 | Sankrithi | 290/54 |

* cited by examiner

Figure 2C
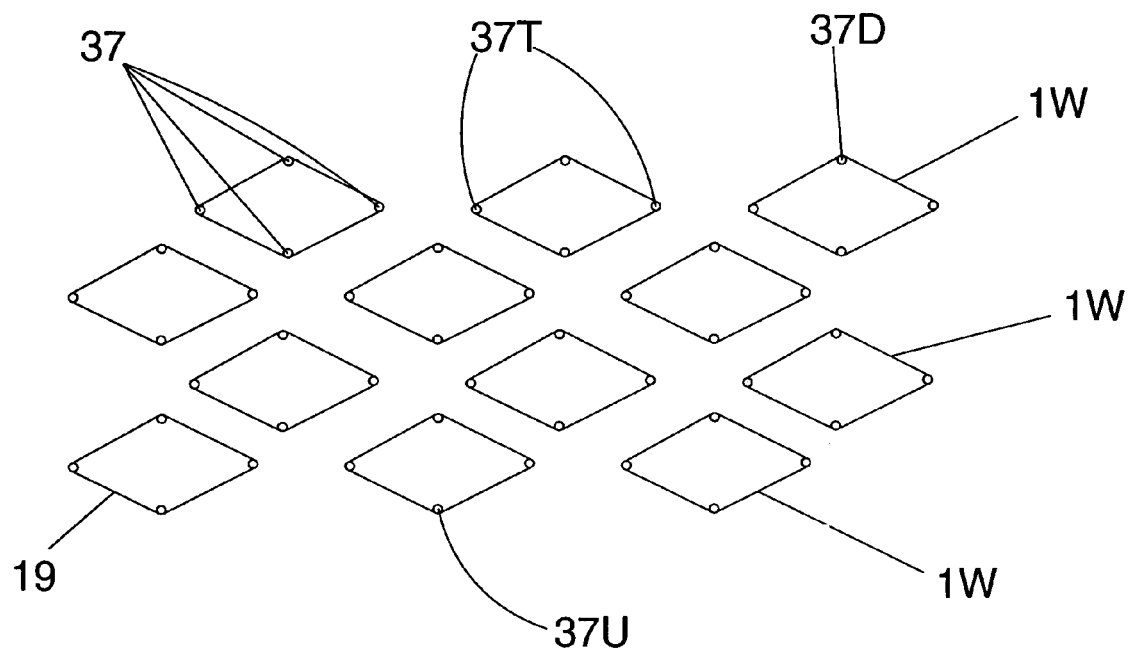
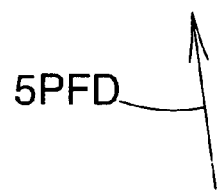
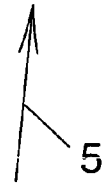

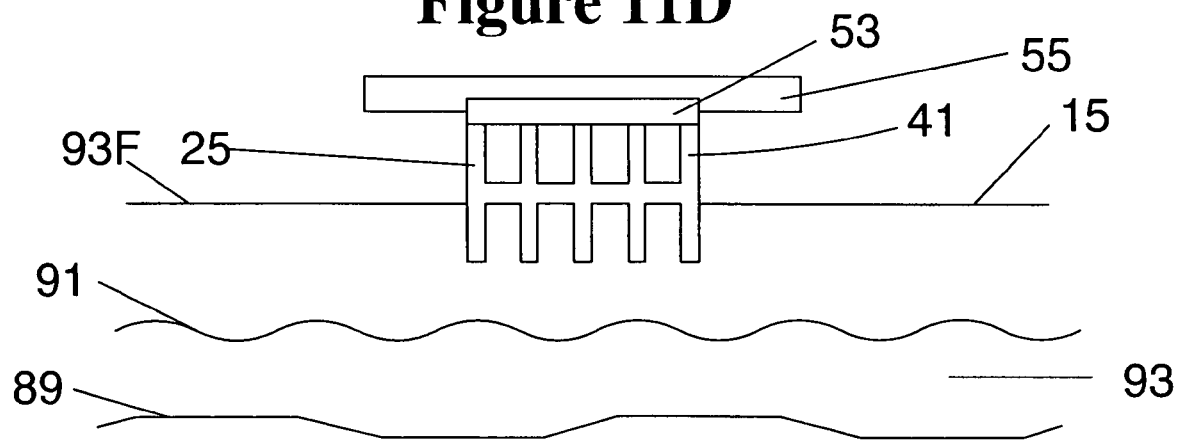
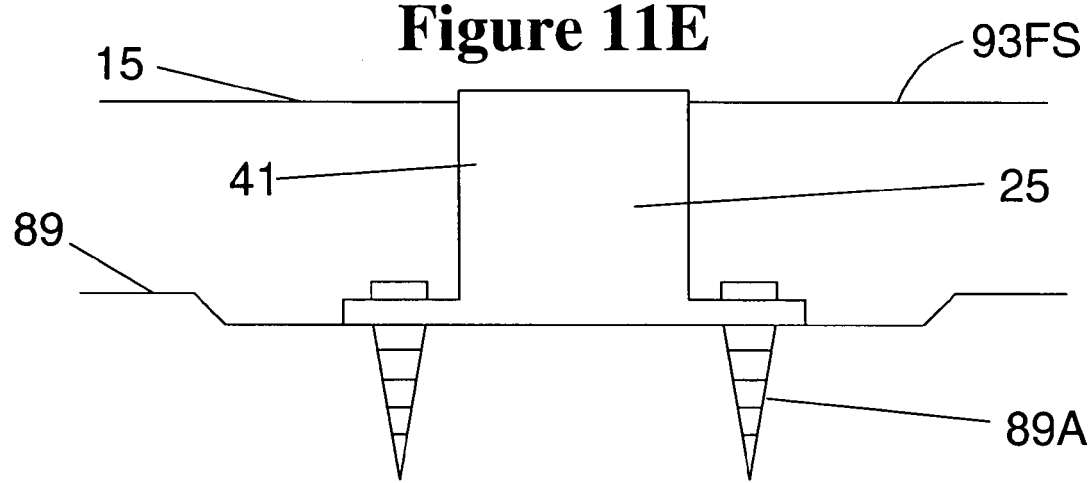

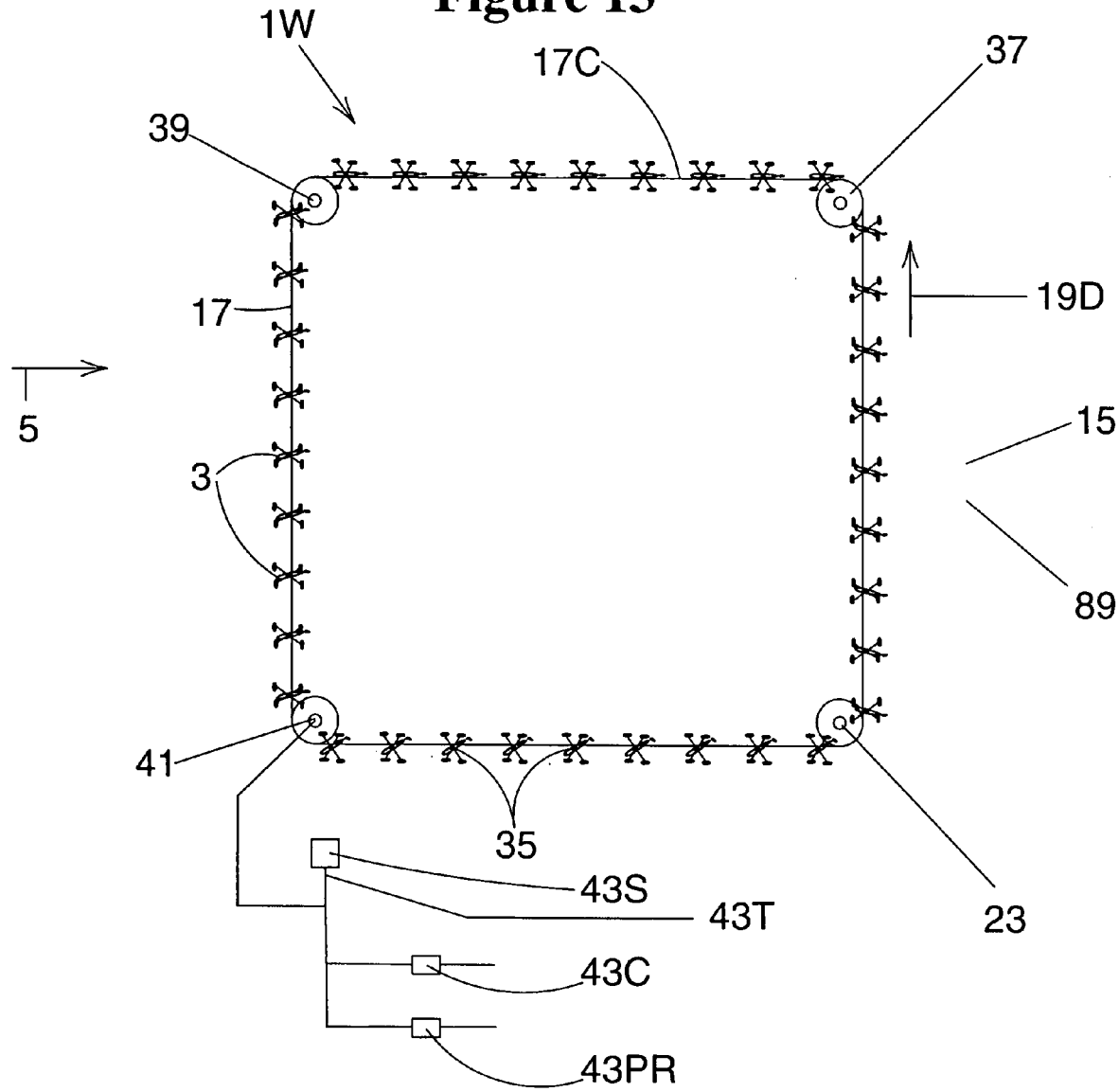

WIND ENERGY HARVESTING SYSTEM ON A FROZEN SURFACE

CROSS-REFERENCE TO RELATED PATENT APPLICATIONS

This patent application entitled "WIND ENERGY HARVESTING SYSTEM ON A FROZEN SURFACE" is being filed simultaneously with the related patent application entitled "FLUID-DYNAMIC RENEWABLE ENERGY HARVESTING SYSTEM" also invented by Mithra M. K. V. Sankrithi and hereby incorporated herein by reference.

BACKGROUND OF THE INVENTION

As the World's human population grows and as the economic prosperity of that population grows, the energy demand of that population also grows. With limited availability of oil reserves, there is a growing need for the conception, development and deployment of cost-effective and large-scale renewable energy alternatives. The continued use of fossil fuels to meet current and emerging energy needs also has very negative environmental consequences, including massive emissions of pollutants and exacerbation of global warming and climate change. This provides further strong motivation for cost-effective, large-scale renewable energy alternatives.

The Sun provides enormous quantities of energy to the World every second, and that unlimited and clean renewable energy can be found in harvestable form both directly as solar energy and indirectly as wind energy.

In some cold weather climes such as Alaska, Northern Canada, Kalaallit Nunaat, Northern Russia, Scandinavia, Antarctica and Sub-Antarctic regions, local habitations require substantial energy for heat and light during very cold and dark winter seasons. It would be highly beneficial to use wind energy to meet these energy needs with a renewable local source, since direct solar energy is not a viable alternative in high latitude winter seasons. The use of efficient wind power in such climes will not only meet energy hunger in these locales, but do so without any greenhouse gas emissions and without any local thermal powerplants dumping heat and greenhouse gases into what may be amongst the most vulnerable locales for the adverse effects of global warming—with these locales being most susceptible to greenhouse gas and global warming induced ice and snow melting, and the consequent long term adverse effect of increasing ocean water levels on a global scale.

BRIEF SUMMARY OF THE INVENTION

The present invention provides a renewable energy harvesting system for harvesting wind energy on a frozen surface, as in cold weather climate regions associated with higher latitudes and/or higher altitudes, also taking seasonality effects into consideration. The present invention is intended to provide devices, methods and systems for harvesting renewable energy which can be efficient and cost-effective for small-scale, medium-scale and large-scale applications, to provide real and substantial benefits to meet local energy needs while also more broadly serving humanity and our global environment.

The invention with its different preferred embodiments can be understood from a full consideration of the following material including drawings, detailed description, and claims.

BRIEF DESCRIPTION OF THE DRAWINGS

FIG. 2C shows how a plurality of wind energy harvesting systems 1W of the configuration shown in FIG. 2B, can be arranged in a lattice or matrix arrangement.

FIGS. 11A through 11G illustrate side views of a variety of anchoring means.

FIG. 13 shows a plan view of an embodiment similar to that of FIG. 3C and 3D, further illustrating means for storing, transmitting, processing and conditioning energy harvested by the wind energy harvesting system.

DETAILED DESCRIPTION

The invention can be better understood through a full consideration of the Figures illustrating preferred embodiments of the invention, along with the following detailed description with reference to these Figures.

Figure 1:
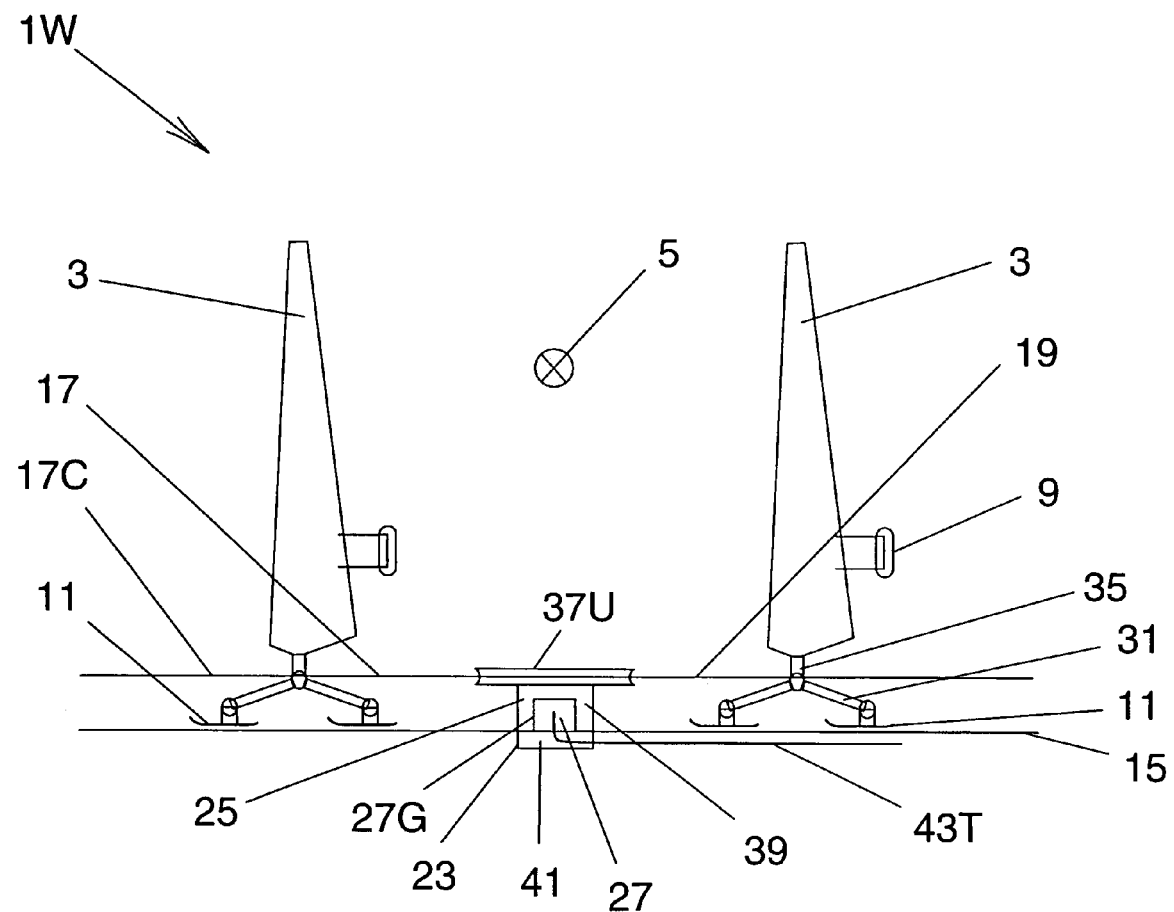
FIG. 1 shows a front view of a portion of a wind energy harvesting system.

FIG. 1 shows a front view of a portion of a wind energy harvesting system 1W. This wind energy harvesting system includes plural runner-supported movable frames 31MF, each supported by support runner means 11 that slide along a frozen surface 15. The runner-supported movable frames 31MF include connecting structure 31 structurally connecting multiple runners. The runner-supported movable frames 31MF each support fluid-foil means 3 for contacting proximate flow fields of an air current 5 when said air current exists and carries wind energy in the form of fluid-dynamic kinetic energy, which fluid-foil means 3 are wings 3W in the illustrated embodiment. The runner-supported movable frames 31MF each support fluid-foil means 3 through fluid-foil base members 35. Thus the plural fluid-foil means 3 are supported by plural movable frames 31MF, and said movable frames 31MF are supported at least in part by said support runner means 11.

The air current 5 illustrated is a wind blowing substantially into the page in the front view of the illustration. The wings 3W are intended to be oriented with a desired angle of attack relative to the wind direction so as to generate a lateral lifting force, which can also be called a thrust force. Wing orientation can be enabled by use of attachment means at the base members 35 with a yaw degree of freedom of motion, such as cylindrical roller bearings or ball bearing means known from the prior art. Thus the fluid-foil means 3 (here wings 3W) are movable relative to their corresponding movable frames 31MF. Wing orientation can be set by actuator means known from the prior art, or by use of a control surface 9CS as illustrated, where the control surface 9CS is part of control system means 9 for controlling time-variable orientations of said fluid-foil means 3 relative to said proximate flow fields of said air current 5 when said air current exists and carries wind energy in the form of fluid-dynamic kinetic energy. The control surface 9CS acts in a manner similar to aircraft control surfaces or control tabs as known from the prior art, and can be set for example to an angle such that the wings 3W orient themselves freely to an angle of attack relative to the wind that generates approximately the maximum lift coefficient possible for the particular wing design before it encounters aerodynamic stall.

Adjacently located runner-supported movable frames 31MF and corresponding base members 35 are connected to each other by connecting means 17 comprising connecting members 19, such as the illustrated substantially closed-loop cable 17C, a portion of which is visible in the view of FIG. 1. The movable frames 31MF and corresponding base members 35, are pushed along by the aerodynamic lateral lift or thrust forces acting on said wings 3W, and in turn drag along the cable 17C. The cable 17C (in tension) in turn contacts and rotates a rotatable pulley 37 rotatable around a hub 39 which is fixedly located on said frozen surface 15 by means for anchoring 41. The rotatable pulley 37 serves as a rotating member 27R rotating around a nonrotating hub member 27H, which latter is the hub 39 in the illustrated embodiment. The specific illustrated pulley in FIG. 1 happens to be an upstream pulley 37U. Rotation of the pulley 37 relative to the hub 39 drives generator means 27G which serves as energy conversion means 27, as for example for converting the mechanical energy of the rotating pulley into electrical energy for transmission along means for transmitting energy 43T. The pulley 37 in conjunction with the energy conversion means 27 are key components of energy harvesting means 25 for harvesting the wind energy as it acts on the wings 3W, into energy in a desired form for at least one of transmission, storage, processing and use.

Figure 2A:
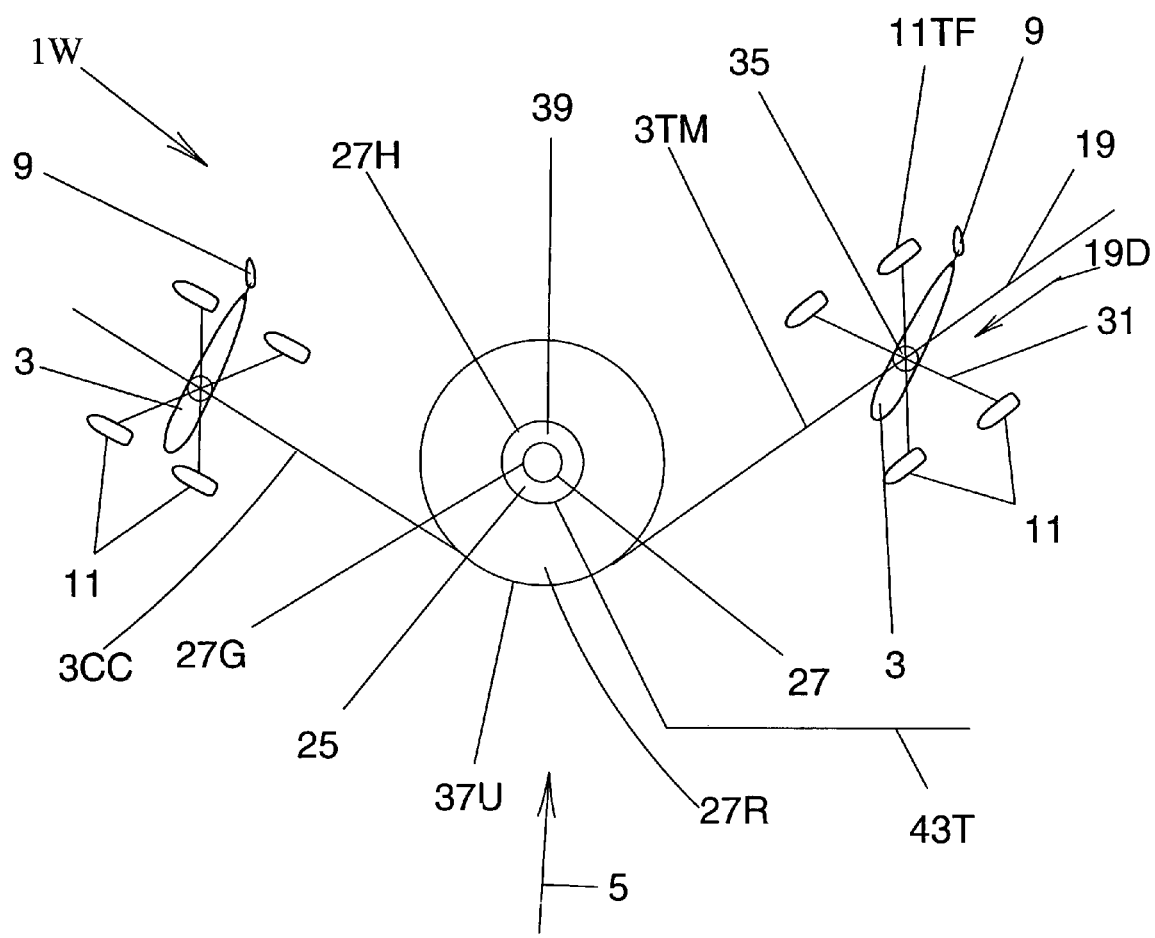
FIG. 2A shows a plan view of the same portion of the same preferred embodiment of FIG. 1.
Figure 2B:
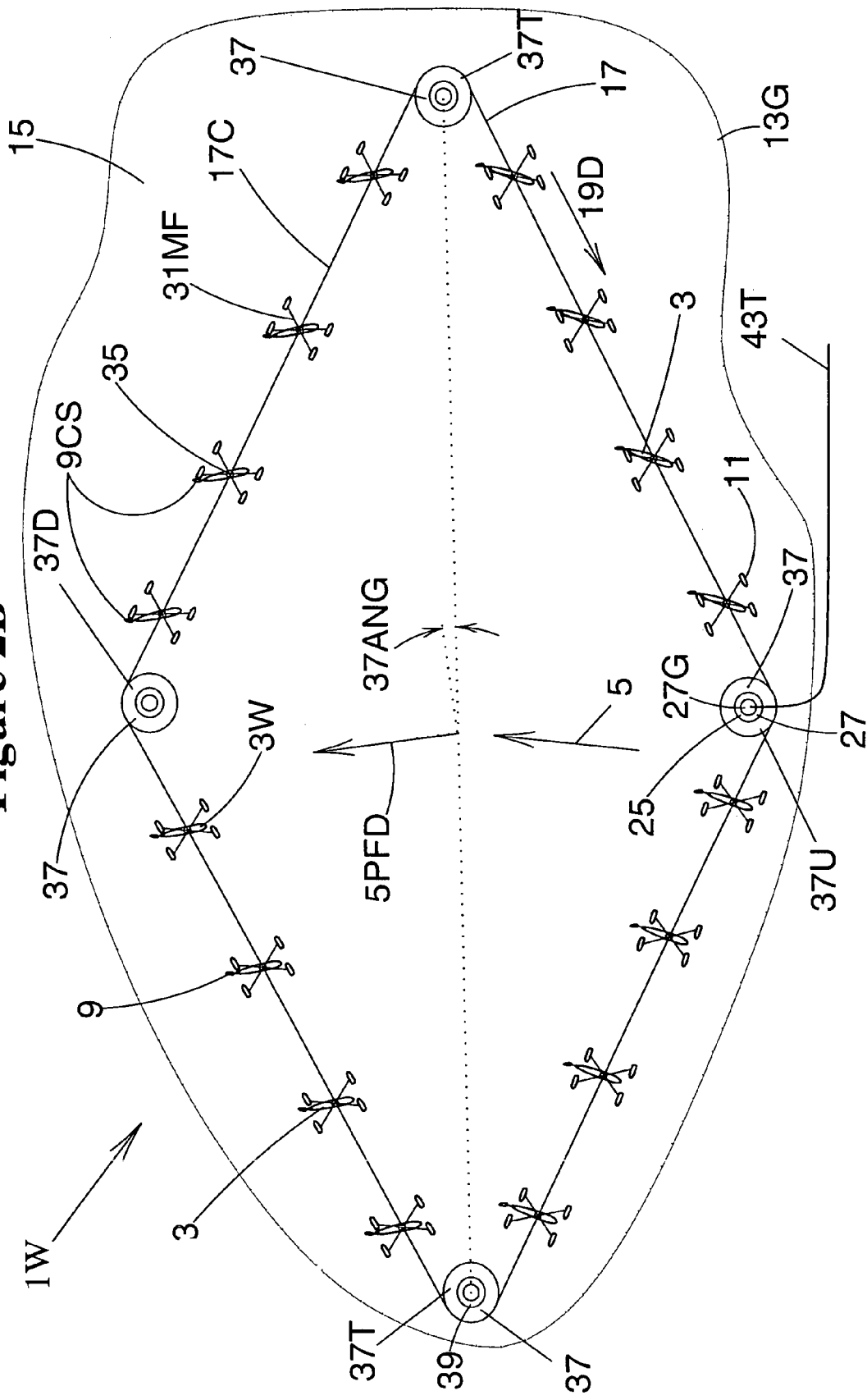
FIG. 2B shows a plan view of the preferred embodiment of FIG. 1, in its entirety.

FIG. 2A shows a plan view or top view of the embodiment illustrated in FIG. 1, and FIG. 2B shows a plan view of the entire wind energy harvesting system 1W, a portion of which is shown in FIGS. 1 and 2A for the purpose of more clearly illustrating the details of this preferred embodiment of the invention.

FIG. 2A illustrates the cable travel direction of motion 19D, for the cable 17C. FIG. 2A also illustrates the wind energy harvesting system 1W, wherein the connecting members 19 include at least one of a fluid-foil base member, beam structural element, tubular structural element, plate structural element, truss structural element, connecting structural element, connecting rod element, inflated structural elements, connecting cable element and connecting tension member (specifically a fluid-foil base member 35 and connecting cable element 3CC which also serves as a connecting tension member 3TM in the illustrated embodiment).

FIG. 2B illustrates the wind energy harvesting system 1W with pulleys 37, including two specific pulleys 37T of the at least two rotatable pulleys 37, that are disposed such that a line connecting their respective centers of rotation is aligned within plus or minus 40 degrees (illustrated angle 37ANG) from a line perpendicular to a time averaged prevailing flow direction 5PFD of the air current 5. The wind energy harvesting system 1W further comprises an additional specific upstream pulley 37U of the at least two ground supported rotatable pulleys 37, which additional specific upstream pulley 37U is located upstream or a negative distance along said time averaged prevailing flow direction 5PFD, relative to either of the two specific pulleys 37T. The wind energy harvesting system 1W further comprises an additional specific downstream pulley 37D of the at least two ground supported rotatable pulleys 37, which additional specific downstream pulley 37D is located downstream or a positive distance along said time averaged prevailing flow direction 5PFD, relative to either of the two specific pulleys 37T. In the wind energy harvesting system 1W shown, the connecting means 17 includes a substantially closed-loop cable 17C linking fluid-foil base members 35 supporting all of said plural fluid-foil means 3 in a closed-loop sequential arrangement with closed periphery topology.

The illustrated means for anchoring 41 serves as part of position-keeping means 23 for maintaining said wind energy harvesting system 1W substantially within a desired geographic envelope 13G, as seen in FIGS. 1 and 2B. Thus in the illustrated wind energy harvesting system 1W of FIGS. 1 and 2B, the closed-loop cable 17C loops around at least two rotatable pulleys 37, and the position-keeping means 23 for maintaining the wind energy harvesting system substantially within a desired geographic envelope includes means for anchoring 41 hubs 39 of the pulleys 37 in at least one of said frozen surface 15 (illustrated) and a ground surface beneath the frozen surface (alternate embodiment).

It will also be clear from FIG. 2B that the substantially closed-loop cable 17C executes a cyclic, substantially periodic motion around a circuit defined by the four total pulleys 37, driven by thrust forces acting on the plural wings 3W each appropriately oriented by the control system means 9 including the control surfaces 9CS. The energy harvesting means 25 harvests energy from this collective cyclic motion of the wings 3W, the base members 35, and the runner-supported movable frames 31MF supported by plural support runner means 11 running on the frozen surface 15. The energy harvesting means 25 include the control system means 9, for converting a portion of the fluid-dynamic kinetic energy (wind energy in the air current 5) into net work on the fluid-foil means 3 over the course of a cycle of substantially periodic motion of the fluid-foil means 3, by utilizing time-variable fluid-dynamic pressure distributions and resulting forces acting on the fluid-foil means 3 at time-variable orientations to contribute to driving this substantially periodic motion when this air current 5 exists and carries wind energy in the form of fluid-dynamic kinetic energy. The energy harvesting means also includes energy conversion means 27, and may include means for transmitting energy 43T.

Thus in the illustrated wind energy harvesting system 1W of FIG. 2B, the closed-loop cable 17C and the plurality of fluid-foil base members 35 together move with the cycle of substantially periodic motion of the fluid-foil means 3, around the at least two rotatable pulleys 37. Also in the illustrated wind energy harvesting system 1W, the energy harvesting means 25 utilizes transfer of some net work from said plurality of fluid-foil members 3, through tension in the closed-loop cable 17C, to rotational work on at least one rotatable pulley 37 (specifically pulley 37U as illustrated); and wherein the energy conversion means 27 comprises generator means 27G for converting said rotational work to energy in a desired form here comprising electrical energy.

In representative embodiment of FIG. 2B the total span of the wind energy harvesting system 1W may range anywhere from 50 feet to 500 feet to 5000 feet to 50000 feet wide, depending on whether the application is for a small-scale, medium-scale, large-scale or mega-scale wind energy harvesting system.

It should be understood that wind energy harvesting systems 1W of varying dimensions, widths, areas, aspect ratios, and geometric layouts can be used within the spirit and scope of the invention as described and claimed.

Thus the preferred embodiment illustrated in FIGS. 1, 2A and 2B provides a wind energy harvesting system 1W, comprising:

plural fluid-foil means 3 for contacting proximate flow fields of an air current 5 when said air current exists and carries wind energy in the form of fluid-dynamic kinetic energy;

control system means 9 for controlling time-variable orientations of said fluid-foil means 3 relative to said proximate flow fields of said air current 5 when said air current exists and carries wind energy in the form of fluid-dynamic kinetic energy;

support runner means 11 for slidably engaging a frozen surface 15 and for contributing to supporting said fluid-foil means 3 substantially above said frozen surface 15;

connecting means 17 for connecting said plural fluid-foil means 3 in a sequential arrangement, including connecting members 19 that connect adjacently-located fluid-foil means in said sequential arrangement;

position-keeping means 23 for maintaining said wind energy harvesting system 1W substantially within a desired geographic envelope 13G; and energy harvesting means 25 including said control system means 9, for converting a portion of said fluid-dynamic kinetic energy into net work on said fluid-foil means 3 over the course of a cycle of substantially periodic motion of said fluid-foil means 3, by utilizing time-variable fluid-dynamic pressure distributions and resulting forces acting on said fluid-foil means 3 at said time-variable orientations to contribute to driving said substantially periodic motion when said air current 5 exists and carries wind energy in the form of fluid-dynamic kinetic energy;

said energy harvesting means 25 further including energy conversion means 27 for converting at least some of said net work into energy in a desired form for at least one of transmission, storage, processing and use.

The preferred embodiment illustrated in FIGS. 1, 2A and 2B also provides a wind energy harvesting system 1W, comprising:

plural fluid-foil means 3 for contacting proximate flow fields of an air current 5 when said air current exists and carries wind energy in the form of fluid-dynamic kinetic energy;

control system means 9 for controlling time-variable orientations of said fluid-foil means 3 relative to said proximate flow fields of said air current 5 when said air current exists and carries wind energy in the form of fluid-dynamic kinetic energy;

support runner means 11 comprising at least one of a ski, a snowboard, a sled, a skate, a runner, an inflatable tube, a pontoon, and a hull with runners, for slidably engaging a frozen surface 15 comprising at least one of a snow surface, an ice surface and a frozen water surface, and for contributing to supporting said fluid-foil means 3 substantially above said frozen surface 15;

connecting means 17 for connecting said plural fluid-foil means 3 in a sequential arrangement, including connecting members 19 that connect adjacently-located fluid-foil means in said sequential arrangement;

position-keeping means 23 for maintaining said wind energy harvesting system 1W substantially within a desired geographic envelope 13G; and energy harvesting means 25 including said control system means 9, for converting a portion of said fluid-dynamic kinetic energy into net work on said fluid-foil means 3 over the course of a cycle of substantially periodic motion of said fluid-foil means, by utilizing time-variable fluid-dynamic pressure distributions and resulting forces acting on said fluid-foil means 3 at said time-variable orientations to contribute to driving said substantially periodic motion when said air current 5 exists and carries wind energy in the form of fluid-dynamic kinetic energy;

said energy harvesting means 25 further including energy conversion means 27 for converting at least some of said net work into energy in a desired form for at least one of transmission, storage, processing and use.

The preferred embodiment illustrated in FIGS. 1, 2A and 2B also provides a wind energy harvesting system 1W, comprising:

plural fluid-foil means 3 for contacting proximate flow fields of an air current 5 when said air current exists and carries wind energy in the form of fluid-dynamic kinetic energy;

control system means 9 for controlling time-variable orientations of said fluid-foil means 3 relative to said proximate flow fields of said air current 5 when said air current exists and carries wind energy in the form of fluid-dynamic kinetic energy;

plural support runner means 11 for slidably engaging a frozen surface 15 and for contributing to supporting said plural fluid-foil means 3 substantially above said frozen surface 15;

connecting means 17 for connecting said plural fluid-foil means 3 in a sequential arrangement of closed periphery topology, including connecting members 19 that connect adjacently-located fluid-foil means in said sequential arrangement;

position-keeping means 23 for maintaining said wind energy harvesting system 1W substantially within a desired geographic envelope 13G; and energy harvesting means 25 including said control system means 9, for converting a portion of said fluid-dynamic kinetic energy into net work on said fluid-foil means 3 over the course of a cycle of substantially periodic motion of said fluid-foil means, by utilizing time-variable fluid-dynamic pressure distributions and resulting forces acting on said fluid-foil means 3 at said time-variable orientations to contribute to driving said substantially periodic motion when said air current 5 exists and carries wind energy in the form of fluid-dynamic kinetic energy;

said energy harvesting means 25 further including energy conversion means 27 for converting at least some of said net work into energy in a desired form for at least one of transmission, storage, processing and use;

wherein said energy conversion means 27 includes a rotating member 27R driven to rotational motion by said motion of said fluid-foil means 3, which rotating member 27R is rotatable around a nonrotating hub member 27H substantially anchored to at least one of said frozen surface 15 and a ground surface beneath said frozen surface 15, and which energy conversion means further includes generator means 27G for generating electrical power from the rotational motion of said rotating member 27R relative to said nonrotating hub 27H.

Some representative geographic locations for the embodiment of the invention illustrated in FIGS. 1, 2A and 2B include frozen surfaces (ice, snow, slush snow, frost and other variants and combinations) that may be present year-round or in winter seasons in places at higher latitudes and/or altitudes such as Canada and the United States, Chile and Argentina, Kalaallit Nunaat, Europe and Northern Asia, New Zealand/Australia/Southern Oceania, Antarctica, high altitude locations worldwide; and such as off the shores of Northern Canada, Northern Russia, Kalaallit Nunaat (Greenland), Spitzbergen, and Antarctica; and such as on the surfaces of lakes and rivers that freeze solid in wintertime such as parts of the Great Lakes (Superior, Michigan, Huron, etc), Lake of the Woods, Teshekpuk Lake, Elson Lagoon, Simpson Lagoon, Beaufort Lagoon, Great Bear Lake, Great Slave Lake, Lake Athabasca, Lake Winnipeg, Lake Nipigon, L. Vanern, L. Oulujarvi, Lake Ladoga, Lake Onega, Mackenzie River, St. Lawrence River, Ob River, Yenisey River, and Lena River. Locations can also include ice caps (such as the Greenland and Antarctic ice caps and the Barnes and Penny Ice Caps in Canada), ice shelves (such as the Ross, Ronne, Larsen, Abbot, Amery & Cook ice shelves around Antarctica), ice fields (such as the Sargent and Harding and Bagley icefields in Alaska) and glaciers worldwide. This list of representative locations should not be construed to be limiting.

In the embodiment of FIGS. 1, 2A and 2B, the air current 5 comprises at least one of a wind, a gust, a mass flow of air, a volume flow of air, and a fluid-dynamic air movement induced by meteorological effects including but not limited to pressure differential effects. Also in the illustrated embodiment of FIGS. 1, 2A and 2B, the presence of said frozen surface 15 serves as friction-reducing means for reducing frictional forces that act to oppose movement of said plural support runner means 11 and the corresponding plural fluid-foil means 3, relative to an alternate condition wherein said frozen surface is absent. It is well known that a runner such as a skate running on an ice surface has very low friction or drag, because the local pressure under the runner produces a thin film of liquid water that lubricates its motion over the ice surface. Similarly, it is well known that skis, sleds and similar sliding surfaces can slide over a snow surface with very low friction. The underside of a runner or ski may have an appropriate low friction coating applied, such as for instance ski wax.

FIG. 2C shows how a plurality of wind energy harvesting systems 1W of the configuration shown in FIG. 2B, can be arranged in a lattice or matrix arrangement comprising a diamond shaped space filling array in this illustrated embodiment. A rectangular array, triangular array, or other array type could be used in alternate embodiments, within the spirit and scope of the invention. Each wind energy harvesting system 1W is wider than it is long relative to a prevailing wind direction or prevailing flow direction 5PFD, to maximize wind power harvesting when the wind is blowing in this direction and the wings generate large thrust values well aligned with the cable direction for a larger portion of the cable circuit. However, note from the lattice arrangement that these wind energy harvesting systems will be able to intersect and capture energy from wind coming from any direction, not just the prevailing flow direction 5PFD. In variant embodiments the spacing between the wind energy harvesting systems 1W can be increased or decreased, with a benefit of reduced shadowing losses when the spacing is increased, and with a benefit of increased power production per square mile of frozen surface area when the spacing is decreased.

Figure 2D:
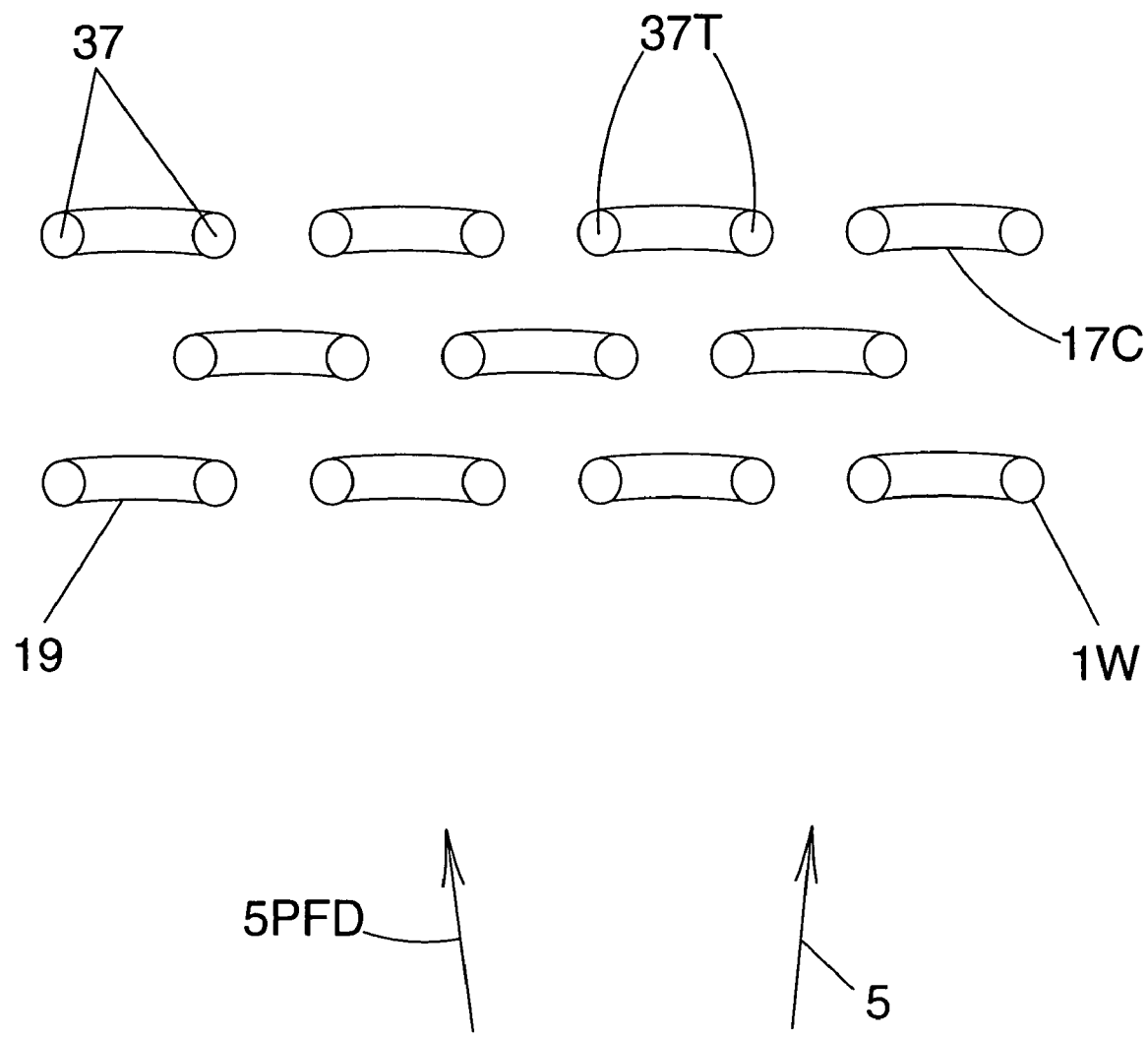
FIG. 2D shows an alternate embodiment of the invention, wherein each wind energy harvesting system 1W has two rotatable pulleys.

FIG. 2D shows an alternate embodiment of the invention, wherein each wind energy harvesting system 1W has rotatable pulleys 37 comprising just two specific pulleys 37T, that are disposed such that a line connecting their respective centers of rotation is aligned within plus or minus 40 degrees from a line perpendicular to a time averaged prevailing flow direction 5PFD of the air current 5. This configuration is designed to work well in regions where there is a strong prevailing wind direction with little variation over time. An example of such a location would be the Cook Ice Cap on Kerguelen Island in the South Indian Ocean, where there is a very strong prevailing westerly wind, the "howling fifties" that prevail year-around in the general vicinity of 50 degrees south latitude.

Figure 2E:
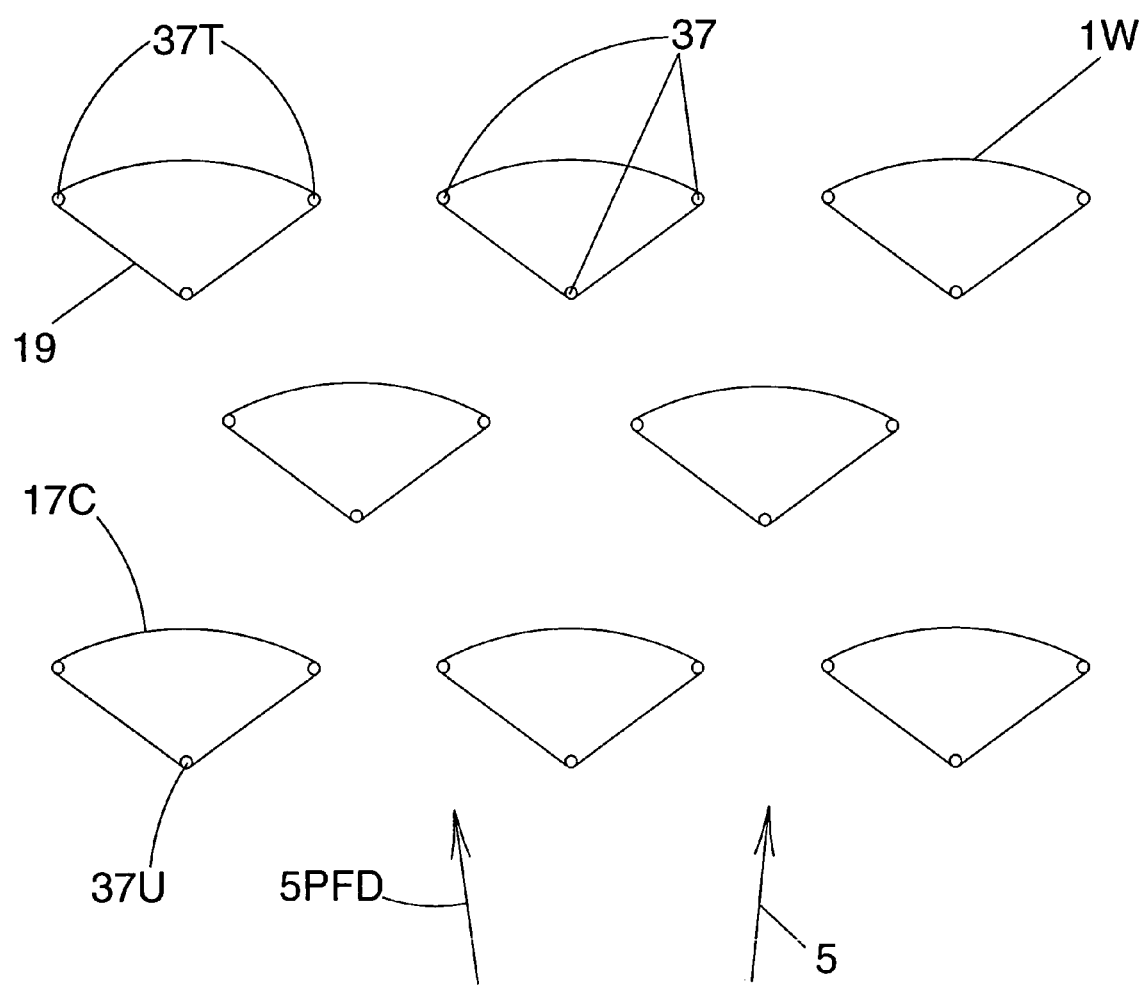
FIG. 2E shows an alternate embodiment of the invention, wherein each wind energy harvesting system 1W has three rotatable pulleys.

FIG. 2E shows an alternate embodiment of the invention wherein each wind energy harvesting system 1W has three rotatable pulleys 37, comprising the two specific pulleys 37T that are disposed such that a line connecting their respective centers of rotation is aligned within plus or minus 40 degrees from a line perpendicular to a time averaged prevailing flow direction 5PFD of the air current 5, and an additional specific upstream pulley 37U of the at least two ground supported rotatable pulleys 37, which additional specific upstream pulley 37U is located upstream or a negative distance along said time averaged prevailing flow direction 5PFD, relative to either of the two specific pulleys 37T. Note that the lattice array in which the wind energy harvesting systems 1W are arranged, is a triangular space filling array in this embodiment. While the embodiment of FIG. 2E has one more pulley per wind energy harvesting system 1W than the embodiment of FIG. 2D, it has the balancing benefit of being better able to harvest wind energy for times when the wind direction is roughly perpendicular to the prevailing wind direction.

Figure 2F:
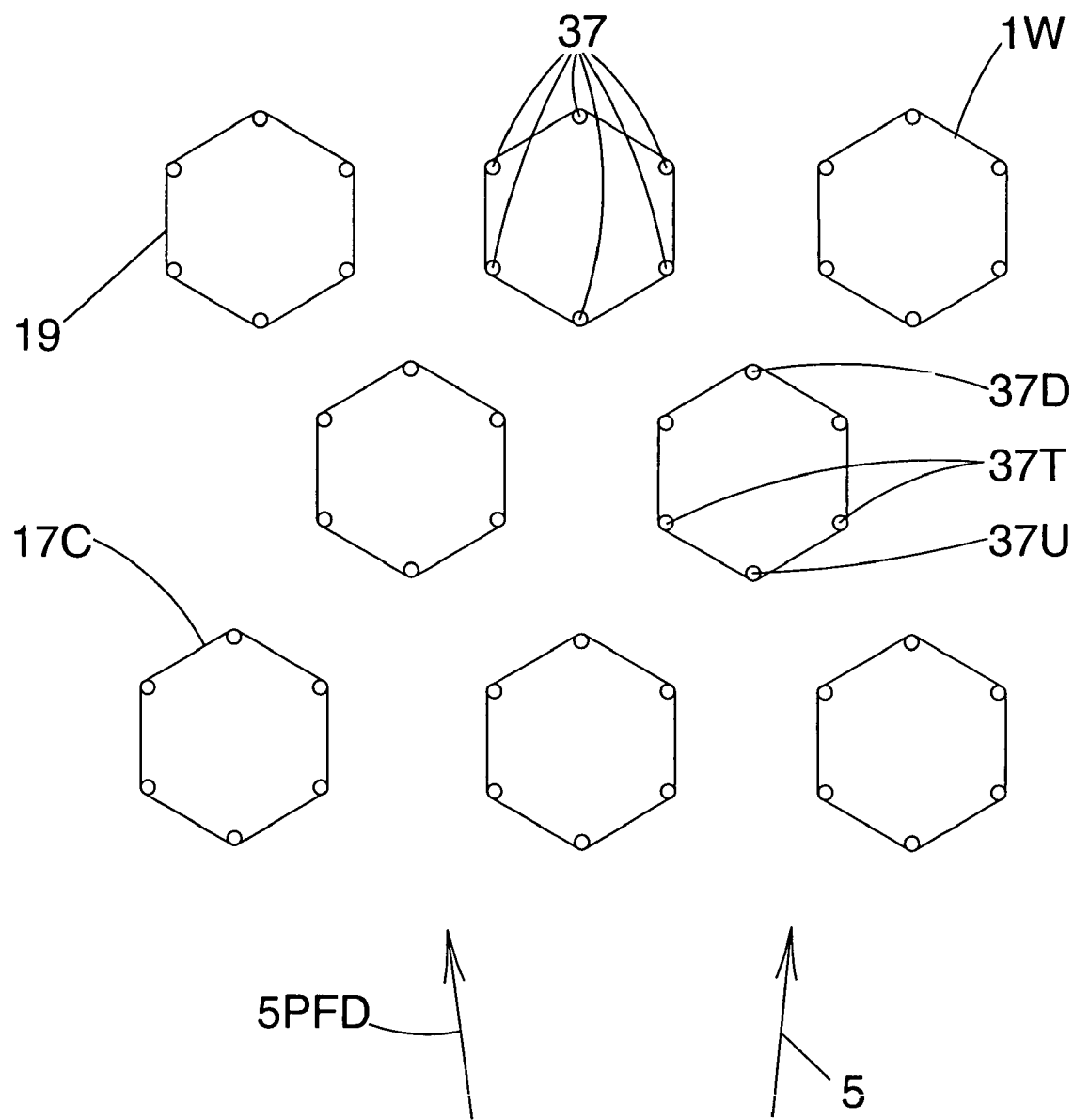
FIG. 2F shows an alternate embodiment of the invention, wherein each wind energy harvesting system 1W has six rotatable pulleys.

FIG. 2F shows an alternate embodiment of the invention wherein the wind energy harvesting systems 1W have a hexagonal configuration and are arranged in a hexagonal array, which may be advantageous to provide effective wind power harvesting in regions where there is no significant prevailing direction of the wind. As illustrated, each wind energy harvesting system 1W has six rotatable pulleys 37, including (i) two specific pulleys 37T, that are disposed such that a line connecting their respective centers of rotation is aligned within plus or minus 40 degrees from a line perpendicular to a time averaged prevailing flow direction 5PFD of the air current 5; (ii) an additional specific upstream pulley 37U of the at least two ground supported rotatable pulleys 37, which additional specific upstream pulley 37U is located upstream or a negative distance along said time averaged prevailing flow direction 5PFD, relative to either of the two specific pulleys 37T; and (iii) an additional specific downstream pulley 37D of the at least two ground supported rotatable pulleys 37, which additional specific downstream pulley 37D is located downstream or a positive distance along said time averaged prevailing flow direction 5PFD, relative to either of the two specific pulleys 37T.

Relative to the embodiment illustrated in FIG. 2F, note that still other embodiments may have one or the other of a hexagonal configuration or a hexagonal array, but not both.

Figure 3A:
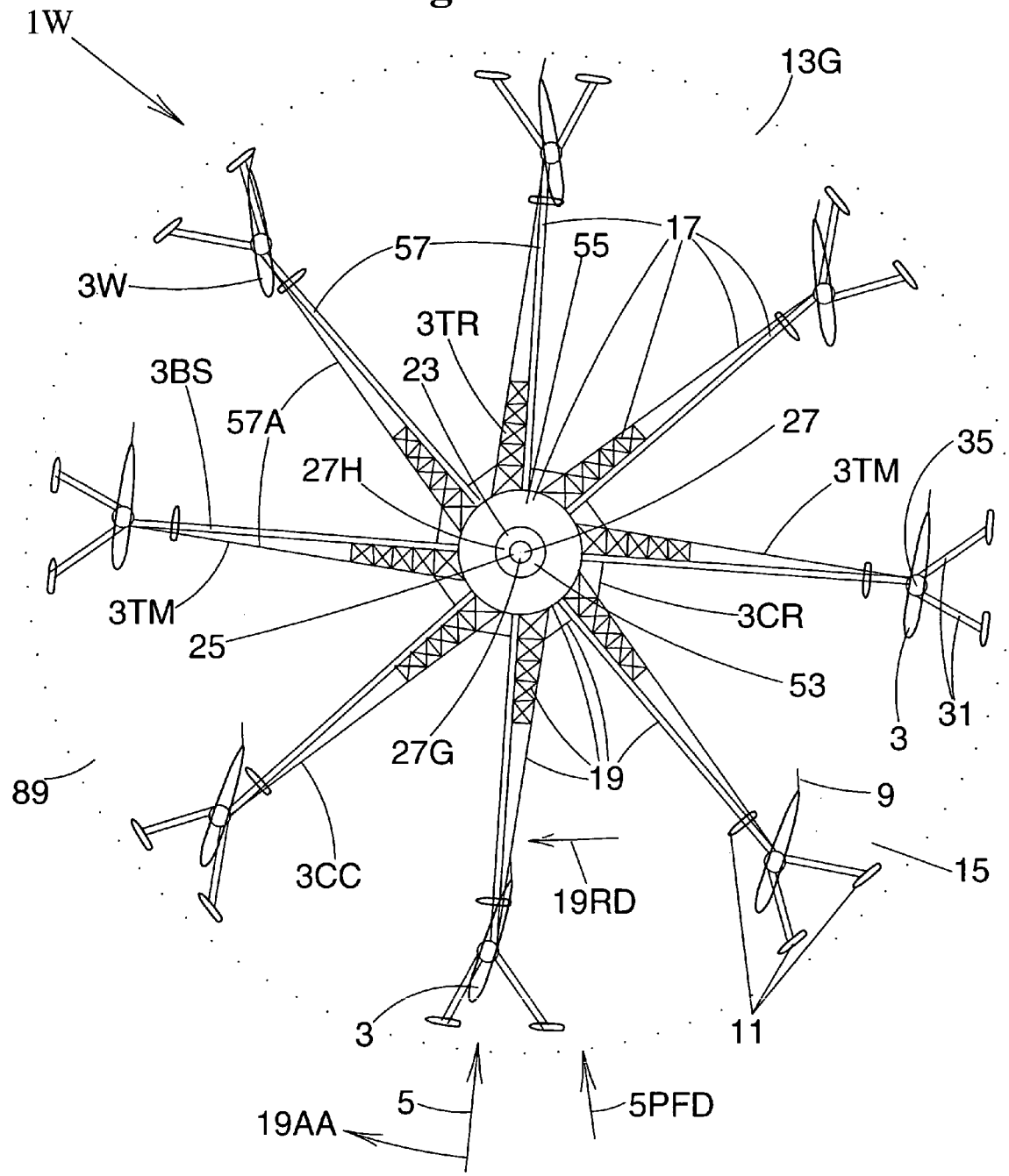
FIG. 3A shows an alternate embodiment that utilizes radial arm structure to connect wind harvesting fluid foils around a rotating hub.

FIG. 3A illustrates a different preferred embodiment of the invention, relative to the embodiments shown in FIGS. 1 and 2A through 2F. The embodiment of FIG. 3A utilizes radial arm structure such as spokes to connect wind harvesting fluid foils around a rotating hub, and does not need the rotatable pulleys 37 or the substantially closed-loop cable 17C.

More specifically, in the embodiment of FIG. 3A a nonrotating hub 53 is anchored in a frozen surface 15 and/or could be anchored to a ground surface 89 beneath the frozen surface (either directly beneath or optionally separated by a layer of liquid water, not shown). A rotatable structure 55 is bearing mounted to be able to rotate around the nonrotating hub 53. The rotatable structure 55 has radial, spoke-like members that project outwards to structurally connect to fluid-foil base members 35 that support fluid-foil means 3 such as upwardly projecting wings 3W. The wind energy harvesting system 1W shown in FIG. 3A has connecting members 19 that include at least one of a fluid-foil base member 35 (included), beam structural element 3BS (included), tubular structural element, plate structural element, truss structural element 3TR (included), connecting structural element, connecting rod element 3CR (included), inflated structural elements, connecting cable element 3CC (included) and connecting tension member 3TM (included).

The fluid-foil base members 35 are supported by support runner means 11 through connecting structure 31. In the illustrated embodiment eight fluid-foil members are shown, but in alternate variant embodiments of this class any number of fluid-foil members could be used, within the spirit and scope of the invention. The entire assembly of fluid-foil means, fluid-foil base members, connecting structure, support runner means, spoke-like members and rotatable structure is rotated in cyclic motion around the nonrotating hub in a rotational direction of motion 19RD, driven by wind forces acting on the fluid-foil means 3 such as wings 3W, which are varied in angle of attack as a function of wind direction and relative azimuth location of each wing at any given time. FIG. 3A illustrates azimuthal angle 19AA along the rotational direction of motion 19RD, starting with zero angle at incoming flow direction 5FD. While the illustrated sense of rotation is clockwise, in alternate embodiments counterclockwise rotation may be used, and for systems of plural wind energy harvesting systems 1W, some might rotate clockwise and others counterclockwise, in optimized arrangements for power extraction and reducing net induced vorticity in the downstream wind current.

In the illustrated embodiment of FIG. 3A, the presence of said frozen surface 15 serves as friction-reducing means for reducing frictional forces that act to oppose movement of said plural support runner means 11 and the corresponding plural fluid-foil means 3, relative to an alternate condition wherein said frozen surface is absent.

The wind energy harvesting system 1W in FIG. 3A utilizes energy from an air current 5 which comprises at least one of a wind, a gust, a mass flow of air, a volume flow of air, and a fluid-dynamic air movement induced by meteorological effects including but not limited to pressure differential effects. Energy harvesting means 25 includes energy conversion means 27 located at or near the nonrotating hub 53.

Thus FIG. 3A shows a wind energy harvesting system 1W, wherein the position-keeping means 23 for maintaining said wind energy harvesting system 1W substantially within a desired geographic envelope 13G comprises use of a nonrotating hub 53 anchored in at least one of said frozen surface 15 and a ground surface 89 beneath said frozen surface 15, and a rotatable structure 55 surrounding said hub 53, said rotatable structure 55 including a plurality of radial members 57 serving towards connecting said plurality of fluid-foil means 3 to said hub 53. The radial members 57 can in various related embodiments be at least one of spoke-like elements, radial spokes, angled spokes, tension elements, and angled tension elements. In the wind energy harvesting system 1W as illustrated, the energy conversion means 27 comprises generator means 27G for generating electrical power from the rotation of said rotatable structure 55 around said nonrotating hub 53.

FIG. 3A illustrates a wind energy harvesting system 1W, comprising:

plural fluid-foil means 3 for contacting proximate flow fields of an air current 5 when said air current exists and carries wind energy in the form of fluid-dynamic kinetic energy;

control system means 9 for controlling time-variable orientations of said fluid-foil means 3 relative to said proximate flow fields of said air current 5 when said air current exists and carries wind energy in the form of fluid-dynamic kinetic energy;

support runner means 11 for slidably engaging a frozen surface 15 and for contributing to supporting said fluid-foil means 3 substantially above said frozen surface 15;

connecting means 17 for connecting said plural fluid-foil means 3 in a sequential arrangement, including connecting members 19 that connect adjacently-located fluid-foil means in said sequential arrangement;

position-keeping means 23 for maintaining said wind energy harvesting system 1W substantially within a desired geographic envelope 13G; and energy harvesting means 25 including said control system means 9, for converting a portion of said fluid-dynamic kinetic energy into net work on said fluid-foil means 3 over the course of a cycle of substantially periodic motion of said fluid-foil means 3, by utilizing time-variable fluid-dynamic pressure distributions and resulting forces acting on said fluid-foil means 3 at said time-variable orientations to contribute to driving said substantially periodic motion when said air current 5 exists and carries wind energy in the form of fluid-dynamic kinetic energy;

said energy harvesting means 25 further including energy conversion means 27 for converting at least some of said net work into energy in a desired form for at least one of transmission, storage, processing and use.

FIG. 3A also illustrates a wind energy harvesting system 1W, comprising:

plural fluid-foil means 3 for contacting proximate flow fields of an air current 5 when said air current exists and carries wind energy in the form of fluid-dynamic kinetic energy;

control system means 9 for controlling time-variable orientations of said fluid-foil means 3 relative to said proximate flow fields of said air current 5 when said air current exists and carries wind energy in the form of fluid-dynamic kinetic energy;

support runner means 11 comprising at least one of a ski, a snowboard, a sled, a skate, a runner, an inflatable tube, a pontoon, and a hull with runners, for slidably engaging a frozen surface 15 comprising at least one of a snow surface, an ice surface and a frozen water surface, and for contributing to supporting said fluid-foil means 3 substantially above said frozen surface 15;

connecting means 17 for connecting said plural fluid-foil means 3 in a sequential arrangement, including connecting members 19 that connect adjacently-located fluid-foil means in said sequential arrangement;

position-keeping means 23 for maintaining said wind energy harvesting system 1W substantially within a desired geographic envelope 13G; and energy harvesting means 25 including said control system means 9, for converting a portion of said fluid-dynamic kinetic energy into net work on said fluid-foil means 3 over the course of a cycle of substantially periodic motion of said fluid-foil means, by utilizing time-variable fluid-dynamic pressure distributions and resulting forces acting on said fluid-foil means 3 at said time-variable orientations to contribute to driving said substantially periodic motion when said air current 5 exists and carries wind energy in the form of fluid-dynamic kinetic energy;

said energy harvesting means 25 further including energy conversion means 27 for converting at least some of said net work into energy in a desired form for at least one of transmission, storage, processing and use.

FIG. 3A also illustrates a wind energy harvesting system 1W, comprising:

plural fluid-foil means 3 for contacting proximate flow fields of an air current 5 when said air current exists and carries wind energy in the form of fluid-dynamic kinetic energy;

control system means 9 for controlling time-variable orientations of said fluid-foil means 3 relative to said proximate flow fields of said air current 5 when said air current exists and carries wind energy in the form of fluid-dynamic kinetic energy;

plural support runner means 11 for slidably engaging a frozen surface 15 and for contributing to supporting said plural fluid-foil means 3 substantially above said frozen surface 15;

connecting means 17 for connecting said plural fluid-foil means 3 in a sequential arrangement of closed periphery topology, including connecting members 19 that connect adjacently-located fluid-foil means in said sequential arrangement;

position-keeping means 23 for maintaining said wind energy harvesting system 1W substantially within a desired geographic envelope 13G; and energy harvesting means 25 including said control system means 9, for converting a portion of said fluid-dynamic kinetic energy into net work on said fluid-foil means 3 over the course of a cycle of substantially periodic motion of said fluid-foil means, by utilizing time-variable fluid-dynamic pressure distributions and resulting forces acting on said fluid-foil means 3 at said time-variable orientations to contribute to driving said substantially periodic motion when said air current 5 exists and carries wind energy in the form of fluid-dynamic kinetic energy;

said energy harvesting means 25 further including energy conversion means 27 for converting at least some of said net work into energy in a desired form for at least one of transmission, storage, processing and use;

wherein said energy conversion means 27 includes a rotating member 27R driven to rotational motion by said motion of said fluid-foil means 3, which rotating member 27R is rotatable around a nonrotating hub member 27H substantially anchored to at least one of said frozen surface 15 and a ground surface beneath said frozen surface 15, and which energy conversion means further includes generator means 27G for generating electrical power from the rotational motion of said rotating member 27R relative to said nonrotating hub 27H.

Figure 3B:
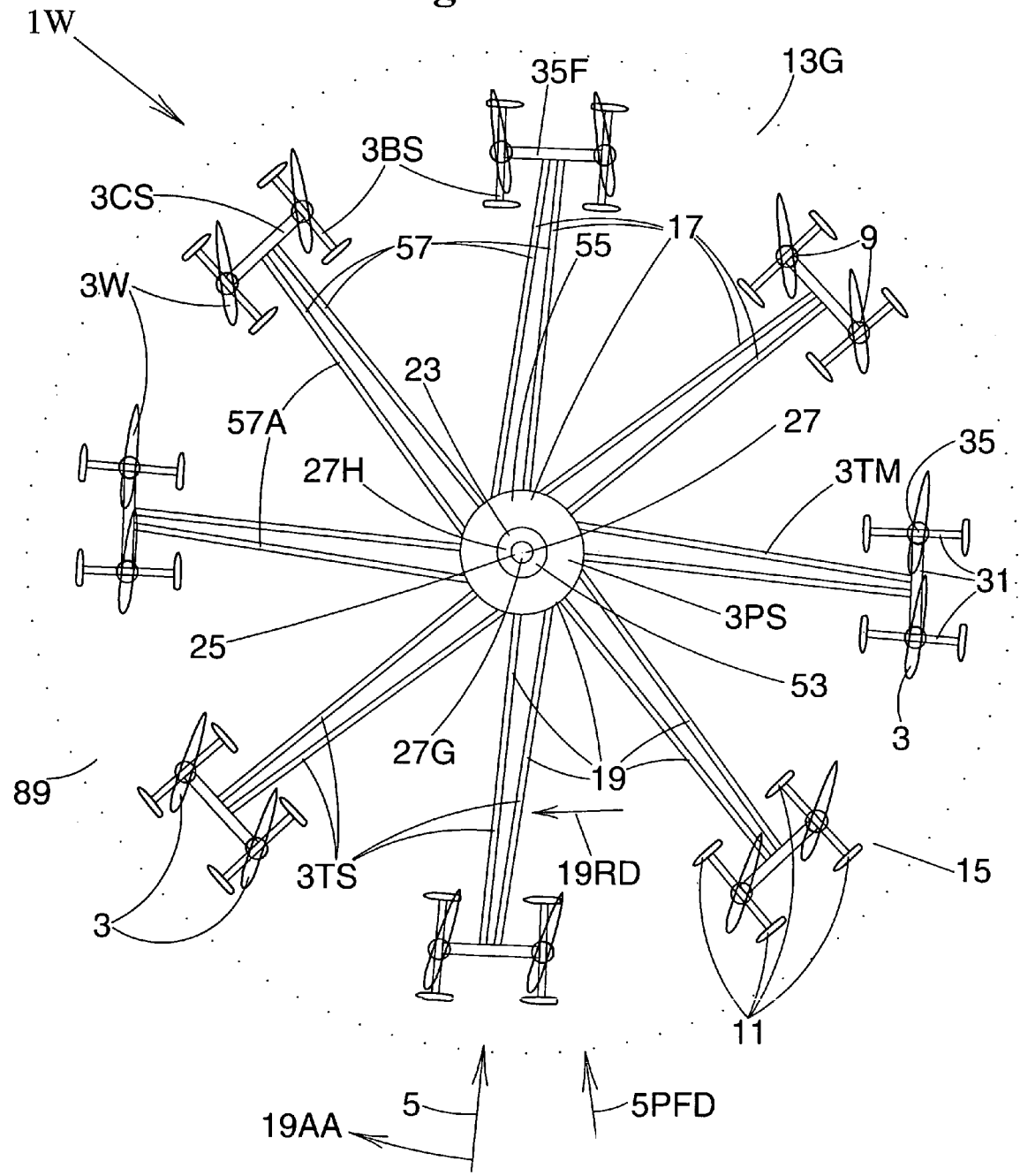
FIG. 3B illustrates another preferred embodiment of the invention, of the same general class of embodiments as that shown in FIG. 3A.

FIG. 3B illustrates another preferred embodiment of the invention, of the same general class of embodiments as shown in FIG. 3A. In this embodiment each pair of fluid-foil means 3 such as wings 3W, is supported by a base frame structure 35F supporting the two fluid-foil means 3 each via its fluid-foil base member 35. Control system means 9 include actuator means in the fluid-foil base members 35 to control the angular orientation and thus control angle of attack of the wings 3W, according to an appropriate schedule, algorithm or function of input variables/signals, as the wings 3W execute their cyclic motion around the nonrotating hub member 27H. The base frame structure 35F includes 2 legs and 2 support runner means 11 under each of the fluid foil means 3, adding up for each base frame structure 35F, a total of 4 legs all structurally connected and 4 support runners here connected one each to a leg. The two pairs of legs are connected by a connecting structural element 3CS. Varying numbers of fluid-foils, legs and support runners can be associated with each base frame structure, in alternate embodiments of the invention.

The wind energy harvesting system 1W shown in FIG. 3B has connecting members 19 that include a fluid-foil base member 35, a tubular structural element 3TS, a plate structural element 3PS, and a connecting structural element 3CS. The tubular structural elements 3TS in the embodiment of FIG. 3B replace the beam, truss and tension member structural elements performing a similar function in FIG. 3A. The various structural elements may be made of metallic, composite, plastic or other material systems singly or in combination. Advanced composite structures such as ply-tailored composite tubular structural elements may be used in one exemplary version of this embodiment, to meet design load conditions with a lightweight structure at low cost (including material cost and fabrication cost). Further combinations of structural materials, structural elements, and structural arrangements are possible within the spirit and scope of the invention as claimed.

The wind energy harvesting system 1W shown in FIG. 3B further illustrates position-keeping means 23 for maintaining said wind energy harvesting system 1W substantially within a desired geographic envelope 13G, which comprises use of a nonrotating hub 53 anchored in at least one of said frozen surface 15 and a ground surface 89 beneath said frozen surface 15, and a rotatable structure 55 surrounding said hub 53, said rotatable structure 55 including a plurality of radial members 57 serving towards connecting said plurality of fluid-foil means 3 to said hub 53. The radial members 57 in turn comprise at least one of spoke-like elements, radial spokes, angled spokes, tension elements, and angled tension elements, in variant preferred embodiments within the same family as the illustrated preferred embodiment of the invention.

The wind energy harvesting system 1W of FIG. 3B further illustrates energy conversion means 27 which comprises generator means 27G for generating electrical power from the rotation of said rotatable structure 55 around said nonrotating hub 53. The rotational direction of motion 19RD may be clockwise or counterclockwise in different variants of the invention, and a field of multiple wind energy harvesting systems may have some rotating clockwise and others counterclockwise, to enhance efficient energy harvesting and reduce induced vorticity in the atmosphere.

Some representative geographic locations for the embodiments of the invention illustrated in FIGS. 3A and 3B include frozen surfaces (ice, snow, slush snow, frost and other variants and combinations) that may be present year-round or in winter seasons in places at higher latitudes and/or altitudes such as Canada and the United States, Chile and Argentina, Kalaallit Nunaat, Europe and Northern Asia, New Zealand/Australia/Southern Oceania, Antarctica, high altitude locations worldwide; and such as off the shores of Northern Canada, Northern Russia, Kalaallit Nunaat (Greenland), Spitzbergen, and Antarctica; and such as on the surfaces of lakes and rivers that freeze solid in wintertime such as parts of the Great Lakes (Superior, Michigan, Huron, etc), Lake of the Woods, Teshekpuk Lake, Elson Lagoon, Simpson Lagoon, Beaufort Lagoon, Great Bear Lake, Great Slave Lake, Lake Athabasca, Lake Winnipeg, Lake Nipigon, L. Vanern, L. Oulujarvi, Lake Ladoga, Lake Onega, Mackenzie River, St. Lawrence River, Ob River, Yenisey River, and Lena River. This list of representative locations should not be construed to be limiting.

Figure 3C:
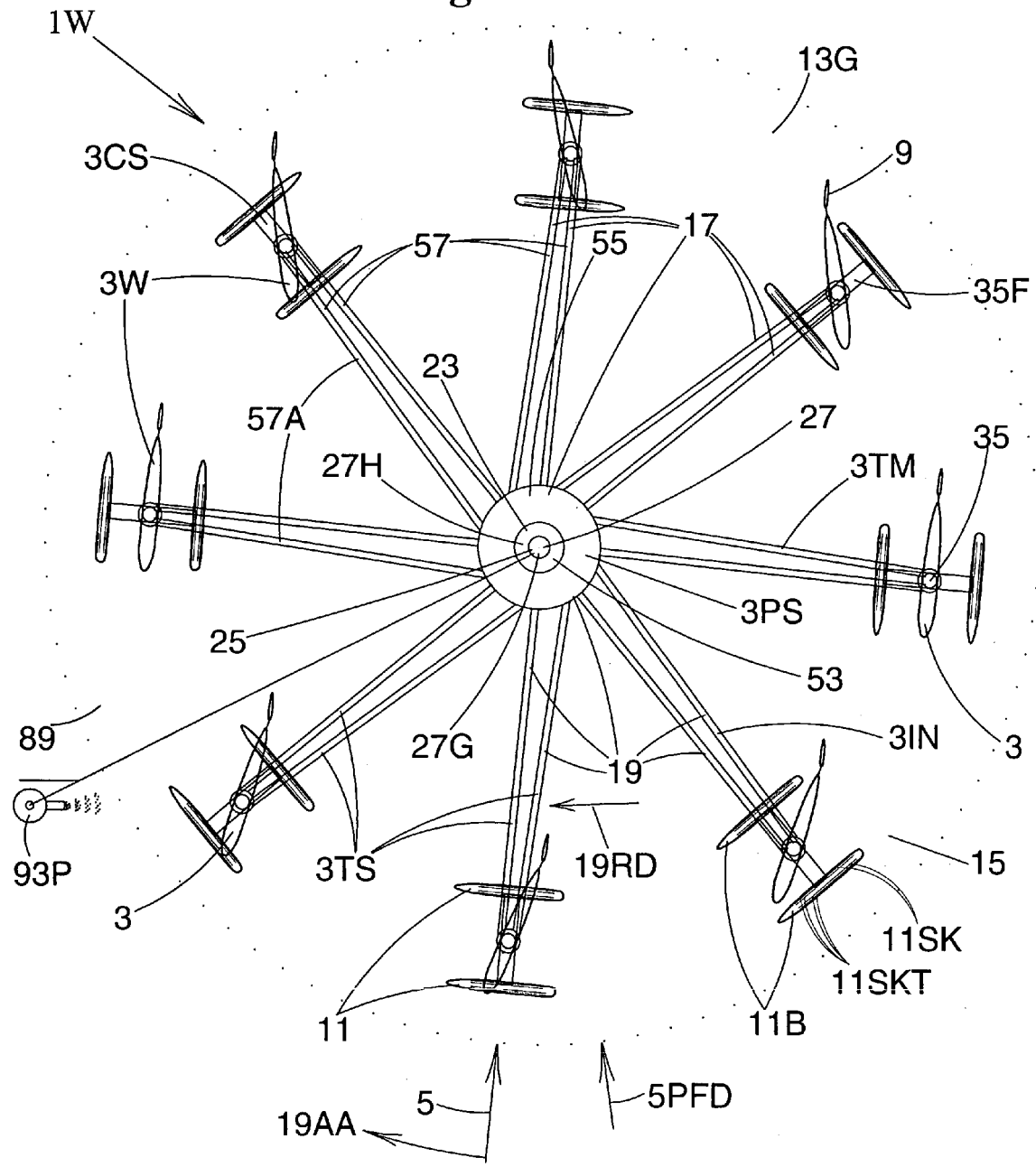
FIG. 3C shows another preferred embodiment of the invention of a similar genus to those of FIGS. 3A and 3B, now fitted with buoyant support runner means.

FIG. 3C shows another preferred embodiment of the invention of a similar genus to those of FIGS. 3A and 3B, now fitted with support runner means 11 comprising buoyant support runner means 11B. The illustrated buoyant support runner means comprise catamaran hulls with dual side-by-side runners under each catamaran hull. Each runner has ice skate members comprising skates 11SKT (for minimum friction running on an ice surface) straddling ski type members comprising skis 11SK (for minimum friction running on a snow surface). Thus the buoyant support runner means will provide low friction means for running on a variety of surfaces including ice, snow, slush, water with frazil ice and/or ice pancakes and/or nilas ice and/or columnar ice, sea ice, ice with surface frost flowers, ice with surface pressure ridges (unless they are too tall), ice floes, porridge ice, black ice, pack ice, lake ice, melt ponds, liquid water and any combinations of these. Some representative geographic locations for this type of embodiment include off the shores of Northern Canada, Northern Russia, Kalaallit Nunaat (Greenland), Spitzbergen, and Antarctica; and on the surfaces of lakes and rivers that freeze solid in wintertime such as parts of the Great Lakes (Superior, Michigan, Huron, etc), Lake of the Woods, Teshekpuk Lake, Elson Lagoon, Simpson Lagoon, Beaufort Lagoon, Great Bear Lake, Great Slave Lake, Lake Athabasca, Lake Winnipeg, Lake Nipigon, L. Vanern, L. Oulujarvi, Lake Ladoga, Lake Onega, Mackenzie River, St. Lawrence River, Ob River, Yenisey River, and Lena River. This list of representative locations should not be construed to be limiting.

An embodiment such as that of FIG. 3C also has a potential advantage in that it can be assembled at one geographic location, then towed by a tugboat or similar means to the installation site, in the summer when the water along the way is liquid, then installed by underwater cables at the desired site. As winter comes on, the surface of the water will freeze, and the device will rise to sit on the ice/snow surface and can spin faster powered by the wings or airfoils, with lower friction from the ice or snow runners than from the water hulls floating and moving on liquid water.

The wind energy harvesting system 1W shown in FIG. 3C further illustrates position-keeping means 23 for maintaining said wind energy harvesting system 1W substantially within a desired geographic envelope 13G, which comprises use of a nonrotating hub 53 anchored in at least one of said frozen surface 15 and a ground surface 89 beneath said frozen surface 15, and a rotatable structure 55 surrounding said hub 53, said rotatable structure 55 including a plurality of radial members 57 serving towards connecting said plurality of fluid-foil means 3 to said hub 53.

The wind energy harvesting system 1W shown in FIG. 3C also has connecting members 19 that include a fluid-foil base member 35 and inflated structural element 3IN, where the tubular structural element 3TM is inflated to above ambient pressure in the illustrated embodiment.

The wind energy harvesting system 1W of FIG. 3C further illustrates energy conversion means 27 which comprises generator means 27G for generating electrical power from the rotation of said rotatable structure 55 around said nonrotating hub 53.

The wind energy harvesting system 1W of FIG. 3C further illustrates means for utilizing at least some portion of the energy in a desired form from the energy conversion means 27, to run pump means 93P for pumping liquid water to create at least one of ice and artificial snow for deposition on the frozen surface 15.

Figure 3D:
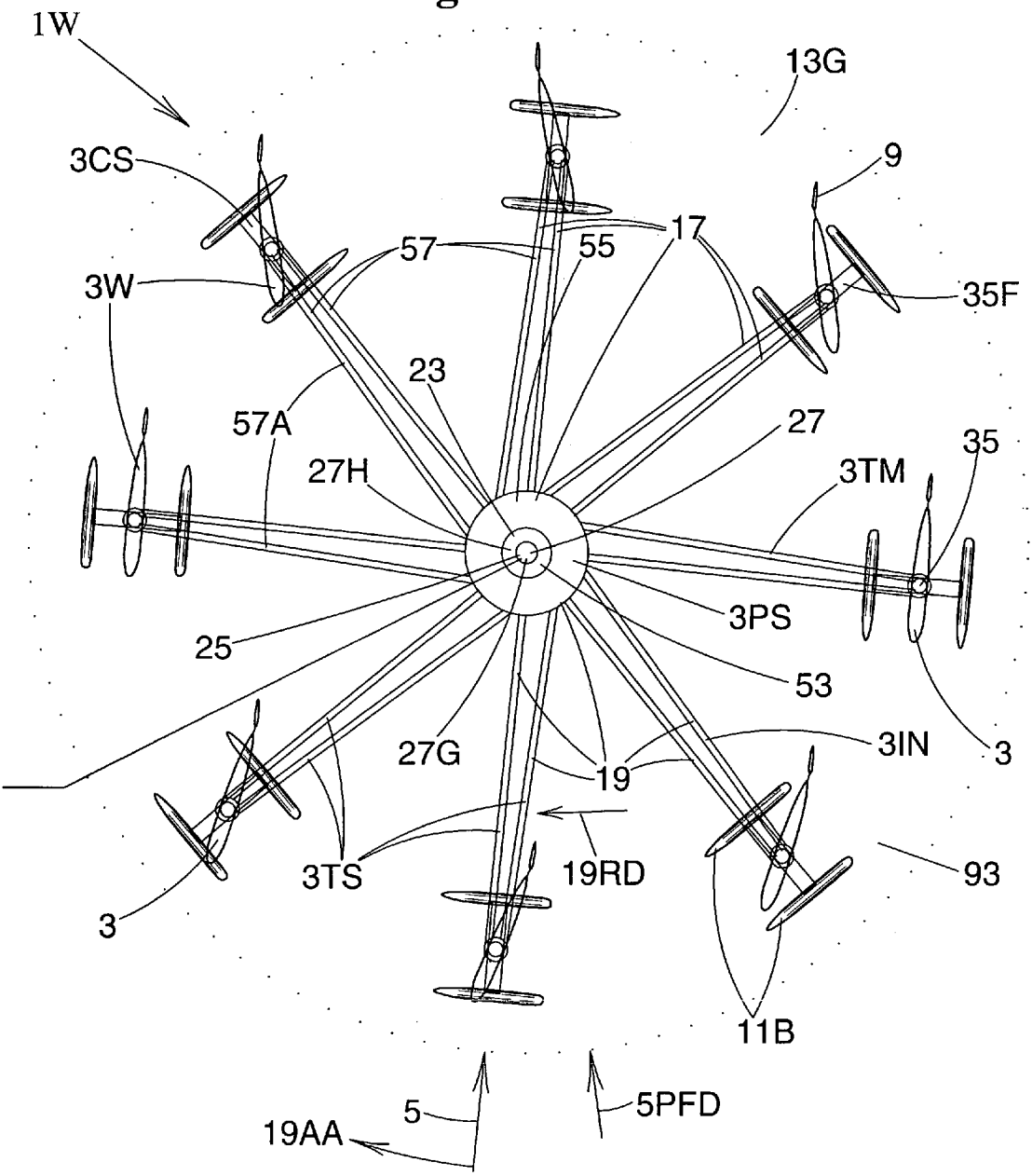
FIG. 3D shows the embodiment of FIG. 3C in a summer month situation, wherein it is floating on water rather than sitting on ice or snow.

The same embodiment of FIG. 3C is illustrated in FIG. 3D in a summer month situation, wherein it is floating on a liquid water layer 93 rather than sitting on ice or snow. Even in the summer the device can harvest wind energy, but not to the same extent as winter, because of the greater hydrodynamic drag of the hulls in liquid water than of the skates/skis/runners on ice/snow in the winter. The transition from summer to winter operation may be facilitated by use of one or more of (i) snowmaking or icemaking machines that add to the frozen layer on the track of the hulls, during cold, subfreezing temperature periods such as night periods, (ii) use of snow ploughs to push snow into this track, and (iii) use of hull leading edge compaction or heat/pack/refreeze elements to help groom a desired frozen running surface.

Figure 3E:
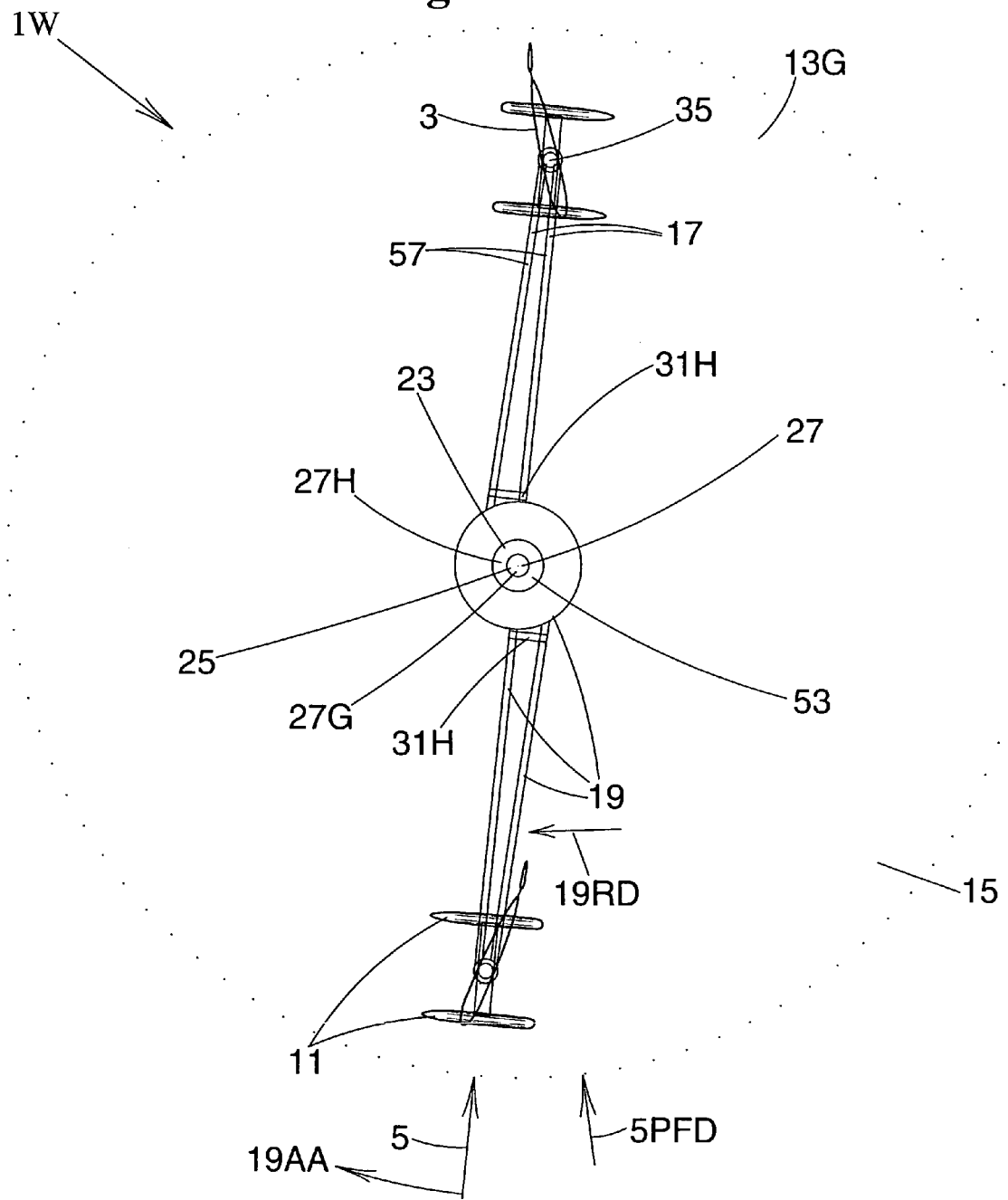
FIG. 3E shows a plan view of a wind energy harvesting system with two radial elements.

FIG. 3E shows an embodiment of the same class as those of FIGS. 3A-3D, but with two radial elements instead of eight, and with hinge means 31H for permitting the support runner means 11 to dip and climb over an undulating frozen surface if such an undulating frozen surface exists, as may happen on snow-covered terrain that isn't flat and level, or on a glacier on the side of a mountain, for example. Snow-making or ice-making means may also be provided to fill in any crevasses on the frozen surface, if such exist on the surface of a glacier or an ice sheet, and snow or ice mechanized shovel or blowing or packing means may be used to smooth out big bumps in the frozen surface such as snow drifts or ice pressure ridges.

Figure 3F:
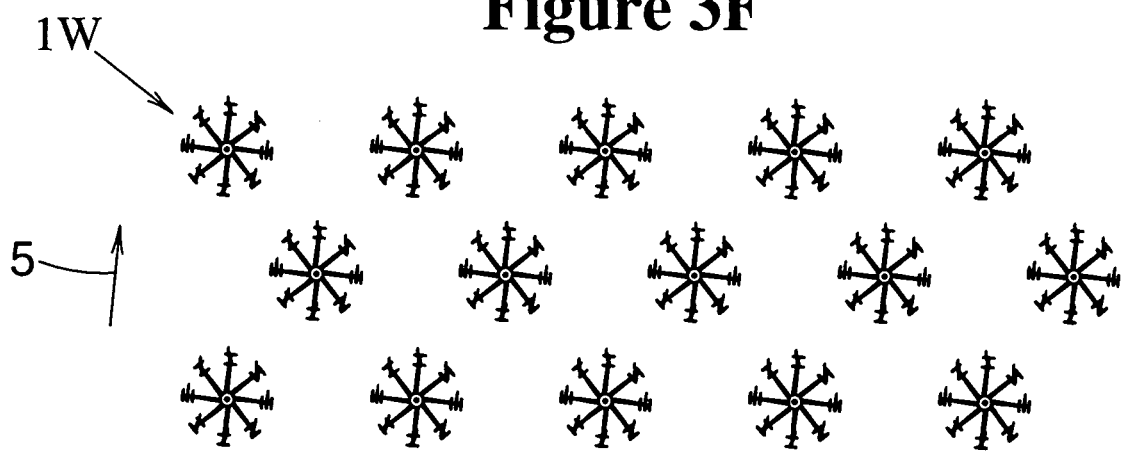
FIG. 3F shows a plan view of an array of wind energy harvesting systems in a triangular matrix or grid or array.

FIG. 3F shows a plan view of an array of wind energy harvesting systems 1W of the type shown in FIG. 3A, the type shown in FIG. 3B, the type shown in FIG. 3C, or variants thereof, in a triangular matrix or grid or array.

Figure 3G:
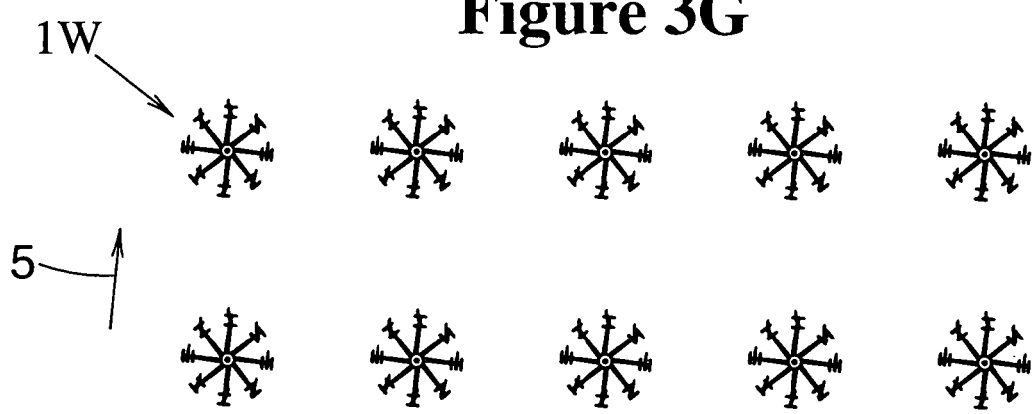
FIG. 3G shows a plan view of an array of wind energy harvesting systems in a rectangular matrix or grid or array.

FIG. 3G shows a plan view of an array of wind energy harvesting systems 1W of the type shown in FIG. 3A, the type shown in FIG. 3B, the type shown in FIG. 3C, or variants thereof, in a rectangular matrix or grid or array. A square matrix or grid or array would be one specific embodiment of the case shown in FIG. 3F.

Figure 3H:
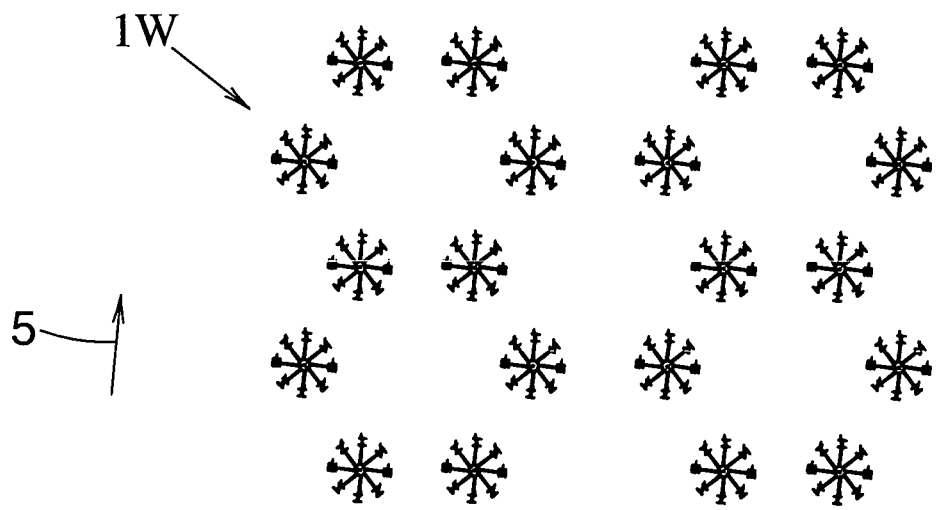
FIG. 3H shows a plan view of an array of wind energy harvesting systems in a hexagonal matrix or grid or array.

FIG. 3H shows a plan view of an array of wind energy harvesting systems 1W of the type shown in FIG. 3A, the type shown in FIG. 3B, the type shown in FIG. 3C, or variants thereof, in a hexagonal matrix or grid or array.

For specific geographic locations and prevailing wind patterns, it will be understood that alternate array or non-array arrangements may be preferable to meet a variety of objectives including system cost reduction, maximization of energy harvested, time optimization of energy harvested relative to energy demand, environmental and aesthetic impacts, and other objectives.

FIGS. 4A through 4J show a variety of preferred embodiments of support runner means 11.

Figure 4A:
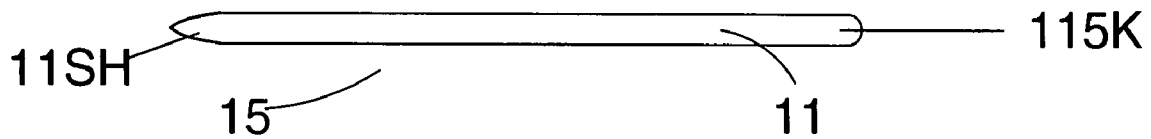
FIGS. 4A through 4H show plan views of a variety of preferred embodiments of support runner means.

FIG. 4A shows a plan view of support runner means 11 comprising a ski 11SK. The ski 11SK also includes a shovel 11SH and edges 11E that can facilitate tracking. As is well known from the prior art, a ski can traverse a frozen surface such as snow possibly mixed with ice or slush, with low friction while carrying a load. Low friction surfaces for the bottom of the ski are also well known from the prior art.

Figure 4B:
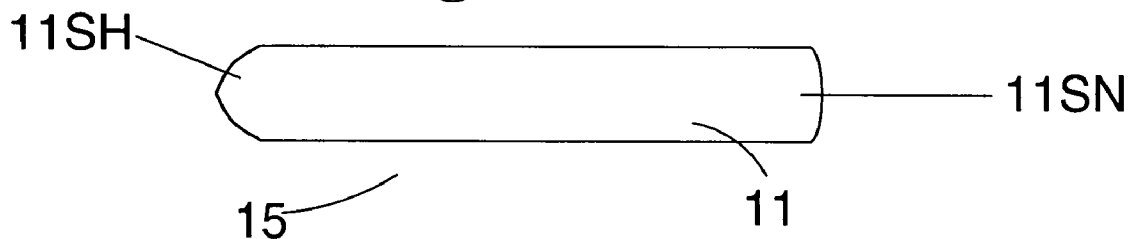

FIG. 4B shows a support runner means 11 comprising a snowboard 11SN.

Figure 4C:
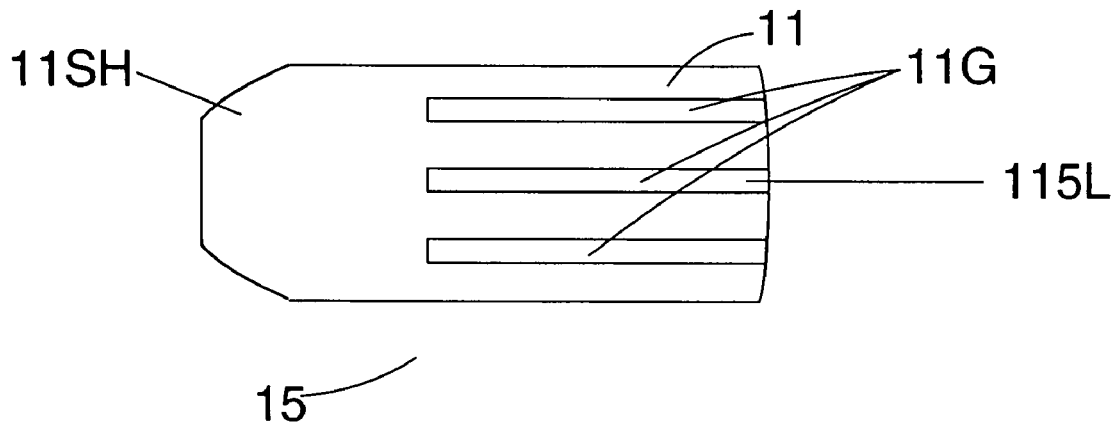

FIG. 4C shows a support runner means 11 comprising a sled 11SL. The illustrated sled 11SL also includes at least one groove 11G that serves as track fostering means 11TF for fostering desired lateral tracking of the support runner means 11 upon said frozen surface 15, which track fostering means 11TF comprises at least one of an edge, a groove, a serrated surface, a blade, a keel and a rudder.

Figure 4D:
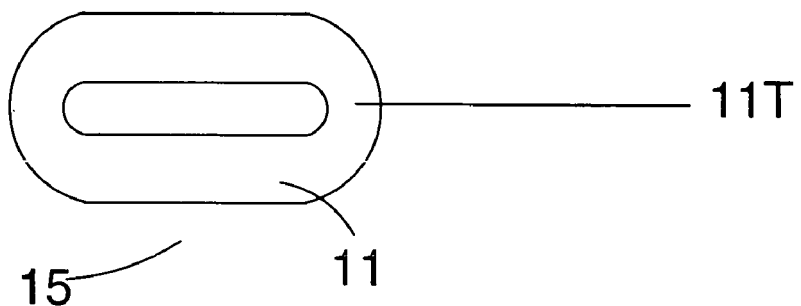

FIG. 4D shows a support runner means 11 comprising an inflatable tube 11T.

Figure 4E:
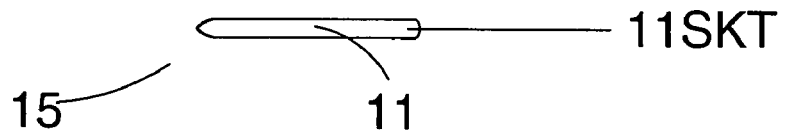

FIG. 4E shows a support runner means 11 comprising a skate 11SKT. As is well known from the prior art, a skate can traverse a frozen surface such an ice surface, with low friction while carrying a load. One mechanism by which this can be achieved is the use of a high load per unit area under the skate blade, to cause local pressure-induced melting of the ice surface and provide a very thin liquid water film on which the skate glides.

Figure 4F:

FIG. 4F shows a support runner means 11 comprising a runner 11R. Examples of runner types include long skate blades and the type of runners used in prior-art sleds.

Figure 4G:
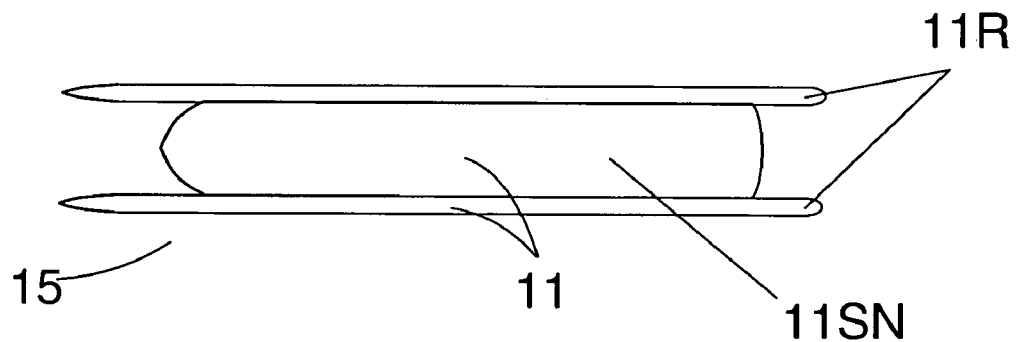

FIG. 4G shows a support runner means 11 comprising a snowboard 11SN, here also illustrated with optional flanking runners 11R. With the optional flanking runners, this device can effectively provide its desired slide and support function on a mixed surface with areas of soft snow surface and areas of ice surface, with the snowboard element providing most of the function on the soft snow and the runners providing most of the function on the ice.

Figure 4H:
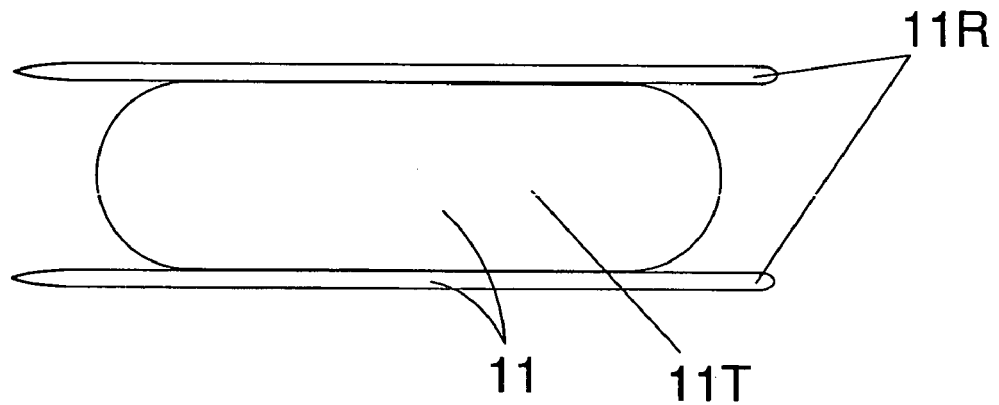

FIG. 4H shows a plan view of support runner means 11 similar to that shown in FIG. 4G, but with the snowboard 11SN replaced by an inflated tube 11T with a leading edge shovel 11SH. The rugged tear-resistant bottom surface of the tube 11T now provides most of the desired slide and support function on a soft snow surface, while the runners 11R provide most of this desired function on an ice surface.

Figure 4I:
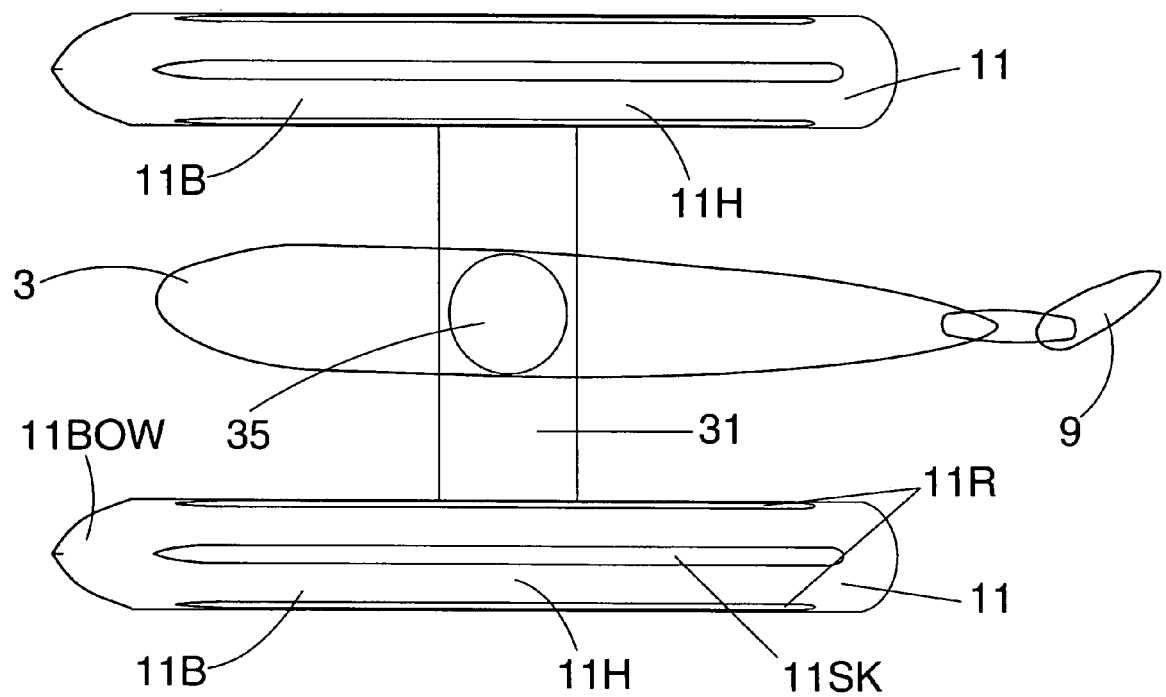
FIGS. 4I and 4J show bottom views of two preferred embodiments of buoyant support runner means.

FIG. 4I shows a bottom view of a support runner means 11 comprising a hull 11H that serves as buoyant support runner means 11B for the case when the frozen surface has melted either locally (e.g., an ice pond on an ice shelf or a polar ice sheet) or throughout the geographic envelope wherein the wind energy harvesting system is located (e.g., at a site where a frozen water surface fully thaws out into liquid water in a summer season). The hull 11H includes a bow section 11BOW of the hull. In the illustrated embodiment a catamaran or dual hull configuration is used with connecting structure 31 connecting the two hulls and supporting a fluid-foil base member 35, but in alternate variant embodiments clearly single hull, tri-maran, or multi-hull configurations could be employed. In the illustrated embodiment, the bottom surface of the hull 11H includes a ski 11SK that may simply be a modest downward local projection of the hull undersurface in the shape of a ski, and also includes runner elements 11R that project downward preferably a little lower than the hull and ski undersurfaces. The hull element provides most of a slide and support function on a liquid water surface, while the ski element provides most of the slide and support function on a snow surface, and the runner (or skate) elements provide most of the slide and support function on an ice surface. An advantage afforded by this type of support runner means is that it can enable operation of the wind energy harvesting system in different seasons and over different surfaces ranging from ice to snow to liquid water, and also slush, water with frazil ice and/or ice pancakes and/or nilas ice and/or columnar ice, sea ice, ice with surface frost flowers, ice with surface pressure ridges (unless they are too tall), ice floes, porridge ice, black ice, pack ice, lake ice, and melt ponds.

Figure 4J:
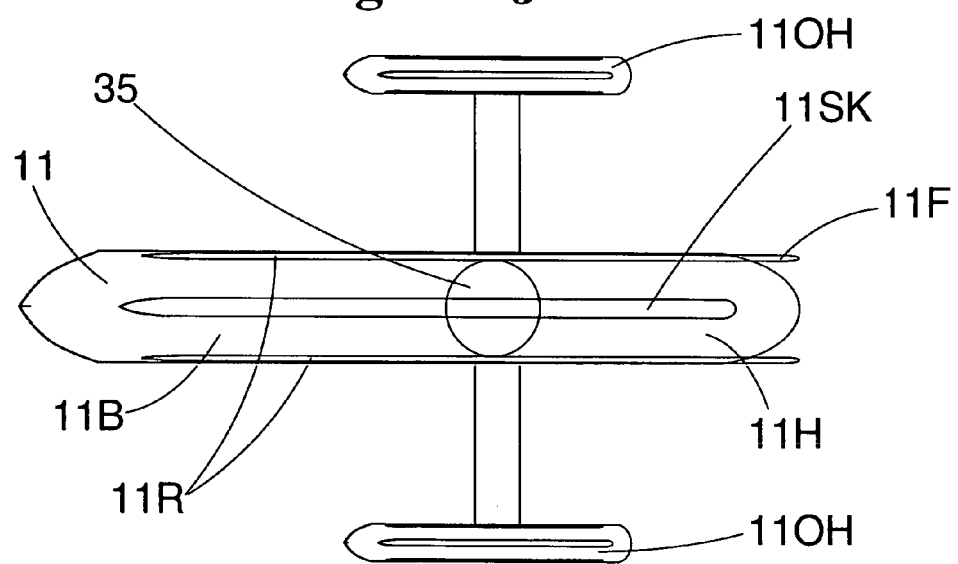

FIG. 4J shows a bottom view of a support runner means 11 comprising an alternate configuration hull 11H, also fitted with outrigger hulls 11OH. While two outrigger hulls are shown, in an alternate embodiment a single outrigger hull could be used, with a fluid-foil base member 35 offset from the centerline of the main hull towards the single outrigger hull. The embodiment of FIG. 4J also shows the aft ends of the runners 11R transitioning into fins 11F with optional rudders.

Alternate configurations, shapes, sizes and combinations of each of the support runner means 11 illustrated in FIGS. 4A through 4J, are possible within the scope of the invention.

Thus FIGS. 4A through 4J collectively illustrate support runner means 11 for a wind energy harvesting system, wherein said support runner means 11 comprise at least one of a ski 11SK, a snowboard 11SN, a sled 11SL, a skate 11SKT, a runner 11R, an inflatable tube 11T, a pontoon 11P, and a hull with runners 11HR, for slidably engaging said frozen surface 15 and for permitting low friction translational sliding motion upon said frozen surface 15.

FIGS. 5A through 5H show plan views of a variety of preferred embodiments of connecting structure geometries connecting fluid-foil means to support runner means.

Figure 5A:
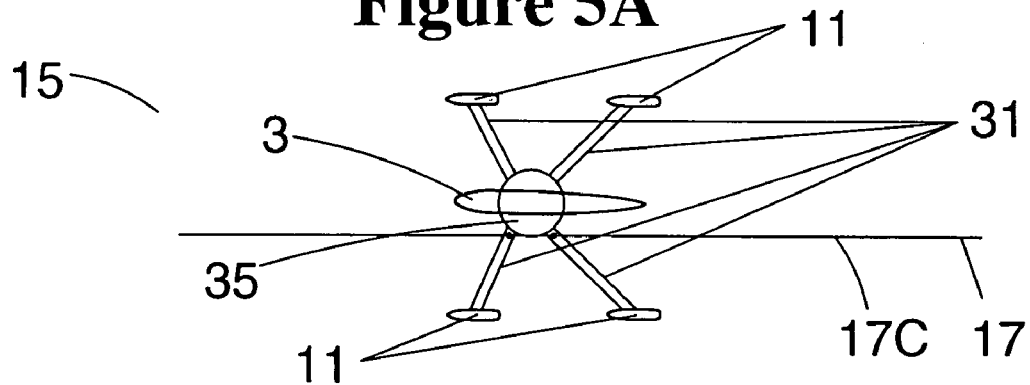
FIGS. 5A through 5H show plan views of a variety of preferred embodiments of connecting structure geometries connecting fluid-foil means to support runner means.

FIG. 5A shows a connecting structure geometry of the class used in the embodiment of FIGS. 1, 2A and 2B. As illustrated, fluid-foil means 3 are connected through fluid-foil base member 35 and connecting structure 31 here comprising four legs, to four support runner means 11 for slidably engaging a frozen surface 15 and for contributing to supporting said fluid-foil means 3 substantially above said frozen surface 15. In this embodiment the fluid-foil base member 35 is connected to connecting means 17 here comprising a substantially closed-loop cable 17C, in a manner consistent to that earlier illustrated in FIGS. 1, 2A and 2B. The four support runner means 11 are arranged in a rectangular formation relative to the orientation of the cable 17C. A square formation is a subset of this more general rectangular formation.

Figure 5B:
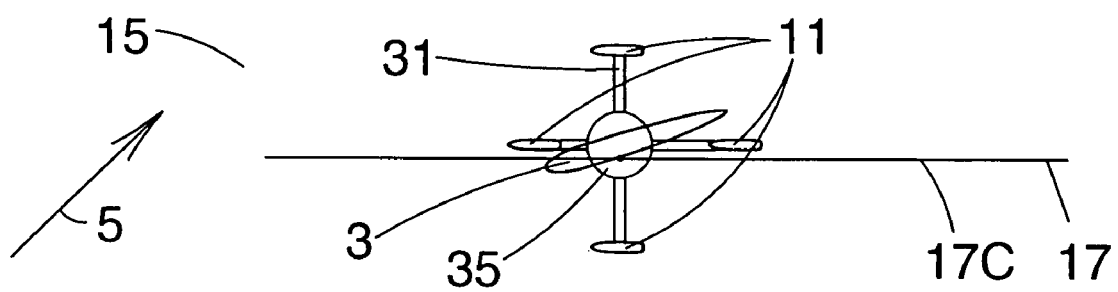

FIG. 5B shows a connecting structure geometry similar to the embodiment of FIG. 5A. As illustrated, fluid-foil means 3 are connected through fluid-foil base member 35 and connecting structure 31 here comprising four legs, to four support runner means 11 for slidably engaging a frozen surface 15 and for contributing to supporting said fluid-foil means 3 substantially above said frozen surface 15. In this embodiment the fluid-foil base member 35 is connected to connecting means 17 here comprising a substantially closed-loop cable 17C, in a manner consistent to that earlier illustrated in FIGS. 1, 2A and 2B. The four support runner means 11 are arranged in a diamond formation relative to the orientation of the cable 17C.

Figure 5C:
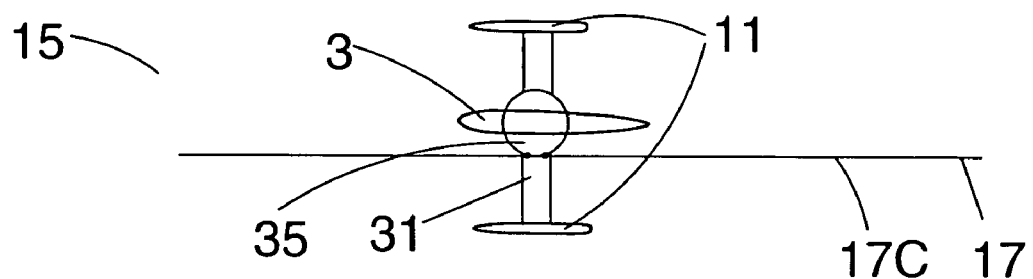

FIG. 5C shows another variant connecting structure geometry wherein fluid-foil means 3 are connected through fluid-foil base member 35 and connecting structure 31 here comprising two legs, to two support runner means 11 for slidably engaging a frozen surface 15 and for contributing to supporting said fluid-foil means 3 substantially above said frozen surface 15.

Figure 5D:
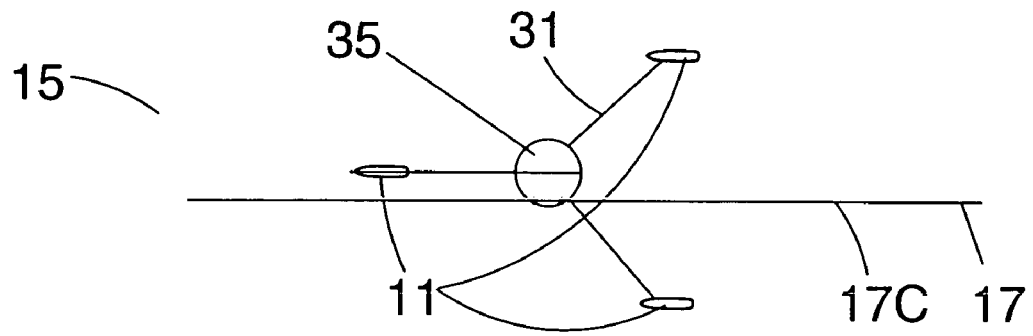

FIG. 5D shows another variant connecting structure geometry wherein fluid-foil means 3 are connected through fluid-foil base member 35 and connecting structure 31 here comprising three legs, to three support runner means 11 for slidably engaging a frozen surface 15 and for contributing to supporting said fluid-foil means 3 substantially above said frozen surface 15. A Magnus force generating rotating cylinder 3RC serves as the fluid-foil means in this illustrated embodiment.

Figure 5E:
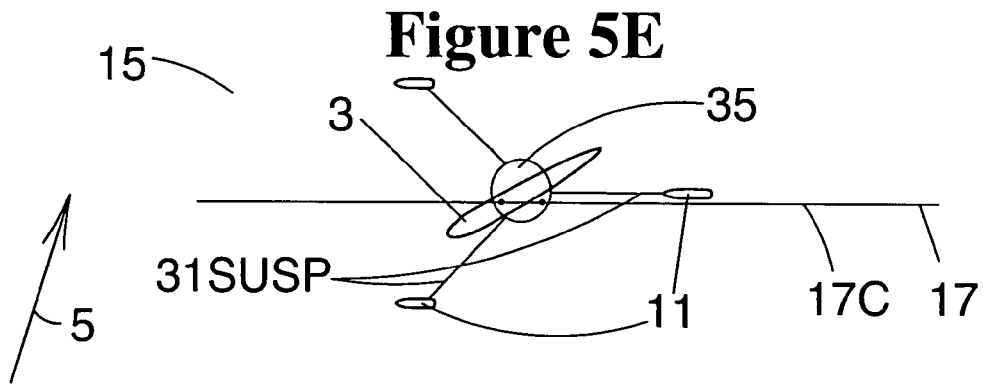

FIG. 5E shows another variant connecting structure geometry wherein fluid-foil means 3 are connected through fluid-foil base member 35 and connecting structure 31 (here comprising three legs with suspension 31SUSP integrated into the connecting structure), to three support runner means 11 for slidably engaging a frozen surface 15 and for contributing to supporting said fluid-foil means 3 substantially above said frozen surface 15.

Figure 5F:
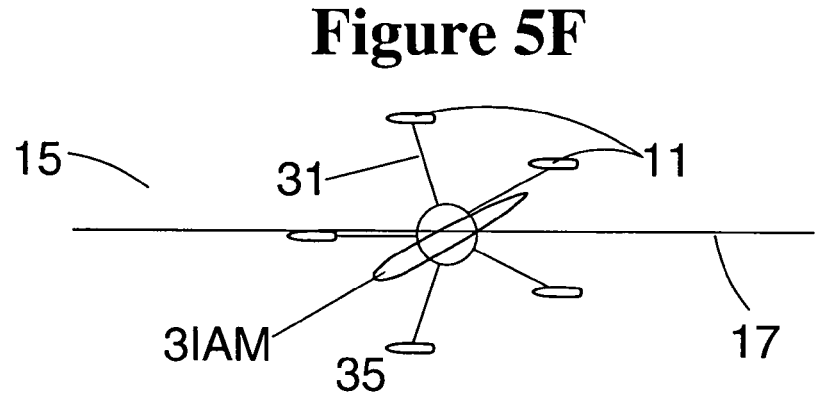

FIG. 5F shows another variant connecting structure geometry wherein fluid-foil means 3 are connected through fluid-foil base member 35 and connecting structure 31 here comprising five legs, to five support runner means 11 for slidably engaging a frozen surface 15 and for contributing to supporting said fluid-foil means 3 substantially above said frozen surface 15. The illustrated fluid-foil means 3 comprises an inflated airfoil member 3IAM in this embodiment. The use of five legs will provide a more stable base less susceptible to tipping than the three leg and four leg cases (for equal leg length), as is known from the analogous prior art for five castor bases for office chairs as opposed to three or four castor bases for office chairs. It will be understood that there is a valid cost versus tipping risk tradeoff between these options.

Figure 5G:
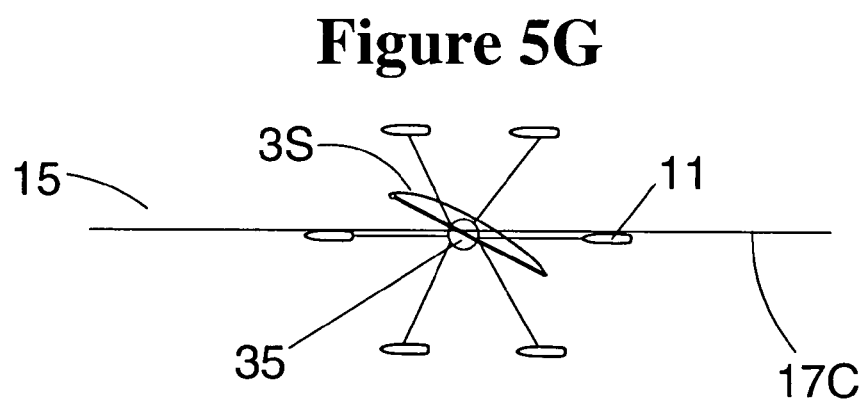

FIG. 5G shows another variant connecting structure geometry wherein fluid-foil means 3 are connected through fluid-foil base member 35 and connecting structure 31 here comprising six legs, to six support runner means 11 for slidably engaging a frozen surface 15 and for contributing to supporting said fluid-foil means 3 substantially above said frozen surface 15. The use of six legs will provide an even more stable base of support for the fluid-foil means 3, here comprising a sail 3S.

Figure 5H:
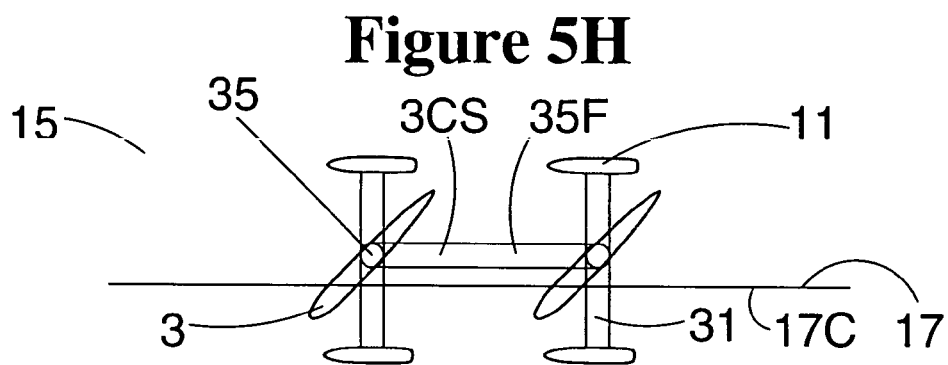

FIG. 5H shows another variant connecting structure geometry wherein a pair of fluid-foil means 3 are each connected through a corresponding fluid-foil base member 35 to base frame structure 35F including connecting structure 31 and specifically also a connecting structural element 3CS, to each other and to a plurality of (here four) support runner means 11 for slidably engaging a frozen surface 15 and for contributing to supporting said fluid-foil means 3 substantially above said frozen surface 15. Connections to a cable 17C are made above two of the legs on one side of the device, in the embodiment as illustrated. The base frame structure 35 in this embodiment is similar to that shown earlier in FIG. 3B, but applied to a cable connected rather than a spoke connected embodiment of the wind energy harvesting system.

Figure 6A:
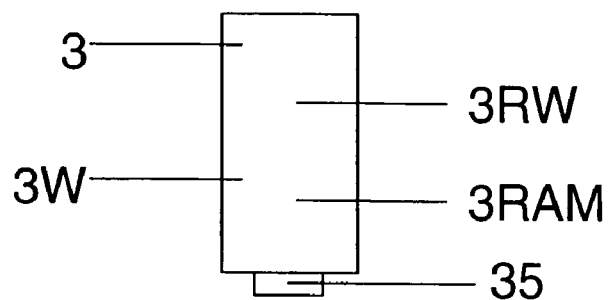
FIGS. 6A through 6N show side views of a variety of preferred embodiments of fluid-foil means.
Figure 6B:
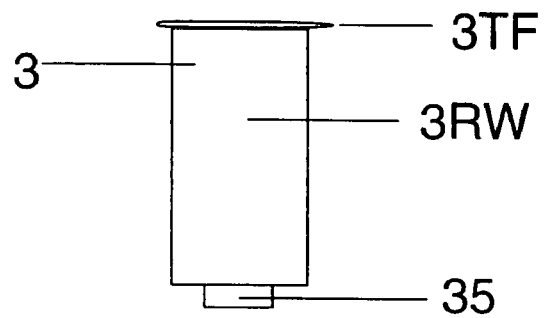
Figure 6C:
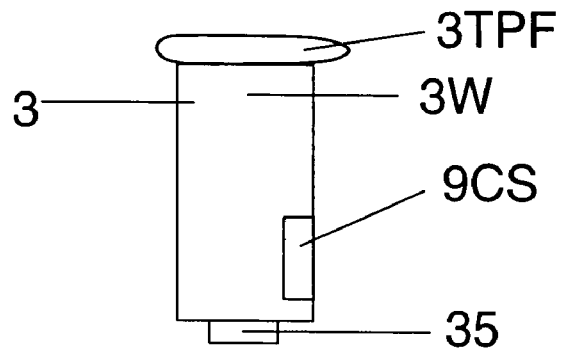
Figure 6D:
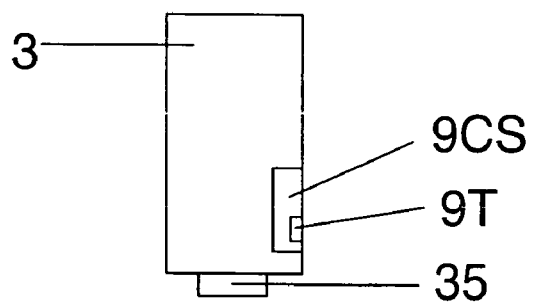
Figure 6E:
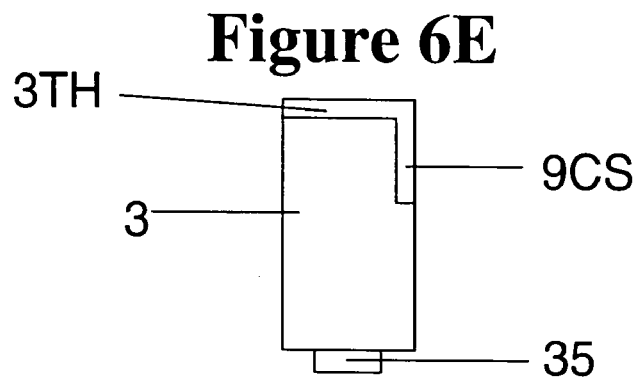
Figure 6F:
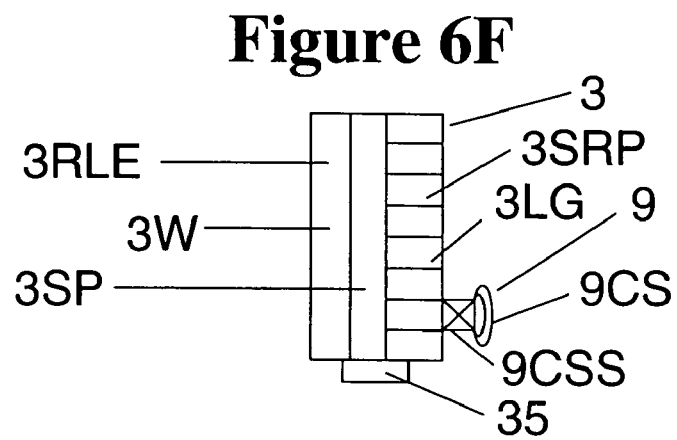
Figure 6G:
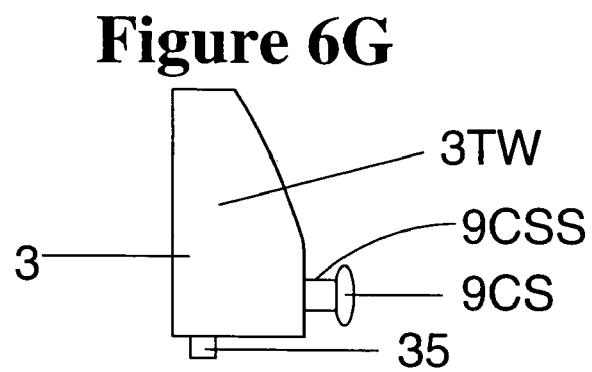
Figure 6H:
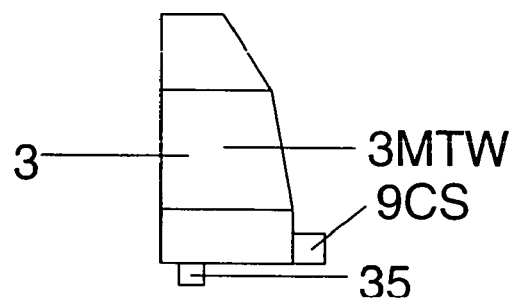
Figure 6I:
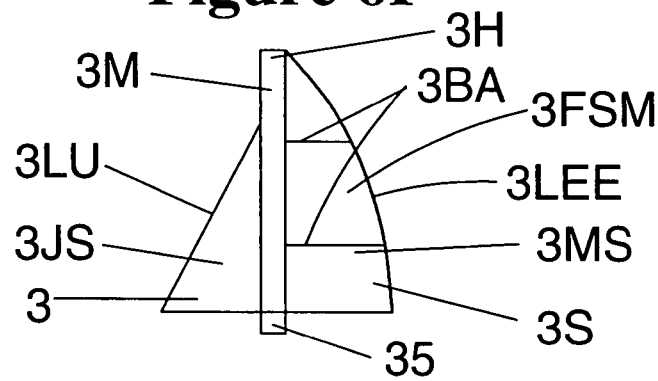
Figure 6J:
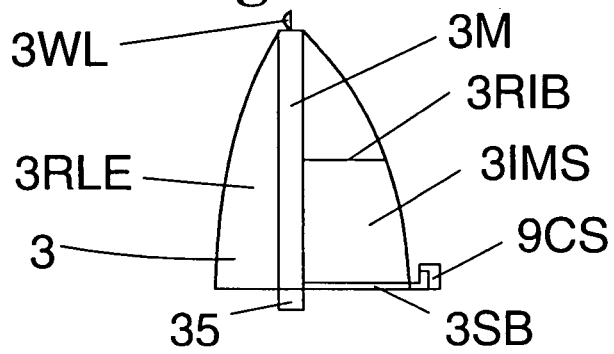
Figure 6K:
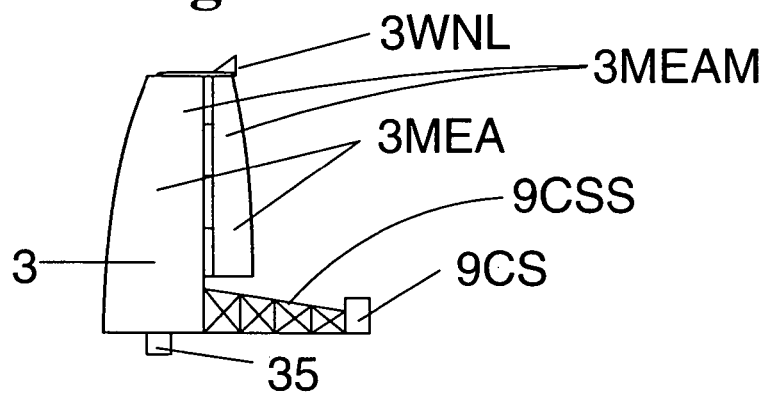
Figure 6L:
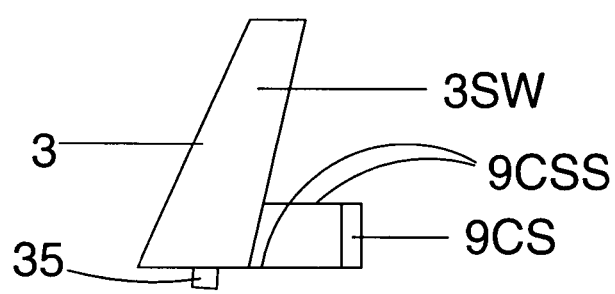
Figure 6M:
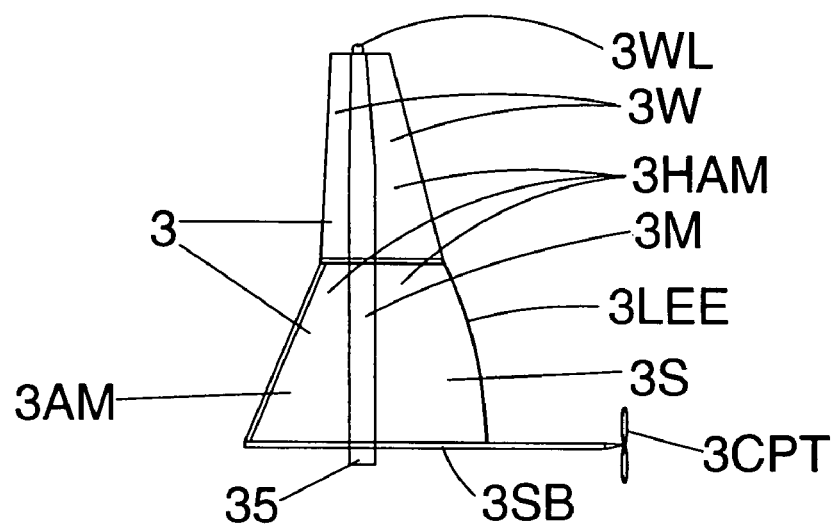
Figure 6N:
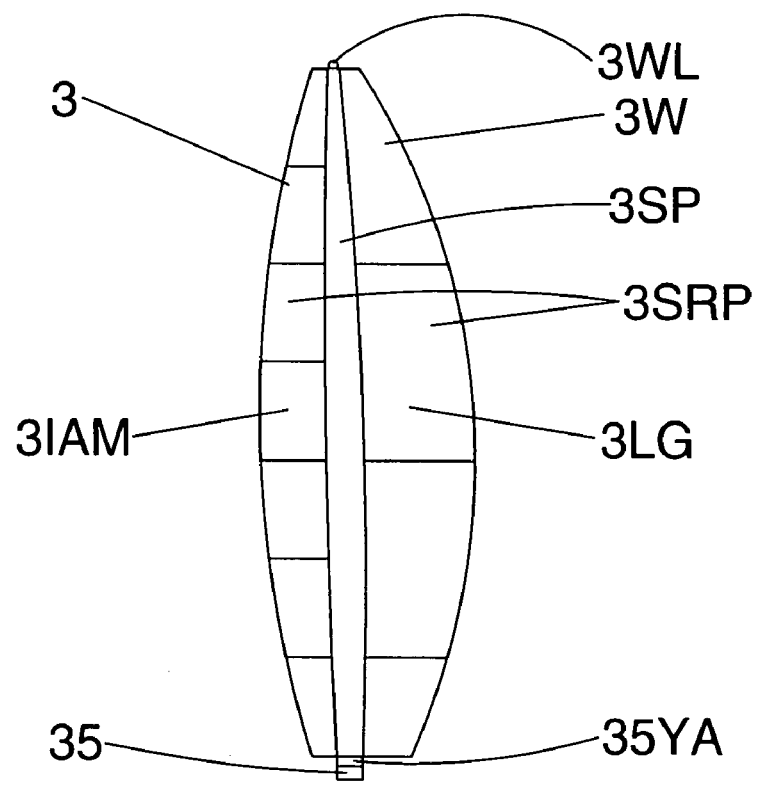

FIGS. 6A through 6N show side views of a variety of preferred embodiments of fluid-foil means 3.

FIG. 6A shows fluid-foil means 3 comprising a wing 3W that is a substantially rectangular wing 3RW and uses a substantially rigid airfoil member 3RAM. The wing 3W is here supported by a fluid-foil base member 35, preferably in a manner that will permit it to be oriented about a yaw axis to set it at a desired angle of attack relative to a prevailing wind field. In representative embodiments the wing 3W may range anywhere from 2 feet tall to 20 feet to 200 feet to 2000 feet tall, depending on whether the application is for a small-scale, medium-scale, large-scale or mega-scale wind energy harvesting system.

It should be understood that fluid-foil means of varying dimensions, heights, areas, aspect ratios, taper ratios, and planforms can be used within the spirit and scope of the invention as described and claimed.

FIG. 6B shows fluid-foil means 3 comprising a wing 3W that is a substantially rectangular wing 3RW, here fitted with a tip fence 3TF. In alternative embodiments a tip fence or other tip device (e.g., winglet, tip feathers) could be fitted on a variety of fluid-foil means, within the spirit and scope of the invention.

FIG. 6C shows fluid-foil means 3 comprising a wing 3W, here fitted with a control surface 9CS and also fitted with a tip pod fairing 3TPF. The tip pod fairing 3TPF could optionally be filled with lifting gas such as helium or hydrogen, to effectively reduce the weight of the wing 3W on the fluid-foil base member 35. The interior of the wing 3W could also optionally be filled with lifting gas.

FIG. 6D shows fluid-foil means 3, here fitted with a control surface 9CS and also fitted with a tab 9T on said control surface 9CS, which tab provides at least one of a control tab function and a trim tab function.

FIG. 6E shows fluid-foil means 3, here fitted with a control surface 9CS that has a tip horn 3TH. The design and operation of control surfaces with tip horns is known from the prior art, including widespread use on aircraft of the First World War era.

FIG. 6F shows an alternative embodiment of fluid-foil means 3, comprising a wing 3W with a wing spar 3SP, a substantially rigid leading edge 3RLE forward of this spar, and a semi-rigid portion 3SRP aft of the wing spar 3SP. The wing 3W can optionally be filled at least in part with lifting gas 3LG, such as helium or hydrogen gas, to reduce the weight load of the wing 3W on the fluid-foil base member 35. In the embodiment of FIG. 6F, a control surface 9CS is mounted behind the trailing edge of the airfoil of the wing 3W, by means of control surface support 9CSS that may employ a variety of structural designs including the truss structure shown.

FIG. 6G shows fluid-foil means 3, comprising a tapered wing 3TW also fitted with a control surface 9CS connected to the wing by control surface support 9CSS, here consisting of upper and lower plate-like structures such as composite sandwich plates.

FIG. 6H shows fluid-foil means 3, comprising a multi taper wing 3MTW, also fitted with a control surface 9CS, here fitted directly to the trailing edge of the wing.

FIG. 6I shows fluid-foil means 3, comprising at least one sail 3 utilizing a flexible sail member 3FSM. A mast 3M is supported by fluid-foil base member 35, with the mast rising from the fluid-foil base member 35 up to the headboard 3H. A main sail 3MS and a jib sail 3JS connect to the mast 3M. The fluid-foil means 3 thus spans from the luff 3LU of the jib sail back to the leech 3LEE of the main sail. Some representative, optional battens 3BA are shown, which may help maintain a sail in a preferred shape configuration under a variety of wind and gust conditions, and/or may help prevent undesirable fluttering of the sail cloth or material.

FIG. 6J shows another embodiment with fluid-foil means 3, comprising a mast 3M that is supported by fluid-foil base member 3S, with the mast rising from the fluid-foil base member 3S up to a warning light 3WL at the headboard end of the mast. A substantially rigid leading edge 3RLE, preferably in the shape of an airfoil leading edge, projects forward from the mast 3M. An inflatable main sail 3IMS projects aft from the mast 3M. The inflatable main sail will preferably have some shaping or rigidizing frame members, such as the illustrated substantially rigid sail rib 3RIB and substantially rigid sail boom 3SB. The combination of the substantially rigid leading edge 3RLE, mast 3M and inflatable main sail 3IMS appropriately inflated, will preferably assume smooth airfoil-like surface lofts when viewed on planar cuts perpendicular to the mast 3M. This type of fluid-foil means 3 may afford offer some of the combined advantages of sails and airfoils, with the lower cost and larger area of sails combined with the better aerodynamic efficiency of airfoils. In the illustrated embodiment a control surface 9CS is mounted on an aft projection of the sail boom 3SB.

FIG. 6K shows another embodiment, with fluid-foil means 3 comprising a multi-element aerodynamic member 3MEAM here utilizing a multi element airfoil 3MEA, with a slotted airfoil shown supported by fluid-foil base member 3S. The two elements may be adjustable in spacing, location and orientation to optimize desired aerodynamic attributes in different conditions. Actuator means (not shown) may be used to achieve this adjustability, or alternatively passive means such as spring and damper fitted hinge means for connecting the elements may be used. A winglet 3WNL is fitted to the upper wingtips of the multi element airfoil, as illustrated. The winglet may be fitted with an optional lighting rod element and grounding path connection). The fluid-foil means 3 is fitted with a control surface 9CS, connected to the multi element airfoil 3MEA via control surface support 9CSS, a truss boon structure as illustrated. The use of a long truss boom as illustrated has a benefit of reducing actuator loads needed to actuate the control surface 9CS to an extent needed to generate a desired yawing moment associated with balancing the multi element airfoil's moment associated with its desired angle of attack and lateral lift (or thrust) in reaction to wind blowing over the multi element airfoil.

FIG. 6L shows another embodiment, with fluid-foil means 3 comprising a swept wing 3SW, also fitted with a control surface 9CS connected to the swept wing 3SW by control surface support 9CSS members.

FIG. 6M shows an embodiment of fluid-foil means 3 comprising a hybrid aerodynamic member 3HAM utilizing a hybrid sail and wing construction, with the bottom part having a geometrically shaped aerodynamic member 3AM forward, a mast 3M, and a sail 3S aft, with a control and power turbine 3CPT behind the aft end of the sail boom 3SB. The control and power turbine 3CPT in this embodiment serves both as a means for generation of local power for use for actuation and/or signaling and/or computation, and as a control tab for generating a yawing moment to contribute to adjusting the angle of attack of the fluid-foil means 3. In alternate embodiments a horizontal axis turbine (HAT) or a vertical axis turbine (VAT) can be installed in various locations for the purpose of generating local power.

A wing 3W is located above the mast 3M and is structurally connected to it, e.g. with the wing main spar being a structural continuation of the mast. A warning light 3WL is mounted atop the wing 3W. Thus the embodiment of FIG. 6M illustrates fluid-foil means 3 that comprise at least one of a wing 3W, a sail 3S and a geometrically shaped aerodynamic member 3AM.

FIG. 6N shows an embodiment of fluid-foil means 3 comprising a wing 3W, which has a rigid spar 3SP supporting forward and aft semirigid portions 3SRP, which are also inflated to maintain the shape of their skin surfaces between framing elements. Thus an inflatable airfoil member 3IAM is provided, supported by the mast 3M between the fluid-foil base member 3S and the warning light 3WL. The housing of the warning light 3WL may be fitted with an optional lighting rod element and grounding path connection. In this illustrated embodiment the fluid-foil base member is fitted with a yaw actuator 3SYA that can orient the entire wing 3W by rotating the rigid spar 3SP to a commanded angle of attack relative to the local wind direction. In the embodiment of FIG. 6N, the inflatable airfoil member 3IAM is inflated with at least one of air and a lifting gas 3LG comprising at least one of helium gas, hydrogen gas, and hot gas such as hot air.

FIGS. 7A through 7I show cross-sectional views of a variety of preferred embodiments of fluid-foil means.

Figure 7A:
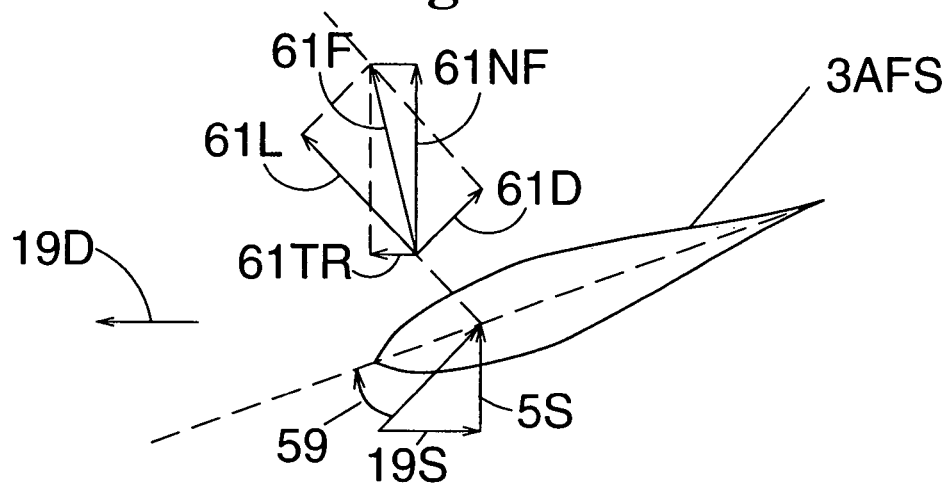
FIGS. 7A through 7I show cross-sectional views of a variety of preferred embodiments of fluid-foil means.

FIG. 7A illustrates an airfoil section 3AFS that is moving in a cable direction 19D. The effective wind seen by the airfoil section 3AFS is the vector sum of the wind speed 5S and the effective wind speed 19S induced by the cable speed in the cable direction 19D. Note that the cable speed parameter applicable to embodiments such as that shown in FIGS. 1, 2A and 2B, can be replaced by local fluid-foil speed in alternate embodiments such as those in FIG. 3A etc. The resultant angle of attack 59 of the airfoil section relative to the vector sum wind, causes the airfoil to generate airfoil lift 61L and airfoil drag 61D, as illustrated. The lift is perpendicular to the vector sum wind and the drag is parallel to the vector sum wind. Resolving the resultant force on the airfoil 61F in a different axis system yields a tractive force 61TR that pulls the cable in a direction parallel to the local cable direction for embodiments such as that of FIGS. 1, 2A and 2B (or pulls a spoke in an azimuthal direction in an embodiment such as FIG. 3A etc.); and a normal force 61NF that acts perpendicular to the cable direction for embodiments such as that of FIGS. 1, 2A and 2B (or in a radial direction in an embodiment such as FIG. 3A etc.). The control system means may set airfoil angle of attack 59 and either cable speed (for embodiments such as that of FIGS. 1, 2A and 2B) or device RPM (revolutions per minute around a hub, for embodiments such as that of FIGS. 3A, 3B, 3C and 3D) so as to maximize power being harvested from the wind. For example, airfoil angle of attack may be set to that value associated with maximum lift coefficient of the airfoil before it stalls, or to a value just slight shy of the stall angle of attack.

Figure 7B:
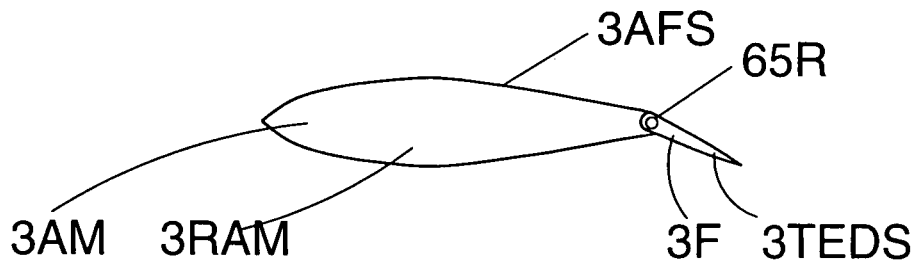

FIG. 7B illustrates an airfoil section 3AFS comprising a geometrically shaped aerodynamic member 3AM that is a substantially rigid airfoil member 3RAM, with a trailing edge deflectable surface 3TEDS comprising a flap 3F that is deflectable around a hinged attachment by a rotary actuator 65R.

Figure 7C:
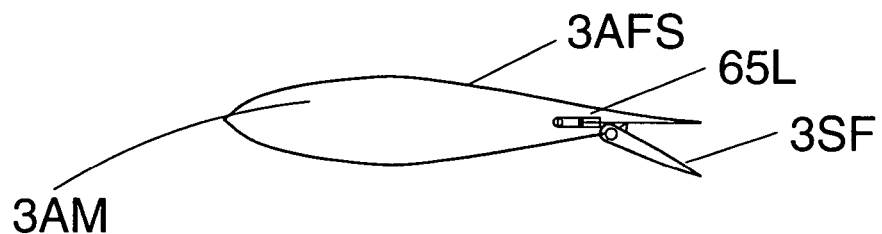

FIG. 7C illustrates an airfoil section 3AFS comprising a geometrically shaped aerodynamic member 3AM fitted with a split flap 3SF that is deployable by action of a linear actuator 65L.

Figure 7D:
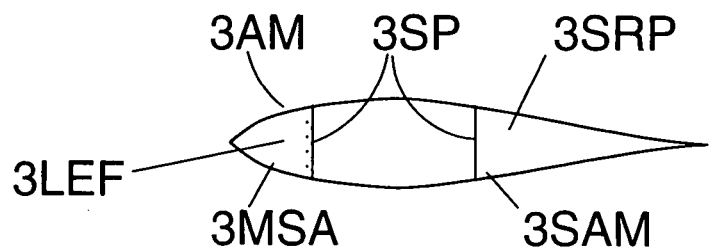

FIG. 7D illustrates an airfoil section 3AFS comprising a geometrically shaped aerodynamic member 3AM that is a semirigid airfoil member 3SAM with an aft semi-rigid portion 3SRP illustrated. The rigid portion is held rigid by two wing spars 3SP as illustrated. Forward of the front spar, a leading edge flap 3LEF is illustrated that uses a morphing shape aerodynamic member 3MSA.

Figure 7E:
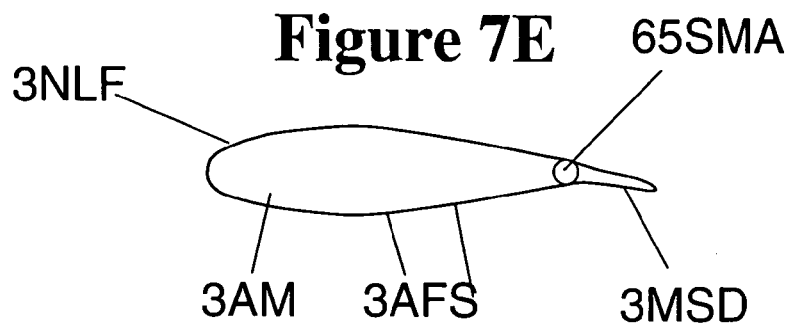

FIG. 7E illustrates airfoil section 3AFS comprising a geometrically shaped aerodynamic member 3AM that utilizes a natural laminar flow airfoil 3NLF that is fitted with a variable camber trailing edge utilizing a shape memory alloy actuator 65SMA to control a flap that comprises a morphing shape aerodynamic member 3MSA.

Figure 7F:
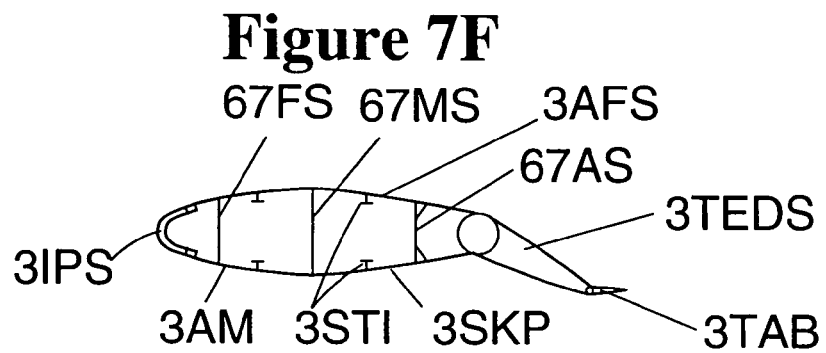

FIG. 7F illustrates airfoil section 3AFS comprising a geometrically shaped aerodynamic member 3AM that utilizes a three-spar structural design with a front spar 67FS, a mid spar 67MS and an aft spar 67AS. The structural design also includes at least one of stiffeners or stringers, designated 3STI on this figure. Such stiffeners or stringers may be beneficially used to stiffen skin panels 3SKP, whether those panels are metallic or composite or hybrid in material, and single-layer or laminated multi-ply layers or honeycomb sandwich or other sandwich in construction architecture. The airfoil section 3AFS is fitted with an ice protection system 3IPS in its leading edge region, which may be any of a variety of anti-ice and de-ice system designs known from the prior art of aircraft wing and propeller anti-ice and de-ice systems, such as thermal systems using hot fluid or electrical heating, such as weeping glycol or other chemical systems, and such as mechanical systems. FIG. 7F also illustrates a trailing-edge deflectable surface 3TEDS fitted with a tab 3TAB, such as a control tab and/or trim tab and/or servo tab.

Figure 7G:
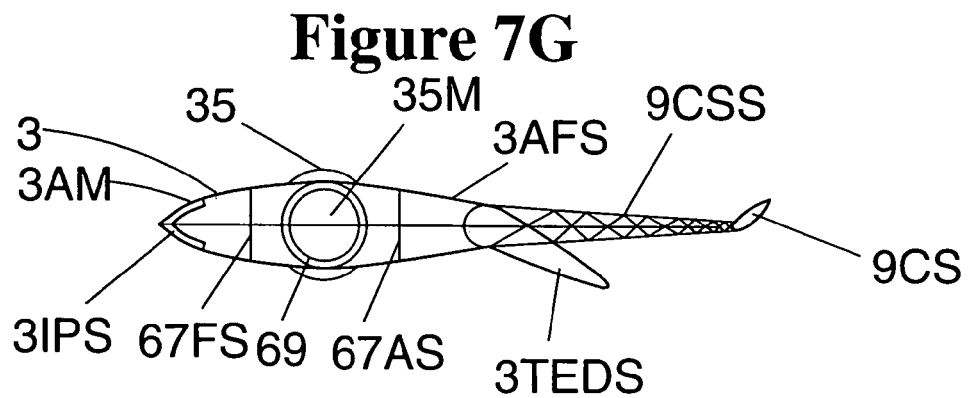

FIG. 7G illustrates fluid-foil means 3 with an airfoil section 3AFS comprising a geometrically shaped aerodynamic member 3AM that is rotatable around a mast 35M through a bearing interface 69. The mast is supported by fluid-foil base member 35. In this illustrated preferred embodiment the airfoil has two spars, the front spar 67FS and the aft spar 67AS. An ice protection system 3IPS is also shown on the leading edge, but may also extend to other portions of the fluid-foil means 3 that may be susceptible to ice deposit or accumulation, including the upper end of the fluid-foil means 3. The embodiment of FIG. 7G is fitted with a control surface 9CS located behind the airfoil section 3AFS spaced some distance behind the airfoil section, and connected to the airfoil section by means of control system support 9CSS. While a truss structure is illustrated for the control system support 9CSS, alternate structural architectures can be used for this purpose, including sandwich panels, hollow booms of various cross-sections and tapers, structural beams of various cross-sections and tapers, etc. The embodiment of FIG. 7G is also fitted with a trailing-edge deflectable surface 3TEDS, which in this embodiment serves as a trailing-edge flap to increase the achievable lift coefficient of the airfoil section 3AFS, rather than as a control surface. To use an aircraft analogy, in this embodiment the trailing-edge deflectable surface 3TEDS serves a role similar to an aircraft's wing trailing-edge flap, while the control surface 9CS serves a role similar to an aircraft's elevator control surface.

Figure 7H:
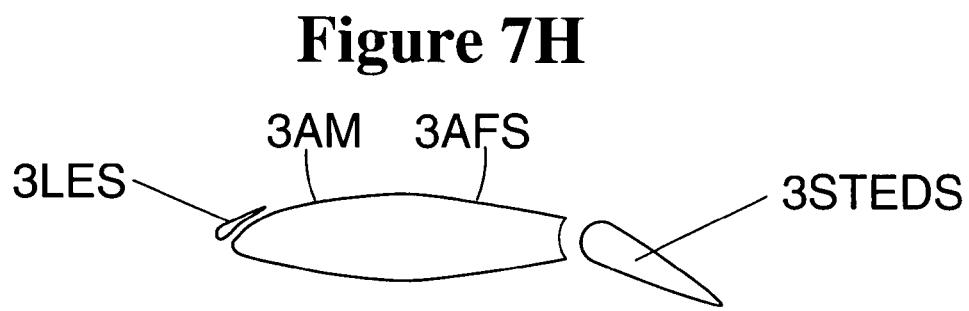

FIG. 7H illustrates airfoil section 3AFS comprising a geometrically shaped aerodynamic member 3AM that is fitted with a slotted trailing edge deflectable surface 3STEDS such as a slotted flap, while the leading edge is fitted with a leading edge slat 3LES.

Figure 7I:
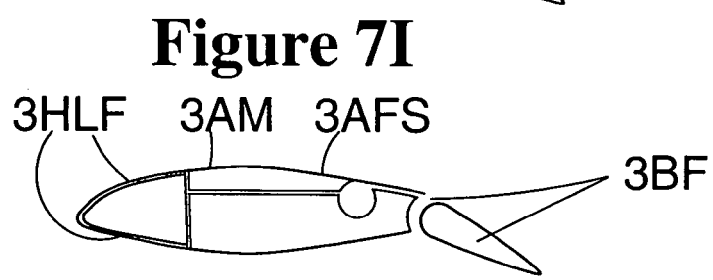

FIG. 7I illustrates airfoil section 3AFS comprising a geometrically shaped aerodynamic member 3AM that utilizes a hybrid laminar flow airfoil 3HLF with at least one of suction and blowing to foster laminar flow, and is also fitted with a blown flap 3BF. An optional air passage for transmission of sucked air from the skin pores in the forward end of the airfoil section, through the hybrid laminar flow system and then to the flap blowing system, is illustrated in this embodiment; the flow through this passage may be powered or induced by naturally occurring aerodynamically induced pressure effects. It should be recognized that in alternate variant embodiments the hybrid laminar flow system may be entirely independent of a flap blowing system, or only one or the other of the two systems provided. The hybrid laminar flow system may also optionally include heating elements that at least one of (i) foster laminar flow and (ii) serve as anti-icing or de-icing elements.

The combined embodiments of FIGS. 6 and 7 illustrate a wind energy harvesting system wherein a geometrically shaped aerodynamic member 3AM includes at least one of a substantially rigid airfoil member 3RAM, a semirigid airfoil member 3SAM, a flexible sail member 3FSM, a multi-element aerodynamic member 3MEAM, a hybrid aerodynamic member 3HAM, a morphing shape aerodynamic member 3MSA, a flap 3F, a blown flap 3BF, a slat 3SL, a control surface 9CS, a tab 3TAB, a natural laminar flow airfoil 3NLF, a hybrid laminar flow airfoil 3HLF, an airfoil having a surface with riblets 3RS, and an inflatable airfoil member 3IAM, wherein said inflatable airfoil member 3IAM is inflated with at least one of air and a lifting gas 3LG comprising at least one of helium gas, hydrogen gas, and hot gas such as hot air.

The combined embodiments of FIGS. 6 and 7 also illustrate a wind energy harvesting system wherein control system means 9 for controlling time-variable orientations of said fluid-foil means 3, includes means for controlling at least one of said control surface 9CS, tab 3TAB, flap 3F, blown flap 3BF, slat 3SL, and morphing shape aerodynamic member 3MSA.

Figure 8A:
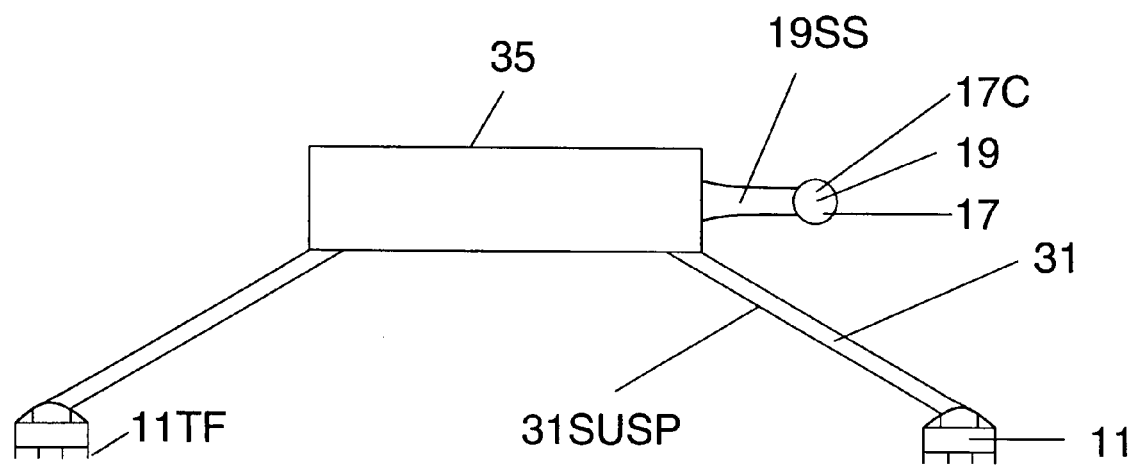
FIGS. 8A and 8B show two front views of fluid-foil means support structure.
Figure 8B:
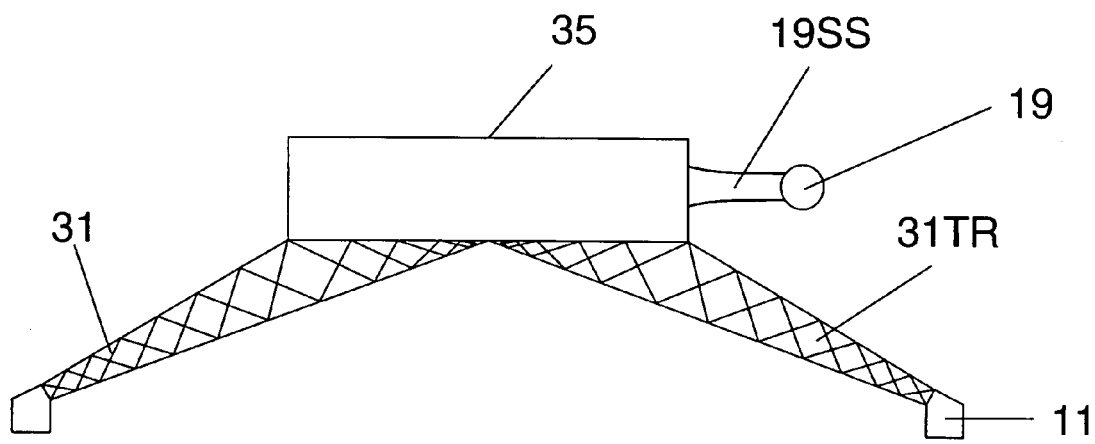

FIGS. 8A and 8B show two front views of fluid-foil means support structure.

FIG. 8A shows a fluid-foil base member 35 supported by support runner means 11 through connecting structure 31 with suspension means 31SUSP for providing spring and damping forces, integrated into the connecting structure 31. The fluid-foil base member 35 connects to and engages with connecting means 17 connecting plural fluid-foil means in a sequential arrangement, including connecting member 19 that connect adjacently-located fluid-foil means in said sequential arrangement. This connection and engagement in the illustrated embodiment is through cable support structure 19SS connecting and engaging with a substantially closed loop cable 17C, as illustrated. The illustrated support runner means include bottom elements suitable for engaging snow, ice and other frozen surfaces. The illustrated support runner means 11 also includes track fostering means 11TF for fostering desired lateral tracking of the support runner means 11 upon said frozen surface 15, which track fostering means 11TF comprises at least one of an edge, a groove, a serrated surface, a blade, a keel and a rudder.

FIG. 8B shows a fluid-foil base member 35 supported by support runner means 11 through connecting structure 31 here including truss supports 31TR.

Figure 8C:
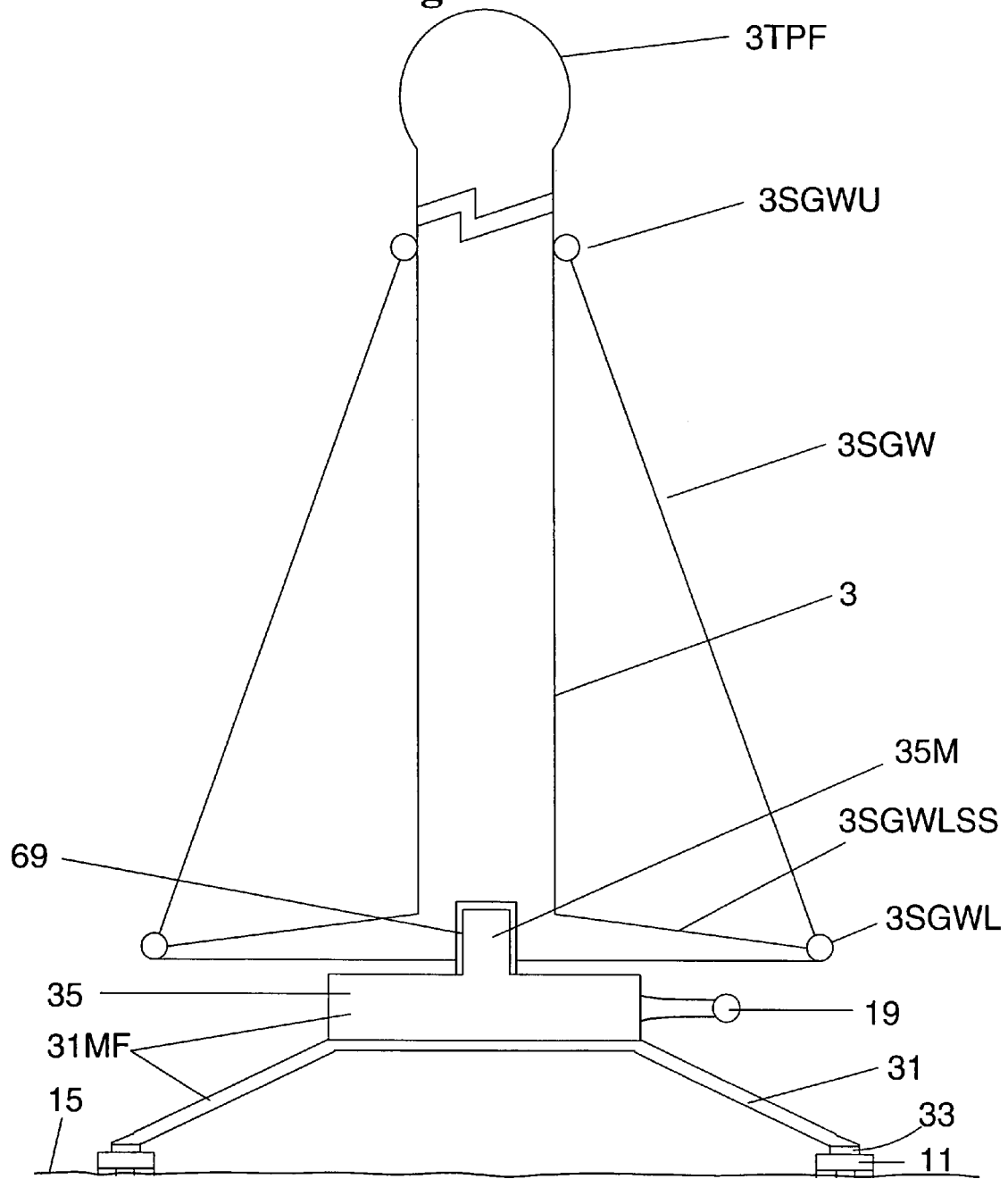
FIG. 8C shows a front view of another embodiment of fluid-foil means, along with its support structure.

FIG. 8C shows a front view of another embodiment of fluid-foil means, along with its support structure. Fluid-foil means 3 is supported by fluid-foil base member 35 including a mast projection 35M from the base member, through a bearing interface 69. The fluid-foil means includes at least one of a strut and guy wire 3SGW to help react wind-induced bending loads on the fluid-foil means 3. The at least one of a strut and guy wire 3SGW is connected on top to the fluid-foil 3 and at the bottom end to a lower anchor 3SGWL laterally offset by structure projecting laterally from the base of the fluid-foil 3. The illustrated fluid-foil 3 also has a tip pod fairing 3TPF. The fluid-foil base member 35 supported by support runner means 11 through connecting structure 31 here including a separate suspension element 33, which may include at least one of spring means and damper means to reduce vertical load and motion of said fluid-foil means 3 that may be induced by the support runner means 11 running over bumps or undulations in the frozen surface 15. Thus FIG. 8C illustrates an embodiment with at least one of a connecting structure 31 and a suspension element 33 which suspension element 33 comprises at least one of a spring element and a damper element, in the support path between said support runner means 11 and said fluid-foil means 3.

FIG. 8C also illustrates that the fluid-foil means 3 is supported by a movable frame 31MF; wherein said movable frame 31MF is supported at least in part by said support runner means 11; and wherein said fluid-foil means 3 is movable relative to its corresponding movable frame 31MF.

Figure 9A:
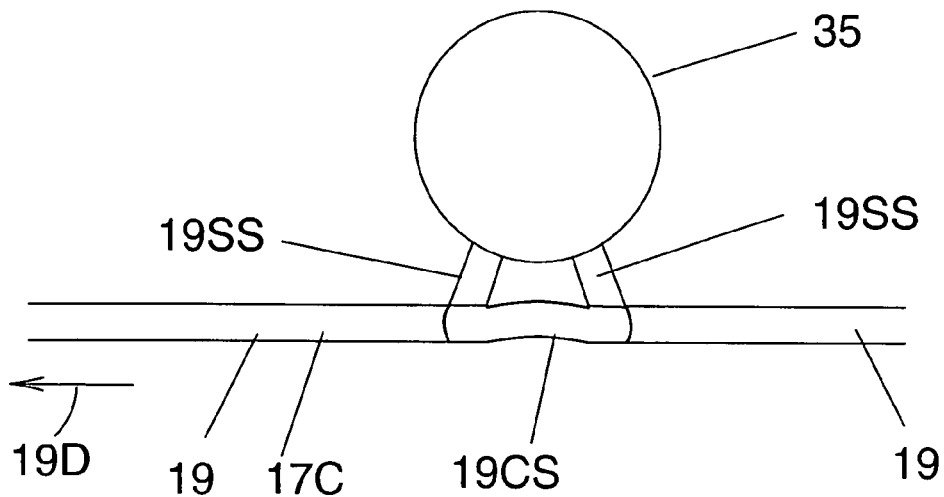
FIGS. 9A and 9B illustrate the use of cable design and connectivity to rotatable pulleys.
Figure 9B:
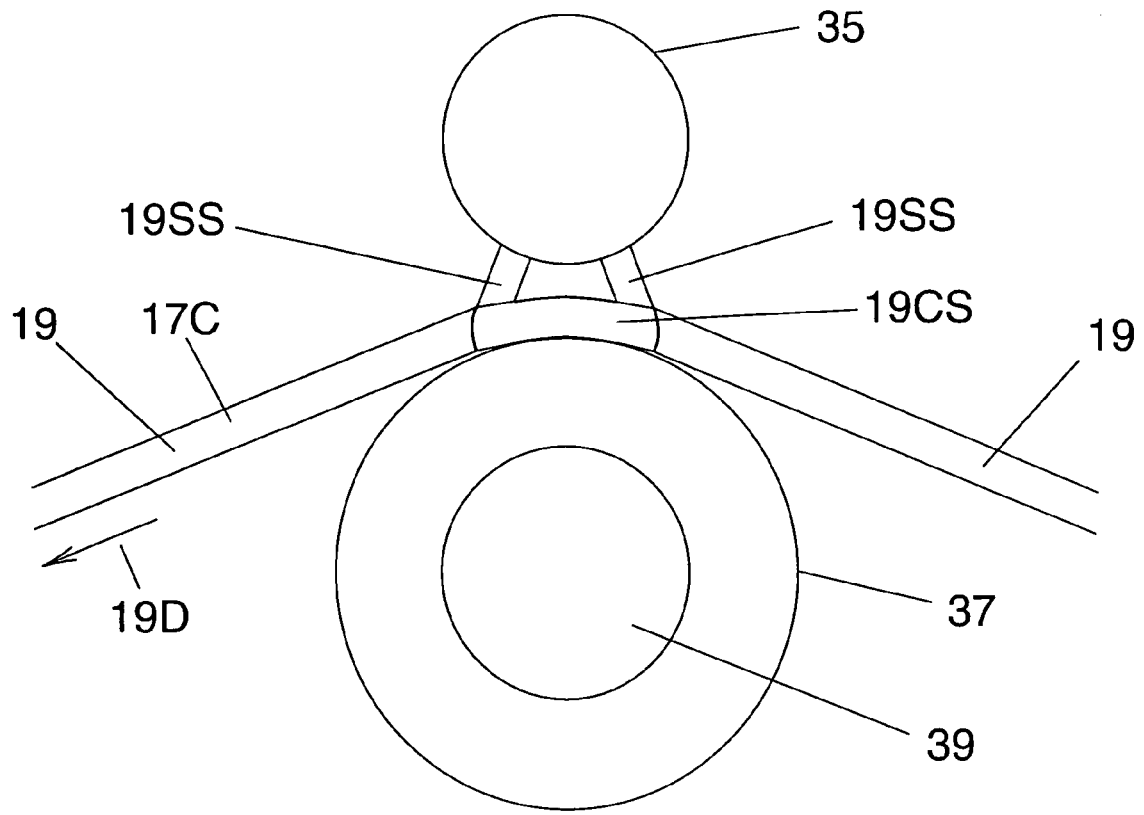

FIGS. 9A and 9B illustrate the use of cable design and connectivity to rotatable pulleys, for embodiments of the invention in the general class of the embodiment of FIGS. 1, 2A and 2B, for example.

FIG. 9A shows a fluid-foil base member 35 connected to a substantially closed-loop cable 17C that serves as a connecting member 19 for connecting adjacently located fluid-foil means, and that moves in a cable travel direction 19D. The fluid-foil base member 35 is connected to the cable by cable support structure 19SS, which includes a curved segment structure 19CS.

FIG. 9B shows the same fluid-foil base member 35 and the substantially closed-loop cable 17C as they rotate around a rotatable pulley 37 spinning around a hub 39. Note that the use of the curved segment structure 19CS facilitates the smooth engagement and rotation of the cable, the curved segment structure 19CS, the cable support structure 19SS and the fluid-foil base member 35 around the pulley 37. In an alternate embodiment smooth engagement and rotation could be accomplished with the curved segment structure deleted, and just the flexible cable 17C between two attach points of the cable support structure 19SS with the cable 17C.

FIGS. 10A through 10D illustrate aspects of control system means for controlling the wind energy harvesting system.

Figure 10A:
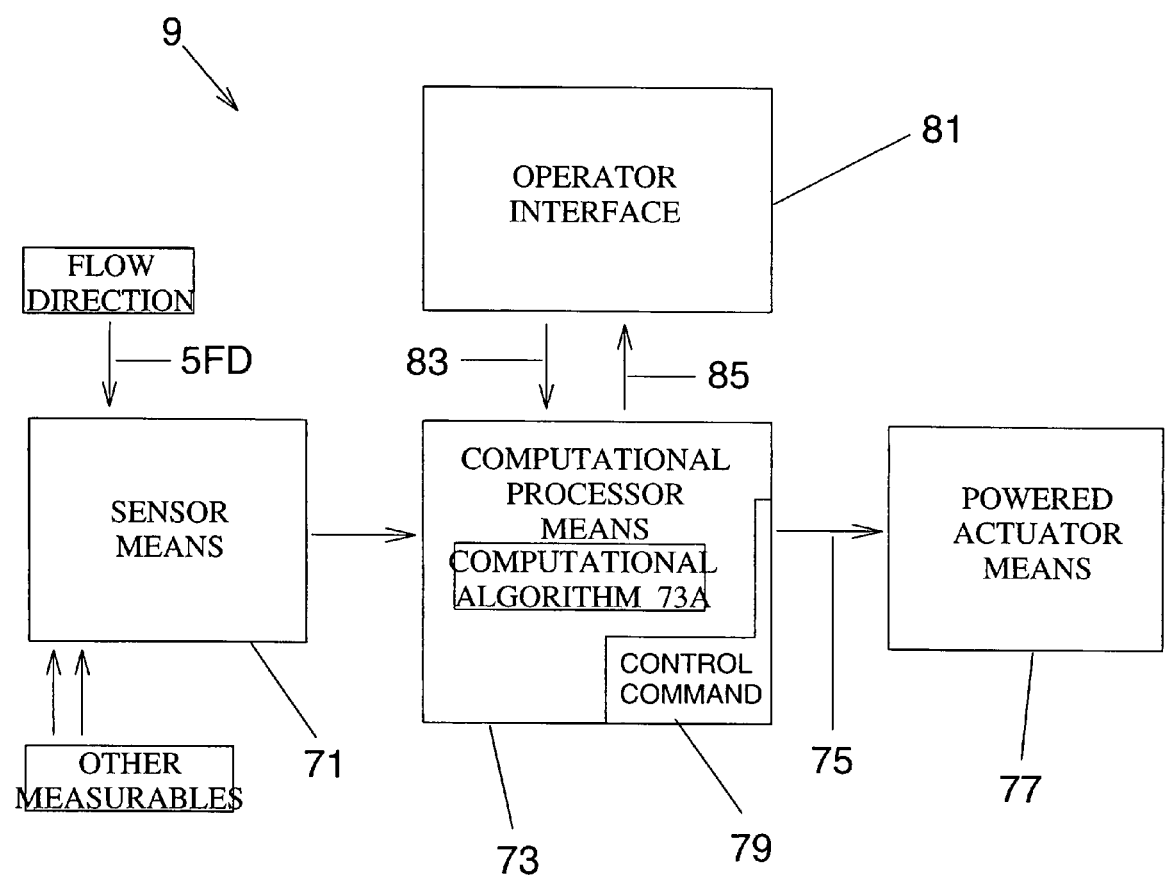
FIGS. 10A through 10D illustrate aspects of control system means for controlling the wind energy harvesting system.

FIG. 10A illustrates a representative control system block diagram for a wind energy harvesting system, wherein control system means 9 for controlling time-variable orientations of fluid-foil means, comprises (i) sensor means 71 for sensing the flow direction 5FD of an air current (such as a wind) and optionally for sensing other measurables, (ii) computational processor means 73 with at least one computational algorithm 73A for generating a control command 79 as a function of said flow direction 5FD, (iii) at least one powered actuator means 77 for executing the control command 79, and (iv) at least one signal transmission means 75 for transmitting a signal containing said control command 79 from said computational processor means 73 to said powered actuator means 77. The powered actuator means 73 can either directly control the orientation of the fluid-foil means, e.g. with a rotary or linear actuator or actuators, and/or indirectly control orientation of fluid-foil means using a control tab or other means for controlling including means for controlling at least one of a control surface 9CS, tab 3TAB, flap 3F, blown flap 3BF, slat 3SL, and morphing shape aerodynamic member 3MSA (not shown in this Figure but shown earlier). FIG. 10A also illustrates an optional operator interface 81 sending operator command(s) 83 to computational processor means 73 and receiving at least one of data and annunciation(s) 85 to an operator. An operator may actively control operation of the wind harvesting system, or in alternate embodiments monitor its automatic operation and only intervene or override for non-normal, failure or emergency situations.

Figure 10B:
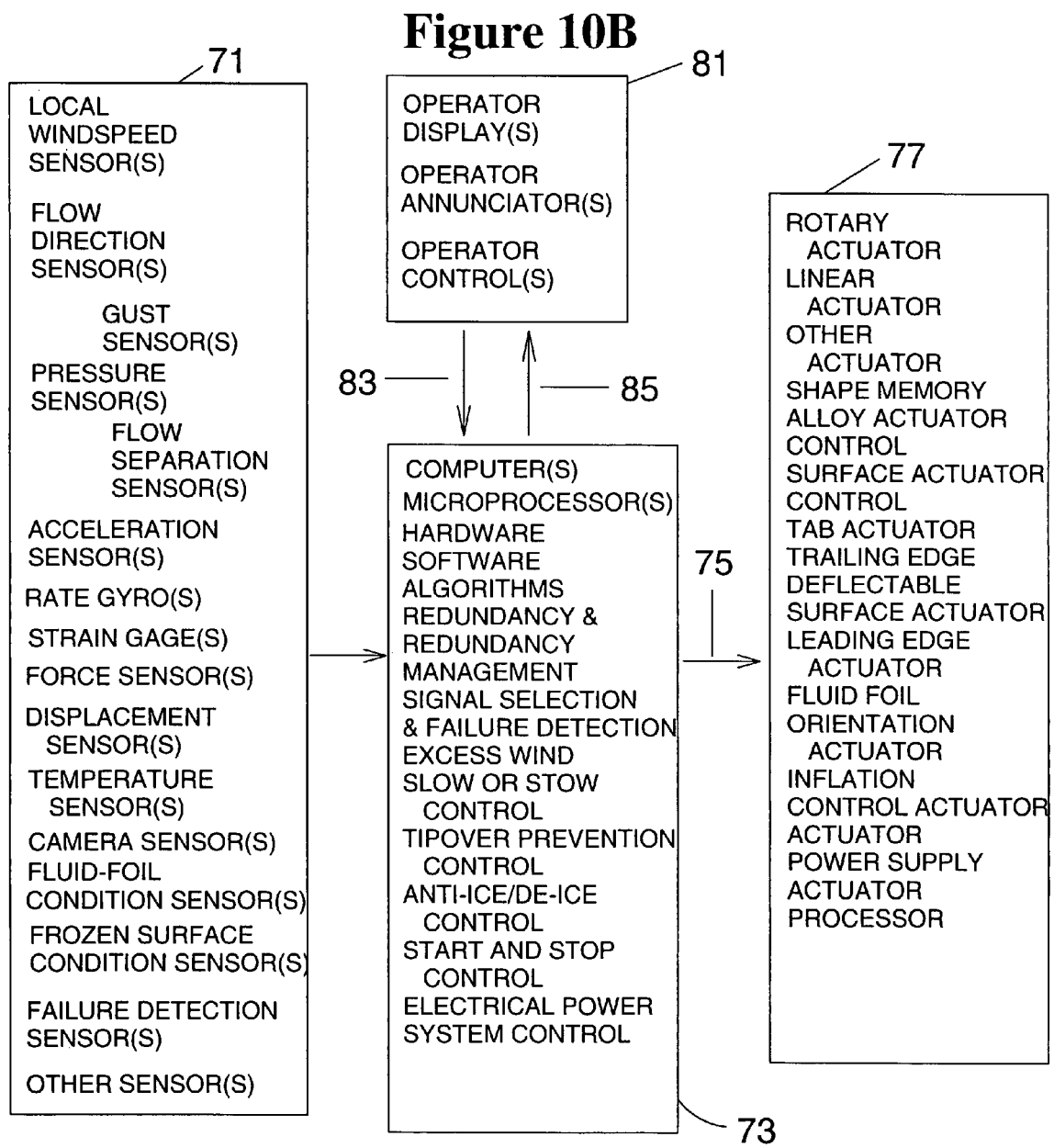

FIG. 10B illustrates several optional sub-elements which may reside in each of the blocks of the control system shown in FIG. 10A. The elements in the sensor means 71 could include a local windspeed sensor, flow direction sensor, gust sensor, pressure sensor, acceleration sensor, rate gyro, force sensor, displacement sensor, temperature sensor, camera sensor, fluid-foil condition sensor, frozen surface condition sensor, failure detection sensor and/or other sensor(s). The computational processor means 73 could include a computer, a microprocessor, hardware, software algorithms, redundancy and redundancy management, sensor signal selection and failure detection, excess wind stow or slow control, tipover prevention control, anti-ice/de-ice control, start and stop control and/or electrical power system control. The powered actuator means 77 could include a rotary actuator, a linear actuator, other actuator, a shape memory alloy actuator, a control surface actuator, a control tab actuator, a trailing edge deflectable surface actuator, a leading edge actuator, a fluid-foil orientation actuator, an inflation control actuator, an actuator power supply and/or actuator processor. The optional operator interface 81 could include one or more of an operator display, an operator annunciator, and/or an operator control.

Figure 10C:
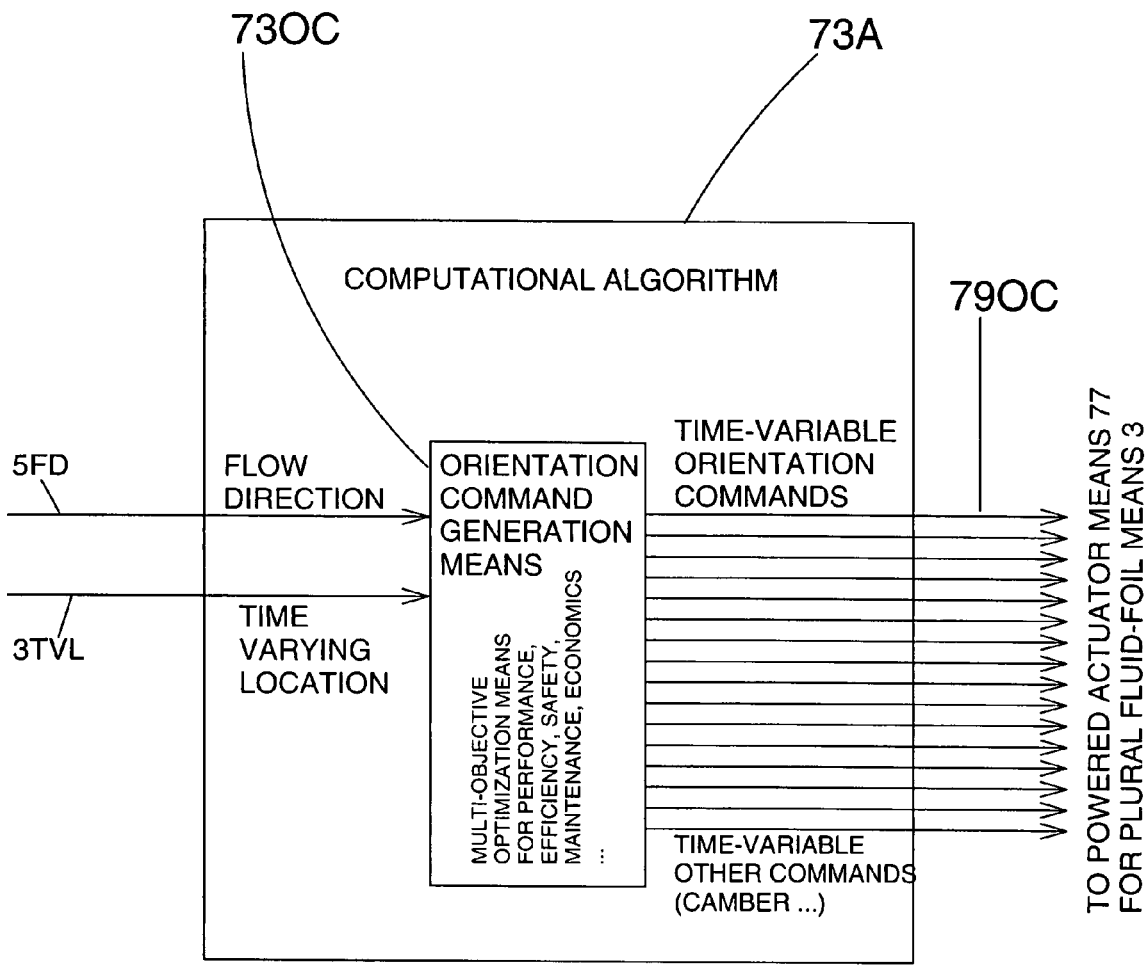

FIG. 10C illustrates for a wind energy harvesting system, a computational algorithm 73A that comprises orientation command generation means 73OC for generating time-variable orientation commands 79OC for each of plural fluid-foil means 3 as a function of at least one of said flow direction 5FD and time-varying location 3TVL of at least one of said plural fluid-foil means 3, which time-variable orientation commands if properly executed by the at least one powered actuator means 77, would result in time-variable orientations of said plural fluid-foil means 3 that tend to substantially maximize the net work on the fluid-foil means 3 over the course of a cycle of substantially periodic motion of the fluid-foil means, through time-variable fluid-dynamic pressure distributions that tend to substantially maximize resulting forces acting on the fluid-foil means 3 to drive said substantially periodic motion when an air current 5 exists and carries wind energy in the form of fluid-dynamic kinetic energy.

Figure 10D:
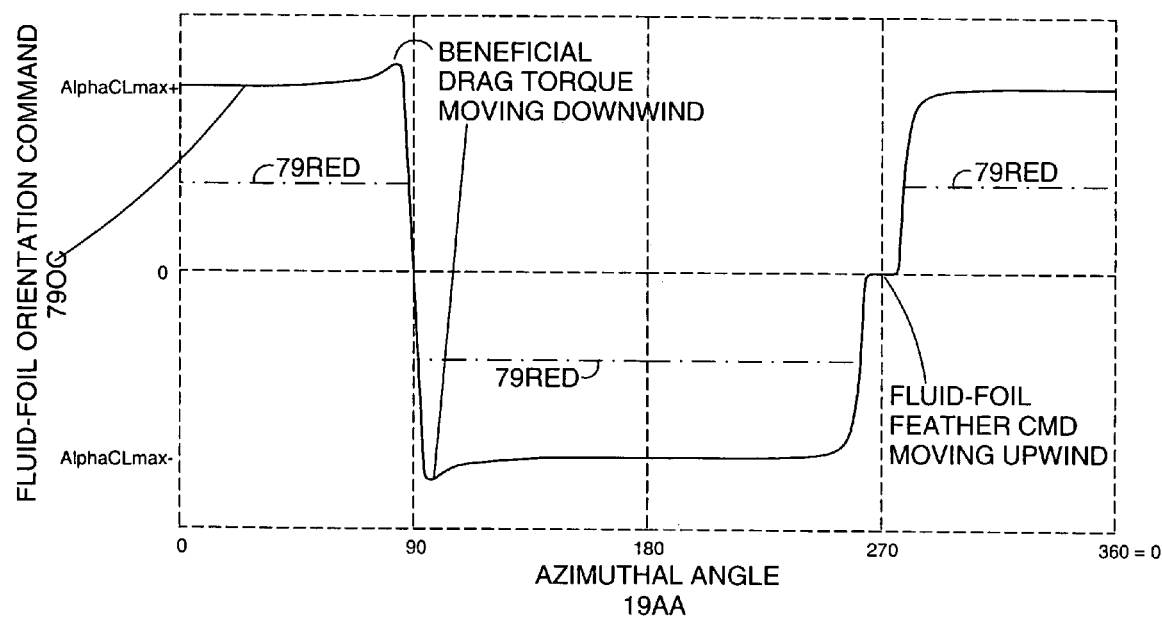

FIG. 10D illustrates a representative fluid-foil orientation command 79OC schedule as a function of the azimuthal angle 19AA along the rotational direction of motion 19RD, starting with 0 at incoming flow direction 5FD, as described earlier in the context of FIG. 3A. In this representative preferred schedule, note that the fluid-foil is commanded to a maximum lift coefficient ($C_L$) orientation for the crosswind legs of its motion, while it can be commanded to a beneficial drag torque orientation on the peak downwind leg of motion near 90 deg azimuthal angle, and to a minimum drag feathered orientation on the peak upwind leg of motion near 270 deg azimuthal angle. Variant algorithms for fluid-foil orientation commands as a function of various sensor inputs and to achieve multiple objectives, are possible within the spirit and scope of the invention as claimed. For excessively high wind speed or storm conditions where the fluid-foils may be at risk of excess loads or of tipping over, the orientation commands can be diminished or reduced as shown in the dot-dashed lines for reduced magnitude orientation commands 79RED. The reduced magnitude orientation commands can optionally vary in magnitude as a function of azimuthal angle and other parameters such as wind speed or algorithmically calculated tipping risk. While this orientation schedule has been shown for embodiment similar to those of FIGS. 3A, 3B, 3C and 3D, it should be understood that functionally analogous schedules can be defined for the cable connected fluid-foil embodiments such as shown in FIGS. 1, 2A, 2B, 2C, 2D, 2E and 2F.

FIGS. 11A through 11G illustrate a variety of anchoring means.

Figure 11A:
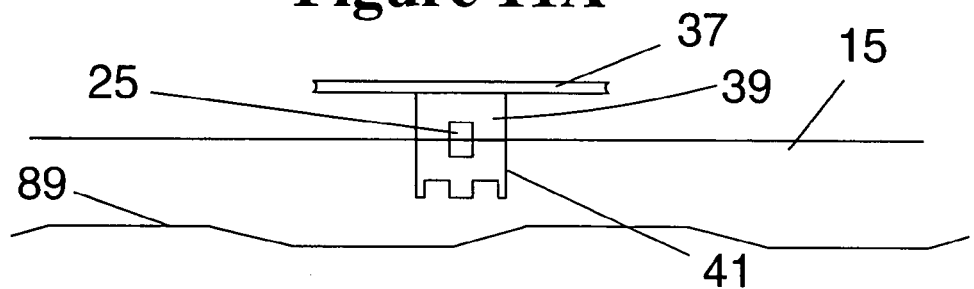

FIG. 11A illustrates a pulley hub 39 supporting a rotatable pulley 37 (through bearing means not shown), wherein the hub 39 is anchored in a frozen surface 15 by means for anchoring 41 it in that frozen surface. The hub contains energy harvesting means 25 as illustrated in this embodiment and as earlier illustrated in FIGS. 1 and 2A. anchored in a frozen surface 15 by means for anchoring 41 it in that frozen surface.

Figure 11B:
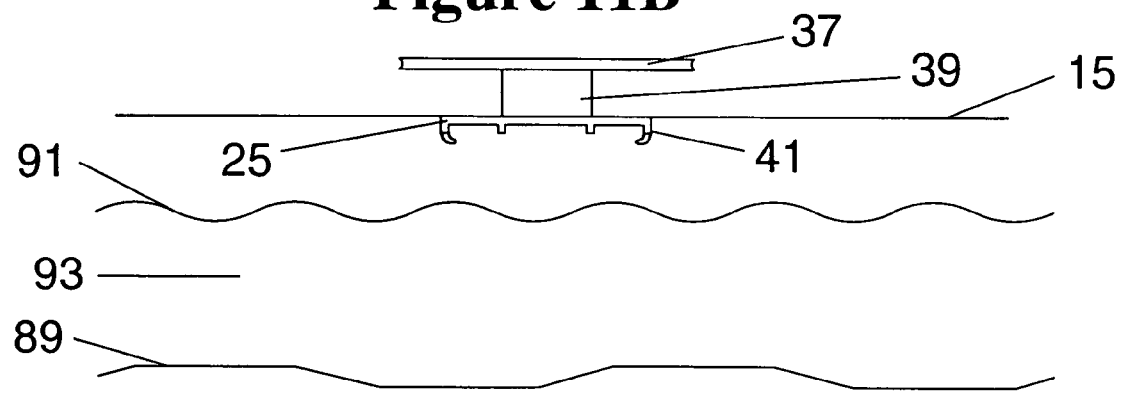

FIG. 11B shows a variant embodiment wherein the means for anchoring 41 have a different configuration as illustrated, for anchoring the hub 39 to the frozen surface 15. The frozen surface 15 is floating above a liquid water layer 93 with the bottom of the frozen surface being an ice/water interface 91. The liquid water layer 93 in turn is located above a ground surface 89 which is here an underwater ground surface.

Figure 11C:
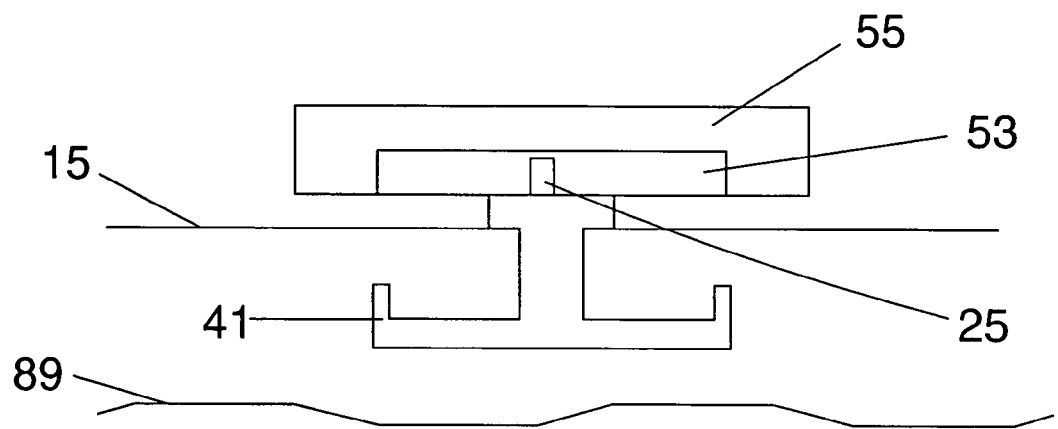

FIG. 11C shows another variant embodiment wherein a nonrotating hub 53 supports a rotatable structure 55, as for instance in the earlier illustrated embodiments of FIGS. 3A, 3B and 3C. The nonrotating hub 53 is anchored in a frozen surface 15 by means for anchoring 41 it in that frozen surface. The hub contains energy harvesting means 25. anchored in a frozen surface 15 by means for anchoring 41 it in that frozen surface. The hub contains energy harvesting means 25

FIG. 11D shows a variant embodiment wherein the means for anchoring 41 have a different configuration as illustrated, for anchoring the nonrotating hub 53 to the frozen surface 15. The frozen surface 15 is a frozen water surface 93F that is floating above a liquid water layer 93 with the bottom of the frozen surface being an ice/water interface 91. The liquid water layer 93 in turn is located above a ground surface 89 which is here an underwater ground surface.

FIG. 11E shows a variant embodiment where the frozen surface 15 is a frozen slush surface 93FS, and the means for anchoring 41 include at least one ground anchor 89A that is fastened into a ground surface 89, as illustrated. A frozen slush surface can occur when surface melting or ponding occurs on an ice sheet, ice shelf or sea ice surface, as for instance on a warm and/or sunny summer day in polar regions.

Figure 11F:
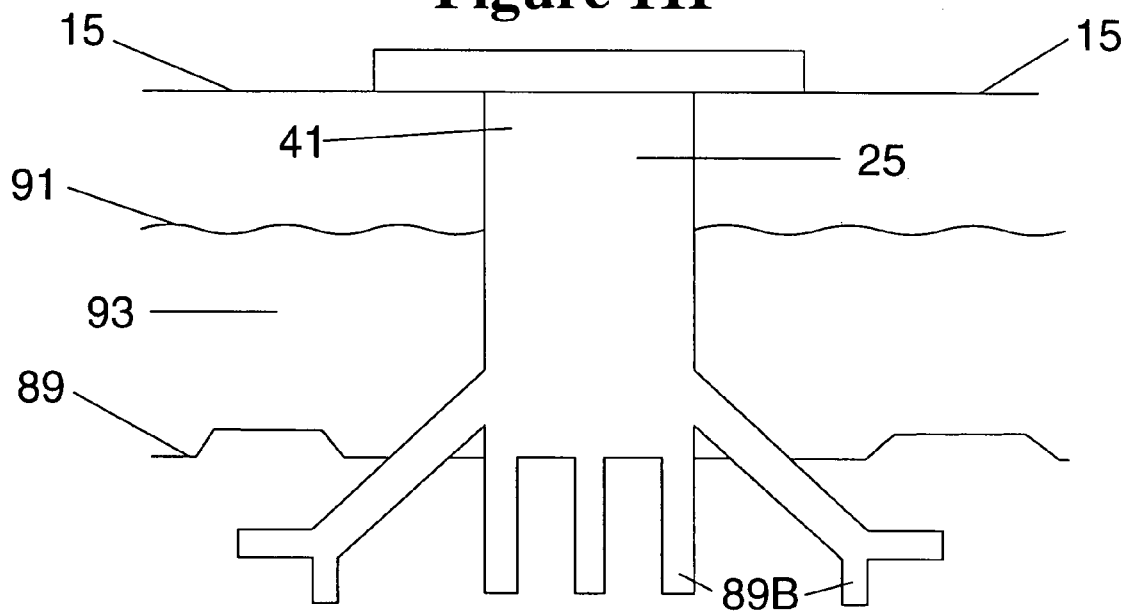

In similar manner FIG. 11F shows a variant embodiment where the frozen surface 15 is floating above a liquid water layer 93 with the bottom of the frozen surface being an ice/water interface 91, and with the liquid water layer 93 in turn being located above a ground surface 89 which is here an underwater ground surface. The illustrated means for anchoring 41 penetrates through both the frozen surface 15 and the liquid water layer 93, to be anchored into the ground surface 89 by at least one underwater ground anchor 89B.

Figure 11G:
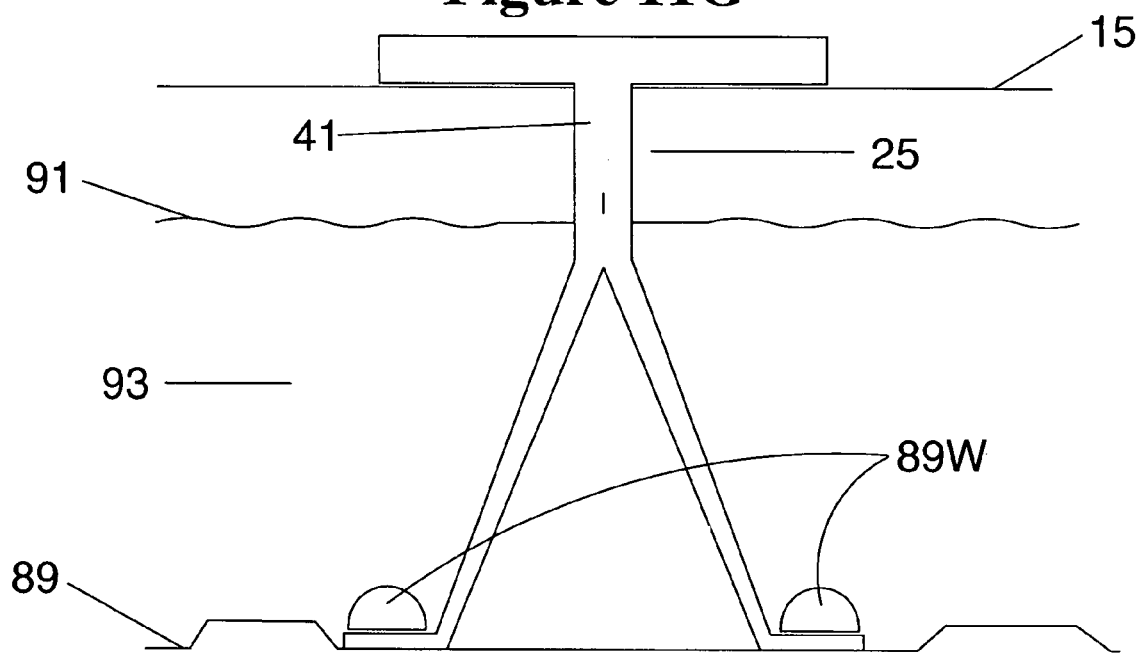

FIG. 11G shows a variant relative to FIG. 11F, where at least one underwater weight 89W is used to enable friction anchoring of the device to the ground surface 89.

Thus FIGS. 11A through 11G together illustrate how a wind energy harvesting system can be set on a frozen surface 15, wherein said frozen surface 15 comprises at least one of a snow surface, an ice surface, a frozen surface supported directly upon a ground surface 89, a frozen surface floating above a liquid water layer 93, a frozen slush surface 93FS, and a frozen water surface 93F; wherein said frozen water surface 93F comprises a frozen surface of at least one of an ocean, a sea, an inlet, a bay, a gulf, a sound, a strait, a channel, a passage, an arm, a reach, a harbor, a port, an estuary, a lake, a reservoir, a pond, a pool, a river, a stream, a brook, a creek, a canal, a bog, a swamp, a slough, a marsh, a glacier, an ice shelf, an ice sheet, an ice cap, an ice field and a snow field.

Note that said frozen water surface 93F comprises frozen $H_2O$ and also in many situations comprises other substances in minority portions.

Figure 12:
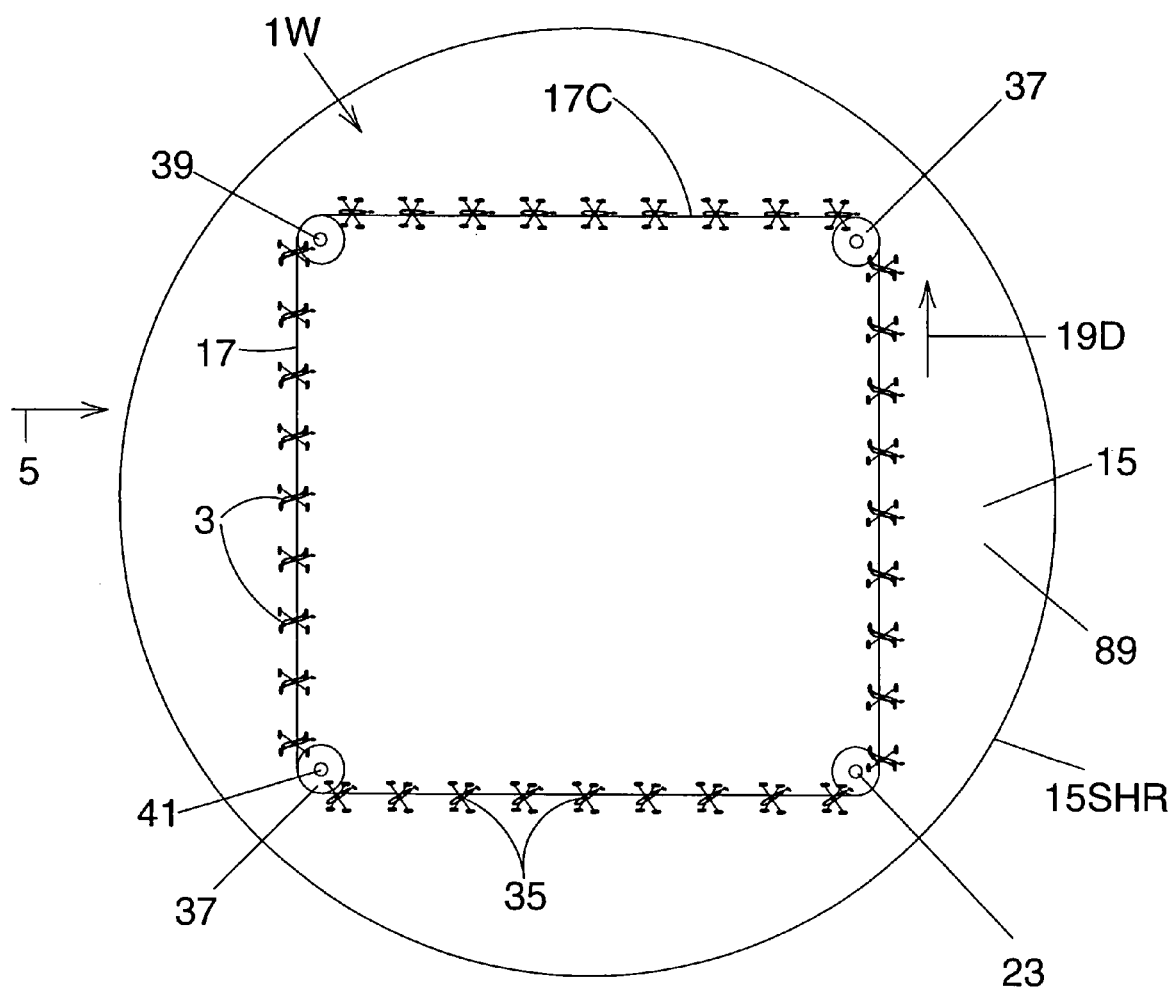
FIG. 12 presents a plan view illustration of position-keeping means for maintaining a wind energy harvesting system within a desired geographic envelope.

FIG. 12 shows a plan-view illustration of a representative position-keeping means for maintaining a wind energy harvesting system within a desired geographic envelope. A wind energy harvesting system 1W is illustrated, wherein said connecting means 17 includes a substantially closed-loop cable 17C linking fluid-foil base members 35 supporting all of said plural fluid-foil means 3 in a closed-loop sequential arrangement with closed periphery topology; wherein the closed-loop cable 17C loops around at least two rotatable pulleys 37; and wherein said position-keeping means 23 for maintaining said wind energy harvesting system substantially within a desired geographic envelope includes means for anchoring 41 hubs 39 of said pulleys 37 in at least one of said frozen surface 15 and a ground surface 89 beneath the frozen surface 15.

FIG. 13 shows a plan view of a wind energy harvesting system 1W similar to that of FIGS. 3C and 3D, further comprising at least one of means for storing energy 43S, means for transmitting energy 43T, means for processing energy 43PR and means for conditioning energy 43C. Examples of means for storing energy 43S include battery and/or capacitor and/or nanotech capacitor means for storing electrical energy, mechanical means such as a flywheel, chemical means such as electrolysizing water to produce hydrogen, and energy storage as gravitational potential energy or in pressurized fluid. Examples of means for transmitting energy 43T include electrical wires and cables. Examples of means for processing energy 43PR include voltage converters, transformers, AC/DC converters, rectifiers, and similar processing and conversion devices known from the prior art. Examples of means for conditioning energy 43C include surge protectors, means for shaping and/or smoothing alternating currents, and similar conditioning devices known from the prior art.

FIGS. 14A, 14B, 14C and 14D show side views of the support runner means of FIG. 4I, on water, snow, ice and thin ice over water.

Figure 14A:
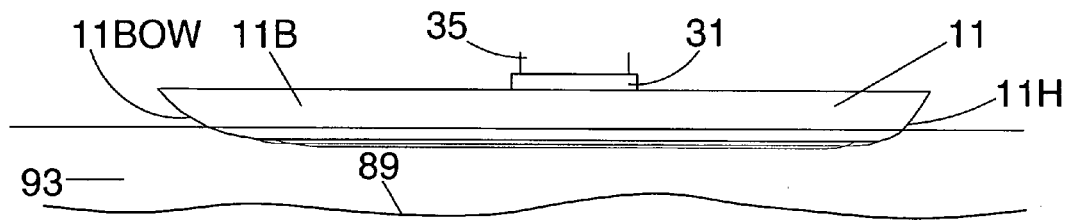
FIGS. 14A, 14B, 14C and 14D show side views of the support runner means of FIG. 41, on snow, ice, water and thin ice over water.

FIG. 14A shows a support runner means 11 comprising buoyant support runner means 11B including a hull 11H, for the case when the frozen surface has melted either locally (e.g., an ice pond on an ice shelf or a polar ice sheet) or throughout the geographic envelope wherein the wind energy harvesting system is located (e.g., at a site where a frozen water surface fully thaws out into liquid water in a summer season). The hull 11H includes a bow section 11BOW of the hull. The hull 11H is shown floating in a liquid water layer 93 above a ground surface 89. The hull element provides most of a slide and support function on a liquid water surface, as illustrated.

Figure 14B:
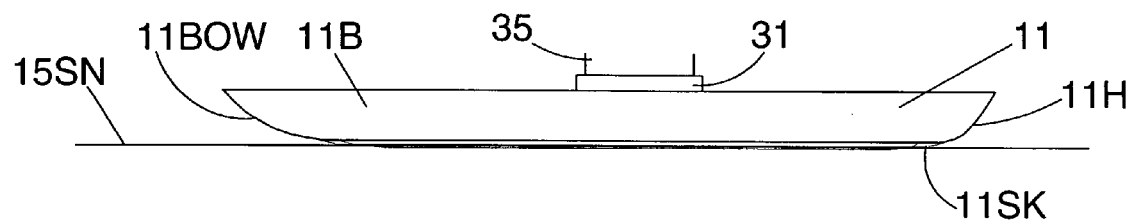

FIG. 14B shows the same support runner 11, on a snow surface 15SN above a ground surface 89. In the illustrated embodiment, the bottom surface of the hull 11H includes a ski 11SK that may simply be a modest downward local projection of the hull undersurface in the shape of a ski, which glides upon the snow surface 15SN. The ski element provides most of the slide and support function on a snow surface, as illustrated.

Figure 14C:
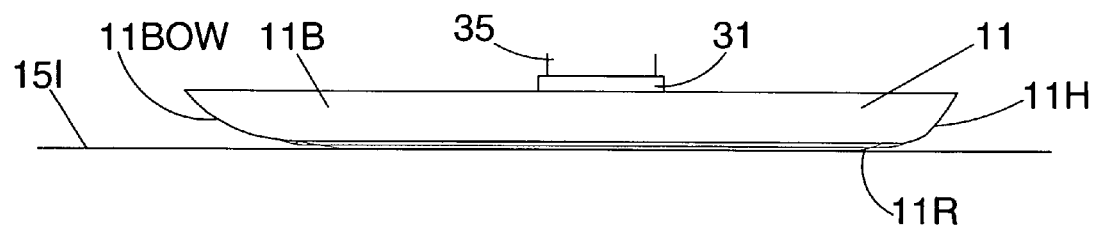

FIG. 14C shows the same support runner 11, on an ice surface 15I which may be above either a water layer or directly situated upon a ground surface. The support runner 11 includes runner elements 11R (e.g., skate blade type elements) that project downward preferably a little lower than the hull and ski undersurfaces, which runner elements 11R run on the ice surface 15I. The runner (or skate) elements provide most of the slide and support function on an ice surface, as illustrated.

Figure 14D:
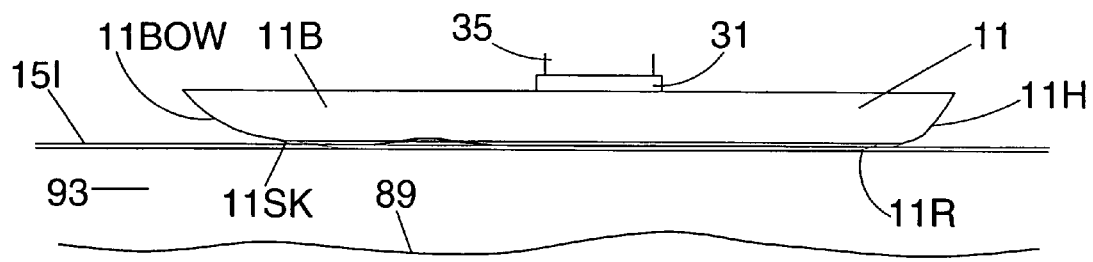

FIG. 14D shows the same support runner 11 comprising buoyant support runner means 11B, on a thin ice surface 15I over a liquid water layer 93 above a ground surface 89. In this case the buoyant support runner means 11B including the hull 11H, the ski 11SK and the runner elements 11R all contribute to some extent to collectively support a fluid-foil through a fluid-foil base member 35; and the buoyant support runner means 11B will provide low friction means for running on a variety of surfaces including ice, snow, slush, water with frazil ice and/or ice pancakes and/or nilas ice and/or columnar ice, sea ice, ice with surface frost flowers, ice with surface pressure ridges (unless they are too tall), ice floes, porridge ice, black ice, pack ice, lake ice, melt ponds, liquid water and any combinations of these.

Figure 15A:
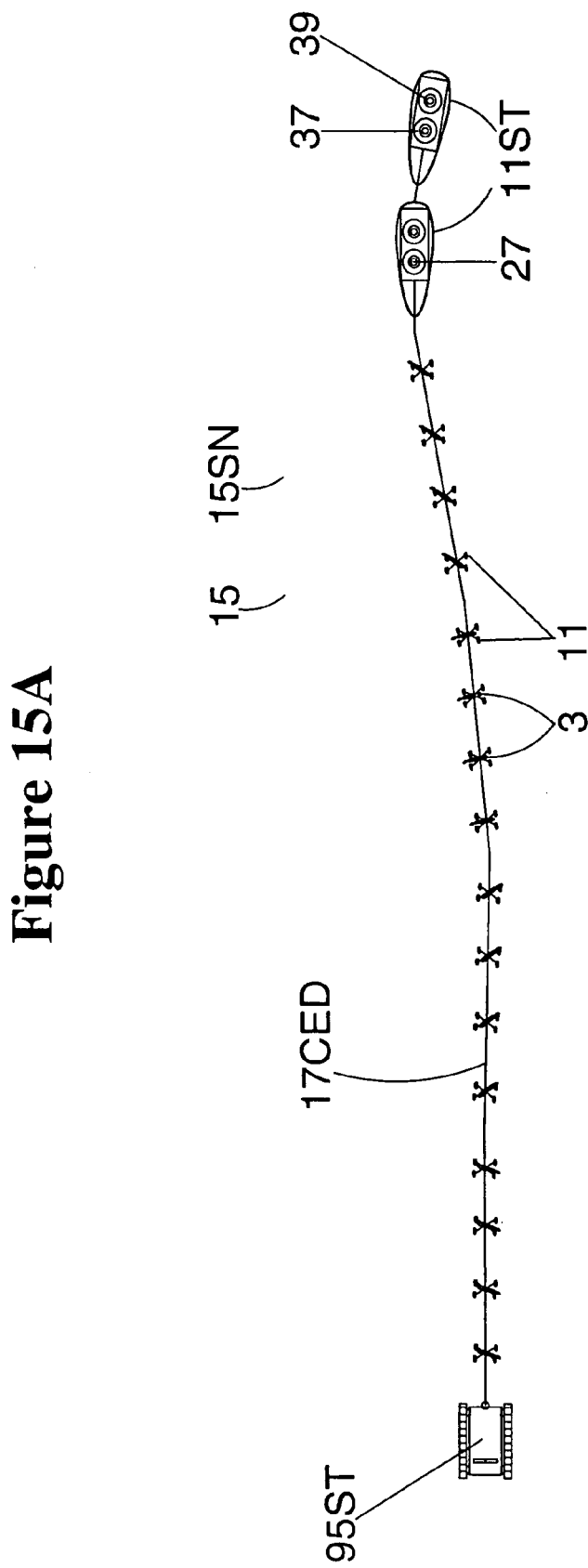
FIGS. 15A and 15B show plan views of means for transporting wind energy harvesting systems over snow and water.
Figure 15B:
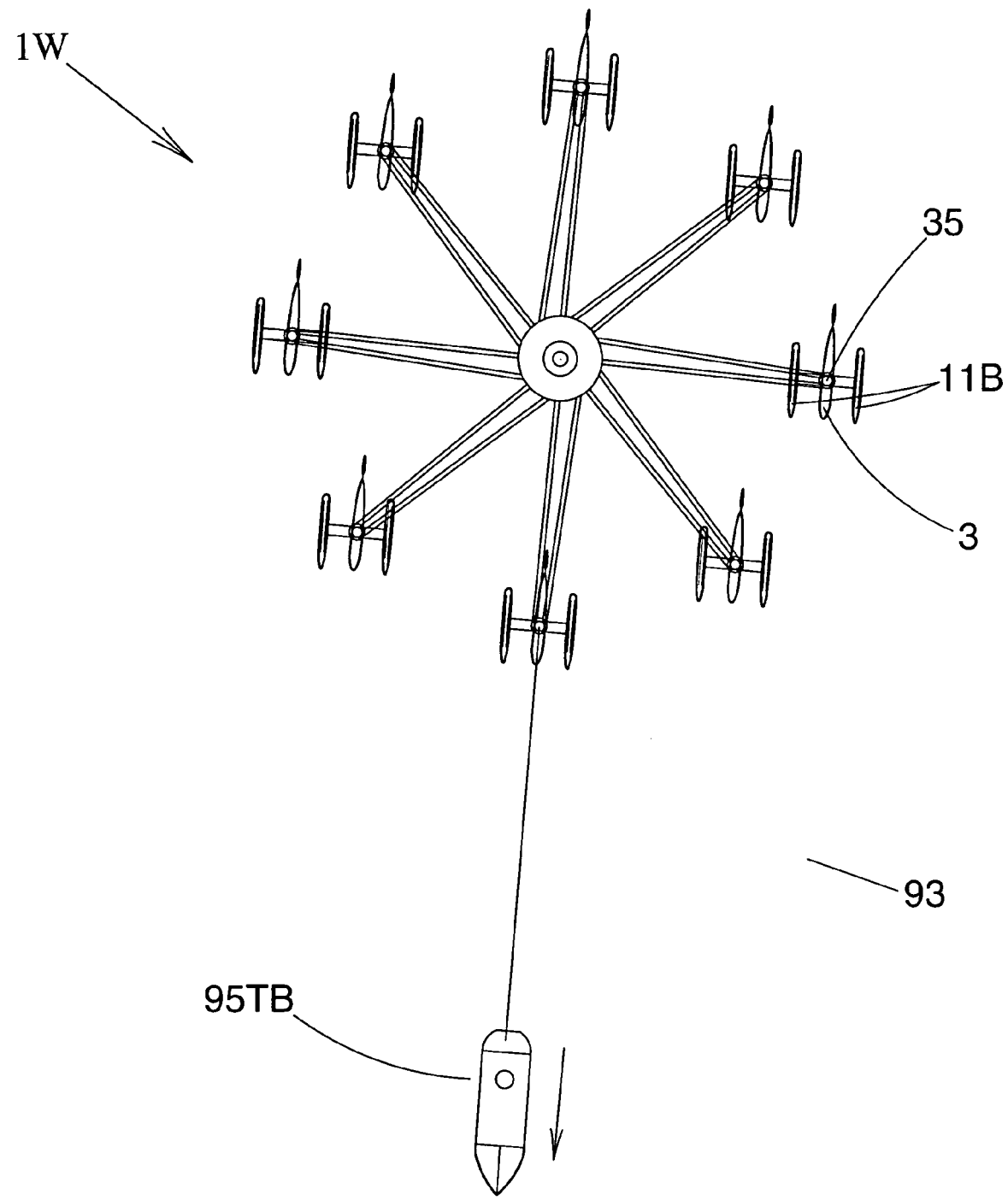

FIGS. 15A and 15B show plan views of means for transporting wind energy harvesting systems over snow and water.

FIG. 15A shows an embodiment of a wind energy harvesting system such as that of FIGS. 1, 2A and 2B being transported over a snow surface 15SN, with the substantially closed-loop cable in a non closed-loop configuration with two ends disconnected 17CED, and at least one snow tractor 95ST with caterpillar treads towing the train of fluid-foil means 3 supported by support runner means 11, over the snow surface 15SN, to a site for location of the wind energy harvesting system. Other elements of the system such as the rotatable pulleys 37, the hubs 39, and energy conversion means 27 and more, are shown being transported by a sled train 11ST, also towed by the at least one snow tractor 95ST. While two snow tractors 95ST are shown in the illustrated embodiment, in variant embodiments one or multiple snow tractors and/or trains of towables may be used. This kind of snow transportation system can be used in many sites, for example with the devices being brought by ship or barge to a shoreline location in the summer, then towed over a natural snow surface to a desired location and installation site, in the winter.

FIG. 15B shows an embodiment of a wind energy harvesting system 1W such as that of FIGS. 3D and 3C, being towed by at least one tugboat 95TB on a liquid water layer 93 as in a summer weather situation when the frozen surface is fully or mostly melted as needed for a tugboat to operate and tow the wind energy harvesting system 1W.

Figure 16:
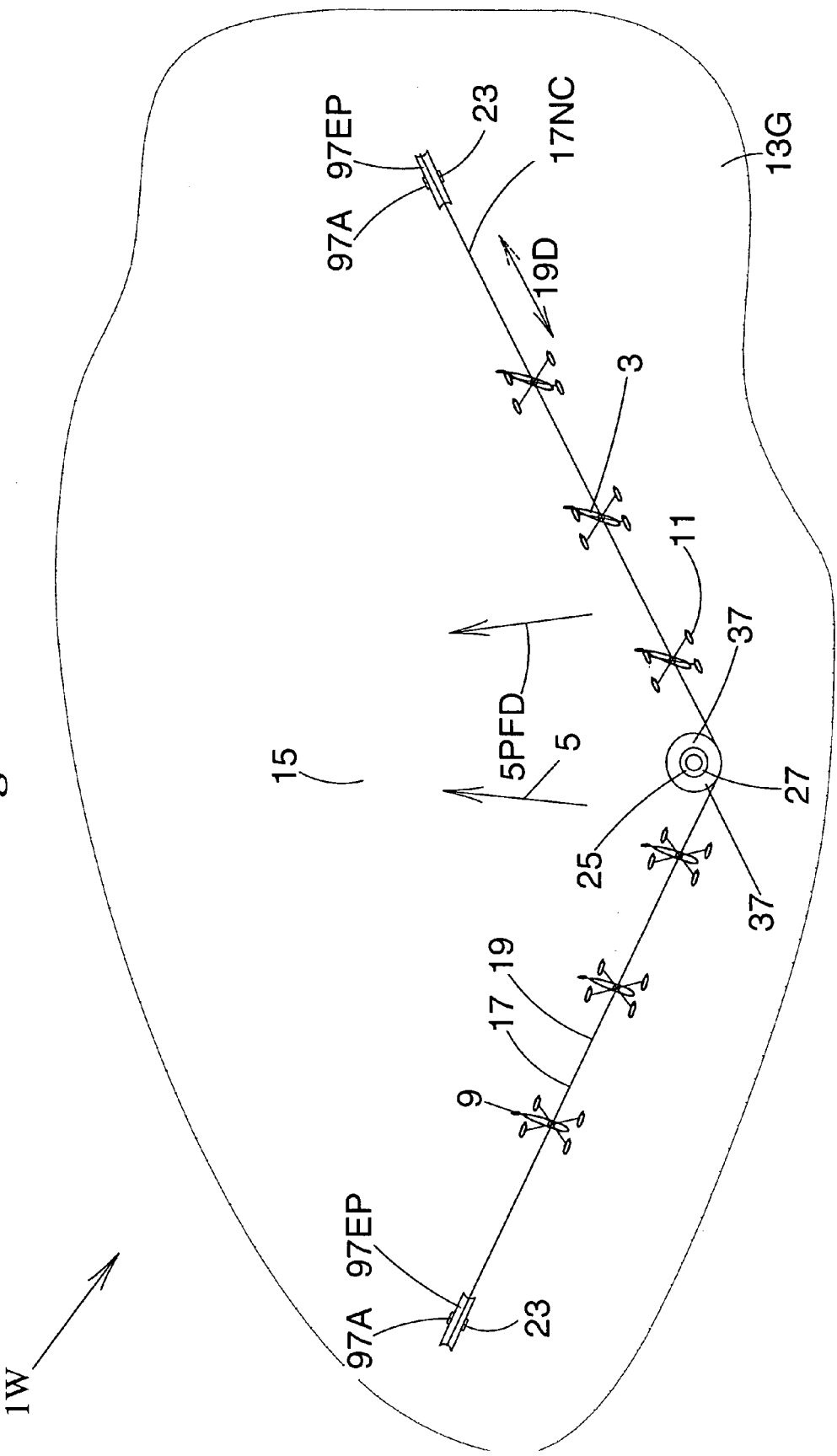
FIG. 16 shows a plan view of a periodically oscillating embodiment of a wind energy harvesting system.

FIG. 16 shows a plan view of a periodically oscillating embodiment of a wind energy harvesting system 1W. The system may be compared with the embodiment of FIG. 2B, but now the substantially closed-loop cable 17C is replaced by a substantially non-closed loop cable 17NC, which terminates at two ends wound around end pulleys 97EP which rotate around end hubs which are anchored by end anchor means 97A. The substantially periodic motion of the fluid-foil means is now oscillatory rather than cyclic, but wind renewable energy can nevertheless be extracted by energy conversion means 27 that extract energy as the cable 17NC strokes in each of two directions (direction 19D on solid arrowhead direction, then opposite direction in dashed arrowhead direction), or optionally in only one stroke direction. The support runner means 11 will. preferably have ski shovels on both ends, or upwardly curved bows or blade ends or runner ends on both ends of each runner, to facilitate the bidirectional oscillatory motion of the system. The energy conversion means is shown here connected with the intermediate rotatable pulley(s) 37, but could alternatively be connected with the end pulleys 97EP in variant embodiments. While the illustrated embodiment has one rotatable pulley 37, in alternate embodiments two or plural rotatable pulleys 37 may evidently be used. In regions where a very strong prevailing wind direction exists, such as on the Cook Ice Cap on Kerguelen Island in the South Indian Ocean, where there is a very strong prevailing westerly wind, a version with zero rotatable pulleys may effectively be used, in a manner analogous to the case for the embodiment in FIG. 2D. Variant embodiments with different numbers and/or sizes of wind foil elements connected by cable are clearly possible, within the spirit and scope of the invention.

The embodiment of FIG. 16 therefore shows a wind energy harvesting system 1W, comprising:

plural fluid-foil means 3 for contacting proximate flow fields of an air current 5 when said air current exists and carries wind energy in the form of fluid-dynamic kinetic energy;

control system means 9 for controlling time-variable orientations of said fluid-foil means 3 relative to said proximate flow fields of said air current 5 when said air current exists and carries wind energy in the form of fluid-dynamic kinetic energy;

support runner means 11 for slidably engaging a frozen surface 15 and for contributing to supporting said fluid-foil means 3 substantially above said frozen surface 15;

connecting means 17 for connecting said plural fluid-foil means 3 in a sequential arrangement, including connecting members 19 that connect adjacently-located fluid-foil means in said sequential arrangement;

position-keeping means 23 for maintaining said wind energy harvesting system 1W substantially within a desired geographic envelope 13G; and energy harvesting means 25 including said control system means 9, for converting a portion of said fluid-dynamic kinetic energy into net work on said fluid-foil means 3 over the course of a cycle of substantially periodic motion of said fluid-foil means 3, by utilizing time-variable fluid-dynamic pressure distributions and resulting forces acting on said fluid-foil means 3 at said time-variable orientations to contribute to driving said substantially periodic motion when said air current 5 exists and carries wind energy in the form of fluid-dynamic kinetic energy;

said energy harvesting means 25 further including energy conversion means 27 for converting at least some of said net work into energy in a desired form for at least one of transmission, storage, processing and use.

The embodiment of FIG. 16 also illustrates a wind energy harvesting system 1W, comprising:

plural fluid-foil means 3 for contacting proximate flow fields of an air current 5 when said air current exists and carries wind energy in the form of fluid-dynamic kinetic energy;

control system means 9 for controlling time-variable orientations of said fluid-foil means 3 relative to said proximate flow fields of said air current 5 when said air current exists and carries wind energy in the form of fluid-dynamic kinetic energy;

support runner means 11 comprising at least one of a ski, a snowboard, a sled, a skate, a runner, an inflatable tube, a pontoon, and a hull with runners, for slidably engaging a frozen surface 15 comprising at least one of a snow surface, an ice surface and a frozen water surface, and for contributing to supporting said fluid-foil means 3 substantially above said frozen surface 15;

connecting means 17 for connecting said plural fluid-foil means 3 in a sequential arrangement, including connecting members 19 that connect adjacently-located fluid-foil means in said sequential arrangement;

position-keeping means 23 for maintaining said wind energy harvesting system 1W substantially within a desired geographic envelope 13G; and energy harvesting means 25 including said control system means 9, for converting a portion of said fluid-dynamic kinetic energy into net work on said fluid-foil means 3 over the course of a cycle of substantially periodic motion of said fluid-foil means, by utilizing time-variable fluid-dynamic pressure distributions and resulting forces acting on said fluid-foil means 3 at said time-variable orientations to contribute to driving said substantially periodic motion when said air current 5 exists and carries wind energy in the form of fluid-dynamic kinetic energy;

said energy harvesting means 25 further including energy conversion means 27 for converting at least some of said net work into energy in a desired form for at least one of transmission, storage, processing and use.

While certain preferred embodiments of the invention have been described in detail with reference to the accompanying Figures, it should be understood that further variants are possible within the spirit and scope of the invention as described in the following claims.

Acknowledgement

The inventor offers grateful thanks to God for inspiring this work; and to his wife and son, Usha Sankrithi and Siva Sankrithi, for their steadfast support as well as thought-provoking discussion helping to identify benefits and issues related to the invention.

What is claimed is:

1. A wind energy harvesting system, comprising:
    plural fluid-foil means for contacting proximate flow fields of an air current when said air current exists and carries wind energy in the form of fluid-dynamic kinetic energy;
    control system means for controlling time-variable orientations of said fluid-foil means relative to said proximate flow fields of said air current when said air current exists and carries wind energy in the form of fluid-dynamic kinetic energy;
    support runner means for slidably engaging a frozen surface and for contributing to supporting said fluid-foil means substantially above said frozen surface;
    connecting means for connecting said plural fluid-foil means in a sequential arrangement, including connecting members that connect adjacently-located fluid-foil means in said sequential arrangement;
    position-keeping means for maintaining said wind energy harvesting system substantially within a desired geographic envelope; and
    energy harvesting means including said control system means, for converting a portion of said fluid-dynamic kinetic energy into net work on said fluid-foil means over the course of a cycle of substantially periodic motion of said fluid-foil means, by utilizing time-variable fluid-dynamic pressure distributions and resulting forces acting on said fluid-foil means at said time-variable orientations to contribute to driving said substantially periodic motion when said air current exists and carries wind energy in the form of fluid-dynamic kinetic energy;
    said energy harvesting means further including energy conversion means for converting at least some of said net work into energy in a desired form for at least one of transmission, storage, processing and use.

2. The wind energy harvesting system of claim 1, wherein said frozen surface comprises at least one of a snow surface, an ice surface, a frozen surface supported directly upon a ground surface, a frozen surface floating above a liquid water layer, a frozen slush surface, and a frozen water surface; wherein said frozen water surface comprises a frozen surface of at least one of an ocean, a sea, an inlet, a bay, a gulf, a sound, a strait, a channel, a passage, an arm, a reach, a harbor, a port, an estuary, a lake, a reservoir, a pond, a pool, a river, a stream, a brook, a creek, a canal, a bog, a swamp, a slough, a marsh, a glacier, an ice shelf, an ice sheet, an ice cap, an ice field and a snow field.

3. The wind energy harvesting system of claim 1, wherein said support runner means comprise at least one of a ski, a snowboard, a sled, a skate, a runner, an inflatable tube, a pontoon, and a hull with runners, for slidably engaging said frozen surface and for permitting low friction translational sliding motion upon said frozen surface.

4. The wind energy harvesting system of claim 1, wherein said support runner means further comprises track fostering means for fostering desired lateral tracking of said support runner means upon said frozen surface, which track fostering means comprises at least one of an edge, a groove, a serrated surface, a blade, a keel and a rudder.

5. The wind energy harvesting system of claim 1, further comprising at least one of a connecting structure and a suspension element which suspension element comprises at least one of a spring element and a damper element, in the support path between said support runner means and said fluid-foil means.

6. The wind energy harvesting system of claim 1, wherein said air current comprises at least one of a wind, a gust, a mass flow of air, a volume flow of air, and a fluid-dynamic air movement induced by meteorological effects including but not limited to pressure differential effects; and wherein said fluid-foil means comprise at least one of a wing, a sail and a geometrically shaped aerodynamic member.

7. The wind energy harvesting system of claim 6, wherein said geometrically shaped aerodynamic member includes at least one of a substantially rigid airfoil member, a semirigid airfoil member, a flexible sail member, a multi-element aerodynamic member, a hybrid aerodynamic member, a morphing shape aerodynamic member, a flap, a blown flap, a slat, a control surface, a tab, a natural laminar flow airfoil, a hybrid laminar flow airfoil, an airfoil having a surface with riblets, and an inflatable airfoil member, wherein said inflatable airfoil member is inflated with at least one of air and a lifting gas comprising at least one of helium gas, hydrogen gas, and hot gas such as hot air.

8. The wind energy harvesting system of claim 1, wherein said control system means for controlling time-variable orientations of said fluid-foil means, comprises (i) sensor means for sensing the flow direction of said air current, (ii) computational processor means with at least one computational algorithm for generating a control command as a function of said flow direction, (iii) at least one powered actuator means for executing the control command, and (iv) at least one signal transmission means for transmitting a signal containing said control command from said computational processor means to said powered actuator means.

9. The wind energy harvesting system of claim 8, wherein said computational algorithm comprises orientation command generation means for generating time-variable orientation commands for each of said plural fluid-foil means as a function of at least one of said flow direction and time-varying location of at least one of said plural fluid-foil means, which time-variable orientation commands if properly executed by the at least one powered actuator means, would result in time-variable orientations of said plural fluid-foil means that tend to substantially maximize said net work on said fluid-foil means over the course of a cycle of substantially periodic motion of said fluid-foil means, through time-variable fluid-dynamic pressure distributions that tend to substantially maximize resulting forces acting on said fluid-foil means to drive said substantially periodic motion when said air current exists and carries wind energy in the form of fluid-dynamic kinetic energy.

10. The wind energy harvesting system of claim 9, wherein said control system means for controlling time-variable orientations of said fluid-foil means, includes means for controlling at least one of said control surface, tab, flap, blown flap, slat, and morphing shape aerodynamic member.

11. The wind energy harvesting system of claim 1, wherein said connecting members include at least one of a fluid-foil base member, beam structural element, tubular structural element, plate structural element, truss structural element, connecting structural element, connecting rod element, inflated structural elements, connecting cable element and connecting tension member.

12. The wind energy harvesting system of claim 11, wherein said connecting means includes a substantially closed-loop cable linking fluid-foil base members supporting all of said plural fluid-foil means in a closed-loop sequential arrangement with closed periphery topology; wherein the closed-loop cable loops around at least two rotatable pulleys; and wherein said position-keeping means for maintaining said wind energy harvesting system substantially within a desired geographic envelope includes means for anchoring hubs of said pulleys in at least one of said frozen surface and a ground surface beneath said frozen surface.

13. The wind energy harvesting system of claim 12, wherein two specific pulleys of the at least two rotatable pulleys, are disposed such that a line connecting their respective centers of rotation is aligned within plus or minus 40 degrees from a line perpendicular to a time averaged prevailing flow direction of the air current.

14. The wind energy harvesting system of claim 13, further comprising at least one of (a) an additional specific downstream pulley of the at least two ground supported rotatable pulleys, which additional specific downstream pulley is located downstream or a positive distance along said time averaged prevailing flow direction, relative to either of the two specific pulleys; and (b) an additional specific upstream pulley of the at least two ground supported rotatable pulleys, which additional specific upstream pulley is located upstream or a negative distance along said time averaged prevailing flow direction, relative to either of the two specific pulleys.

15. The wind energy harvesting system of claim 12, wherein said closed-loop cable and the plurality of fluid-foil base members together move with the cycle of substantially periodic motion of said fluid-foil means, around the at least two rotatable pulleys; and wherein the energy harvesting means utilizes transfer of some net work from said plurality of fluid-foil members, through tension in the closed-loop cable, to rotational work on at least one rotatable pulley; and wherein the energy conversion means comprises generator means for converting said rotational work to energy in a desired form here comprising electrical energy.

16. The wind energy harvesting system of claim 1, further comprising at least one of means for storing energy, means for transmitting energy, means for processing energy and means for conditioning energy.

17. The wind energy harvesting system of claim 1, wherein each of the plural fluid-foil means is supported by a movable frame; wherein said movable frame is supported at least in part by said support runner means; and wherein each of said plural fluid-foil means is movable relative to its corresponding movable frame.

18. The wind energy harvesting system of claim 1, wherein said position-keeping means for maintaining said wind energy harvesting system substantially within a desired geographic envelope comprises use of a nonrotating hub anchored in at least one of said frozen surface and a ground surface beneath said frozen surface, and a rotatable structure surrounding said hub, said rotatable structure including a plurality of radial members serving towards connecting said plurality of fluid-foil means to said hub.

19. The wind energy harvesting system of claim 18, wherein said energy conversion means comprises generator means for generating electrical power from the rotation of said rotatable structure around said nonrotating hub.

20. The wind energy harvesting system of claim 1, further comprising means for utilizing at least some portion of said energy in a desired form from said energy conversion means, to run pump means for pumping liquid water to create at least one of ice and artificial snow for deposition on said frozen surface.

21. The wind energy harvesting system of claim 1, wherein said frozen surface is floating above a liquid water layer, wherein said support runner means comprise buoyant support runner means, and wherein in the event of a warm temperature period occurring when said frozen surface becomes one of substantially or fully melted, said buoyant support runner means float in said liquid water layer and said wind energy harvesting system can still operate.

22. The wind energy harvesting system of claim 1, further comprising means for transporting said wind energy harvesting system to its desired geographic envelope by towing it supported by said support runner means sliding on said frozen surface.

23. A wind energy harvesting system, comprising:
plural fluid-foil means for contacting proximate flow fields of an air current when said air current exists and carries wind energy in the form of fluid-dynamic kinetic energy;
control system means for controlling time-variable orientations of said fluid-foil means relative to said proximate flow fields of said air current when said air current exists and carries wind energy in the form of fluid-dynamic kinetic energy;
support runner means comprising at least one of a ski, a snowboard, a sled, a skate, a runner, an inflatable tube, a pontoon, and a hull with runners, for slidably engaging a frozen surface comprising at least one of a snow surface, an ice surface and a frozen water surface, and for contributing to supporting said fluid-foil means substantially above said frozen surface;
connecting means for connecting said plural fluid-foil means in a sequential arrangement, including connecting members that connect adjacently-located fluid-foil means in said sequential arrangement;
position-keeping means for maintaining said wind energy harvesting system substantially within a desired geographic envelope; and
energy harvesting means including said control system means, for converting a portion of said fluid-dynamic kinetic energy into net work on said fluid-foil means over the course of a cycle of substantially periodic motion of said fluid-foil means, by utilizing time-variable fluid-dynamic pressure distributions and resulting forces acting on said fluid-foil means at said time-variable orientations to contribute to driving said substantially periodic motion when said air current exists and carries wind energy in the form of fluid-dynamic kinetic energy;
said energy harvesting means further including energy conversion means for converting at least some of said net work into energy in a desired form for at least one of transmission, storage, processing and use.

24. A wind energy harvesting system, comprising:

plural fluid-foil means for contacting proximate flow fields of an air current when said air current exists and carries wind energy in the form of fluid-dynamic kinetic energy;

control system means for controlling time-variable orientations of said fluid-foil means relative to said proximate flow fields of said air current when said air current exists and carries wind energy in the form of fluid-dynamic kinetic energy;

plural support runner means for slidably engaging a frozen surface and for contributing to supporting said plural fluid-foil means substantially above said frozen surface;

connecting means for connecting said plural fluid-foil means in a sequential arrangement of closed periphery topology, including connecting members that connect adjacently-located fluid-foil means in said sequential arrangement;

position-keeping means for maintaining said wind energy harvesting system substantially within a desired geographic envelope; and energy harvesting means including said control system means, for converting a portion of said fluid-dynamic kinetic energy into net work on said fluid-foil means over the course of a cycle of substantially periodic motion of said fluid-foil means, by utilizing time-variable fluid-dynamic pressure distributions and resulting forces acting on said fluid-foil means at said time-variable orientations to contribute to driving said substantially periodic motion when said air current exists and carries wind energy in the form of fluid-dynamic kinetic energy;

said energy harvesting means further including energy conversion means for converting at least some of said net work into energy in a desired form for at least one of transmission, storage, processing and use;

wherein said energy conversion means includes a rotating member driven to rotational motion by said motion of said fluid-foil means, which rotating member is rotatable around a nonrotating hub member substantially anchored to at least one of said frozen surface and a ground surface beneath said frozen surface, and which energy conversion means further includes generator means for generating electrical power from the rotational motion of said rotating member relative to said nonrotating hub.

25. The wind energy harvesting system of claim 24, wherein the presence of said frozen surface serves as friction-reducing means for reducing frictional forces that act to oppose movement of said plural support runner means and the corresponding plural fluid-foil means, relative to an alternate condition wherein said frozen surface is absent.

* * * * *